United States Patent
Xu et al.

(10) Patent No.: US 11,621,438 B2
(45) Date of Patent: Apr. 4, 2023

(54) SOLID ELECTROLYTE INTERPHASE (SEI) APPLICATION ON ANODE OF FLUORIDE ION/SHUTTLE BATTERIES

(71) Applicants: HONDA MOTOR CO., LTD., Tokyo (JP); California Institute of Technology, Pasadena, CA (US)

(72) Inventors: Qingmin Xu, Dublin, OH (US); Christopher J. Brooks, Dublin, OH (US); Kaoru Omichi, Tochigi (JP); Simon Jones, Whittier, CA (US); Victoria Davis, Santa Clarita, CA (US); Stephen Munoz, Pasadena, CA (US); Jeongmin Kim, Pasadena, CA (US); Keith Billings, Yorba Linda, CA (US); Thomas Miller, III, South Pasadena, CA (US); Robert H. Grubbs, South Pasadena, CA (US); William Wolf, Pasadena, CA (US)

(73) Assignees: HONDA MOTOR CO., LTD., Tokyo (JP); CALIFORNIA INSTITUTE OF TECHNOLOGY, Pasadena, CA (US)

( * ) Notice: Subject to any disclaimer, the term of this patent is extended or adjusted under 35 U.S.C. 154(b) by 470 days.

(21) Appl. No.: 16/702,327

(22) Filed: Dec. 3, 2019

(65) Prior Publication Data
US 2020/0185776 A1    Jun. 11, 2020

Related U.S. Application Data

(60) Provisional application No. 62/863,114, filed on Jun. 18, 2019, provisional application No. 62/776,978, (Continued)

(51) Int. Cl.
*H01M 10/0569* (2010.01)
*H01M 6/16* (2006.01)
(Continued)

(52) U.S. Cl.
CPC ....... *H01M 10/0569* (2013.01); *H01M 4/134* (2013.01); *H01M 4/1395* (2013.01);
(Continued)

(58) Field of Classification Search
None
See application file for complete search history.

(56) References Cited

U.S. PATENT DOCUMENTS

2011/0274832 A1    11/2011    Dai et al.
2012/0270076 A9    10/2012    Yazami
(Continued)

FOREIGN PATENT DOCUMENTS

WO    WO 2015/099233 A1    7/2015
WO    WO 2019/226663 A1    11/2019

OTHER PUBLICATIONS

Tanguy, François et al. "Lowering Interfacial Chemical Reactivity Of Oxide Materials For Lithium Batteries. A Molecular Grafting Approach". Journal Of Materials Chemistry, vol. 19, No. 27, 2009, p. 4771. Royal Society Of Chemistry (RSC), https://doi.org/10.1039/b901387c. (Year: 2009).*

(Continued)

*Primary Examiner* — Robert S Carrico
(74) *Attorney, Agent, or Firm* — ArentFox Schiff LLP; Mark Duell

(57) ABSTRACT

The present disclosure is directed to fluoride (F) ion batteries and F shuttle batteries comprising an anode with a solid electrolyte interphase (SEI) layer, a cathode comprising a core shell structure, and a liquid fluoride battery electrolyte. According to some aspects, the components therein enable discharge and recharge at room-temperature.

12 Claims, 37 Drawing Sheets

Related U.S. Application Data filed on Dec. 7, 2018, provisional application No. 62/775,690, filed on Dec. 5, 2018.

(51) Int. Cl.

| | | |
|---|---|---|
| *H01M 10/0567* | (2010.01) | |
| *H01M 4/134* | (2010.01) | |
| *H01M 4/1395* | (2010.01) | |
| *H01M 4/38* | (2006.01) | |
| *H01M 4/36* | (2006.01) | |
| *H01M 4/62* | (2006.01) | |
| *H01M 10/0568* | (2010.01) | |
| *H01M 10/05* | (2010.01) | |

(52) U.S. Cl.
CPC ............ *H01M 4/366* (2013.01); *H01M 4/38* (2013.01); *H01M 4/381* (2013.01); *H01M 4/62* (2013.01); *H01M 6/164* (2013.01); *H01M 6/168* (2013.01); *H01M 10/05* (2013.01); *H01M 10/0567* (2013.01); *H01M 10/0568* (2013.01); *H01M 2300/0034* (2013.01); *H01M 2300/0037* (2013.01)

(56) References Cited

U.S. PATENT DOCUMENTS

| | | |
|---|---|---|
| 2012/0270079 A1 | 10/2012 | Yazami |
| 2013/0189574 A1 | 7/2013 | Crepel et al. |
| 2014/0152269 A1 | 6/2014 | Bhat et al. |
| 2016/0351962 A1 | 12/2016 | Li |
| 2017/0062874 A1 | 3/2017 | Jones et al. |
| 2017/0141387 A1 | 5/2017 | Hayner et al. |
| 2017/0352921 A1 | 12/2017 | Nakamoto et al. |
| 2018/0138512 A1 | 5/2018 | Bélanger et al. |
| 2018/0175382 A1 | 6/2018 | Chou et al. |
| 2018/0175450 A1 | 6/2018 | Chesneau et al. |
| 2018/0301764 A1 | 10/2018 | Chou et al. |

OTHER PUBLICATIONS

Assresahegn, Birhanu Desalegn et al. "Advances on the use of diazonium chemistry for functionalization of materials used in energy storage systems". Carbon, vol. 92, 2015, pp. 362-381. Elsevier BV, https://doi.org/10.1016/j.carbon.2015.05.030. (Year: 2015).*

Communication issued by the International Searching Authority in International Application No. PCT/US19/64778, dated Feb. 5, 2020.

"Lutensol(R) AO types" [online], Mar. 2014 (Mar. 2014) [retrieved on Jan. 29, 2020], BASF The Chemical Company, retrieved from the Internet: < https://biakhlm.com.ua/index.php?option=com_k2&Itemid=1174&id=901_f6cc99717606f04a2abc418ab94cc6b1&lang=ru&task=download&view=item >, 7 pp.; see entire document, especially, p. 2.

Bhatia H. et al., "Conductivity Optimization of Tysonite-type La1-xBaxF3-x Solid Electrolytes for Advanced Fluoride Ion Battery", ACS Applied Materials & Interfaces, Jun. 2017, [retrieved on Jan. 30, 2020], vol. 9, issue 28, 10 Pages Total.

International Search Report and Written Opinion, issued by International Searching Authority in counterpart International Patent Application No. PCT/US2019/064792, dated Mar. 2, 2020.

Kim H. K. et al., "Reduction of the Work Function of Gold by N-Heterocyclic Carbenes", Chemistry of Materials [online], Apr. 12, 2017 (Apr. 12, 2017) [retrieved on Jan. 30, 2020], vol. 29, issue 8, pp. 3403-3411.

Zeb G. et al., "Surface Treatments for Controlling Solid Electrolyte Interphase Formation on Sn/Graphene Composite Anodes for High-Performance Li-Ion Batteries", Journal of Physical Chemistry C, Jul. 10, 2017 (Jul. 10, 2017) [retrieved on Jan. 30, 2020], vol. 121, issue 31, pp. 16682-16692.

International Search Report and Written Opinion, issued by International Searching Authority in related International Patent Application No. PCT/US2019/064778, dated Apr. 8, 2020.

* cited by examiner

SEI formation of silane (FOTS) derivative on the surface of anode

SEI formation of diazonium derivative on the surface of anode

WE: Ce plate
RE: Ag/Ag$^+$
CE: Pt wire
Electrolyte:
0.1M TMABF$_4$+0.05M CF$_3$H$_4$C$_6$N$_2$·BF$_4$/BTFE
Potential range: -4.5 V to -2.5 V (vs. Ag/Ag$^+$)
Scan rate: 1 mV/s
Cycles: 20

A

B

SOLID ELECTROLYTE INTERPHASE (SEI) APPLICATION ON ANODE OF FLUORIDE ION/SHUTTLE BATTERIES

CROSS-REFERENCE TO RELATED APPLICATIONS

This application claims priority to each of the following applications: U.S. Provisional Application No. 62/776,978, entitled "Room-Temperature Cycling of Metal Fluoride Electrodes: Liquid Electrolytes For High-Energy Fluoride Ion Cells", filed Dec. 7, 2018; U.S. Provisional Application No. 62/775,690, entitled "Room-Temperature Cycling of Metal Fluoride Electrodes: Liquid Electrolytes For High-Energy Fluoride Ion Cells", filed Dec. 5, 2018; and U.S. Provisional Application No. 62/863,114, entitled "Solid Electrolyte Interface Composition", filed Jun. 18, 2019. Each of the preceding applications is incorporated herein by reference in its entirety.

INCORPORATION BY REFERENCE

Each of the following applications is hereby incorporated herein by reference in its entirety: U.S. Patent Publication No. 2017/0062874 A1 (U.S. patent application Ser. No. 15/228,876), entitled "Non-Aqueous Fluoride Salts, Solutions, and Their Uses", filed Aug. 4, 2016; U.S. patent application Ser. No. 16/444,854, entitled "Electroactive Materials Modified With Molecular Thin Film Shell", filed Jun. 18, 2019; U.S. patent application Ser. No. 15/844,079, entitled "Composite Electrode Materials for Fluoride-Ion Electrochemical Cells", filed Dec. 15, 2019; and U.S. patent application Ser. No. 16/445,022, entitled "Nanostructural Designs for Electrode Materials of Fluoride Ion Batteries," filed Jun. 18, 2019.

STATEMENT REGARDING FEDERALLY SPONSORED RESEARCH OR DEVELOPMENT

This invention was made with government support under Grant No. DE-AC05-00OR22725 & DE-AC02-05CH11231 awarded by the US Department of Energy, CHE1335486 awarded by the National Science Foundation, and 80NM0018D004 awarded by NASA (JPL). The government has certain rights in the invention.

BACKGROUND

Fluoride ion batteries are a novel and underexplored alternative next generation energy storage technology. The energy densities of fluoride ion batteries can be much higher than lithium ion batteries. Much of the research being conducted is focused on all-solid-state fluoride ion batteries, which may be rechargeable at elevated temperatures to some extent. However, slow reaction kinetics impose significant challenges to all-solid-state fluoride ion batteries. Reaction kinetics are better in liquid type fluoride ion batteries. However, this type of fluoride ion battery still faces many challenges, such as the lack of efficient, rechargeable electrolytes and reversible cathode and anode materials at room temperature. As energy demands are increasing for electric vehicles, portable electronic devices, and portable energy storage, there is an increasing need for advanced fluoride ion batteries.

SUMMARY

According to some aspects, the present disclosure is directed to fluoride (F) ion batteries and F shuttle batteries comprising: an anode comprising a rare-earth metal or an alkaline earth metal (or a mixture of metals), and a solid electrolyte interphase layer; a cathode comprising a transition metal and a core shell structure; and a liquid fluoride battery electrolyte. In some embodiments, the fluoride ion batteries disclosed herein can be fluoride (F) shuttle batteries with multi-electron transfer. According to some aspects, the present disclosure is directed to a specialized anode for fluoride ion batteries comprising a metal (e.g. Ce, La, and Ca) as active anode material with a solid electrolyte interphase (SEI) layer on a surface of the anode. In some embodiments, the SEI layer can comprise a fluorinated compound. In some embodiments, the SEI layer can comprise a chemical compound that is stable on the surface of the anode, for example, a reaction derivative formed between a diazonium salt and a surface of the anode, the diazonium salt having the structure of formula I:

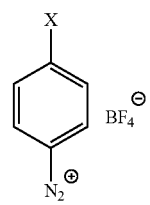

Formula I wherein X can be, for example, $-C(CH_3)_3$, $-OCH_3$, $-NMe_2$, $-NO_2$, or $-CF_3$. The core shell structures disclosed herein can be in various shapes or forms, the SEI layer can comprise different tunable chemical compounds, and the liquid fluoride electrolyte can provide robust chemical stability. In some embodiments, the present disclosure is directed to various methods of solid-electrolyte interphase (SEI) formation and various methods of producing the fluoride batteries and components thereof.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

(FIG. 12A) FH grafted calcium anode in $NpMe_3NF$-BTFE electrolyte; and (FIG. 12B) FOTS grafted calcium anode in $Et_3MeN.BF_4$—BTFE electrolyte.

FIG. 13A shows XPS spectra of FH SEI grafted on calcium anode; FIG. 13B shows XPS spectra of FOTS SEI grafted on calcium anode; FIG. 13C shows ratios (F/Ca) between fluorine in SEI layer and calcium active surface material for FH and for FOTS.

FIG. 18A shows $^1H$ NMR (300 MHz, $CD_3CN$, 20° C.) δ 3.48 (4H, s, $N^+(CH_2C(CH_3)_3)_2$), 3.34 (6H, s, $N^+(CH_3)_2$), 1.19 (18H, s, $N^+(CH_2C(CH_3)_3)_2$). FIG. 18B shows $^{19}F$ NMR (282 MHz, $CD_3CN$, 20° C.) δ −72.87 (s, $F^-$), −147.00 (t, $DF_2^-$).

FIG. 25A shows Arrhenius plots of the ionic diffusion constants ($D_{Np+}+O_{F-}$) from PFG-NMR, and FIG. 25B shows ionic conductivity from AC impedance at temperatures ranging from 5 to 40° C. (in increments of 5° C.) for each of the three electrolyte compositions explored: 0.75 M $Np_1F$ in BTFE (circles), 0.75 M $Np_2F$ in BTFE (squares), and 0.75 M $Np_1F$ in 3:1 BTFE:DME (triangles).

DETAILED DESCRIPTION

The present disclosure is directed to fluoride ion batteries, various components of fluoride ion batteries, methods of making and methods of using fluoride ion batteries, and specific aspects of the various components and devices therein. Various aspects of the durability of the internal components of a fluoride ion battery while utilizing a liquid, non-aqueous fluoride electrolyte will be disclosed herein to enable a room-temperature, rechargeable fluoride ion battery.

Figure 7:
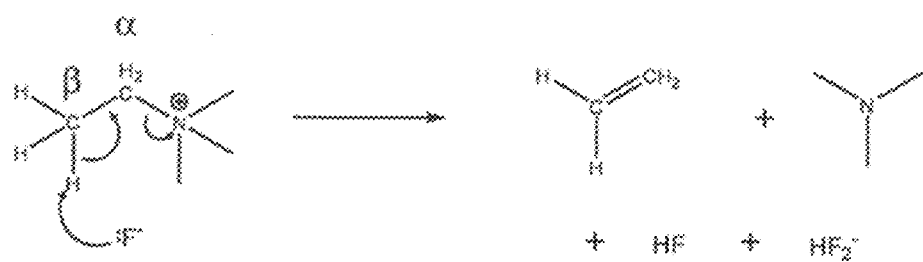
FIG. 7 is an illustration of decomposition of a tetraalkylammonium fluoride salt under drying conditions to form HF and $HF_2^-$.

Fluoride ion batteries offer new opportunities to increase the energy densities of batteries compared to lithium ion batteries. While offering high energy density and the possibility for multiple charge transfer, the high reactivity of fluoride ions can present many issues, for example, dissolution of the anode and cathode and difficult defluorination of anode materials. Thus, all-solid-state fluoride ion batteries have been investigated, using a solid electrolyte, but slow reaction kinetics demand elevated temperatures for recharge. Liquid electrolytes comprising fluoride ions in solution offer faster kinetics and can offer recharge at room temperatures, but the high reactivity of fluoride ions can cause short battery life. Aqueous solutions containing fluoride anion ($F^-$), for electrolytes, show fast reactions of the fluoride ion with water, forming hydrofluoric acid (HF) and the complex ion $HF_2^-$ (FIG. 7). Formation of HF is highly corrosive and extremely toxic. Further, $HF_2^-$ is much less active than $F^-$ in electrochemical applications and, in extreme cases, may even be inactive. $HF_2^-$ is also undesirable because it will evolve $H_2$ at potentials below the cathodic reaction of interest, limiting the useful voltage window in electrochemical applications and potentially causing a failure of the battery comprising the electrolyte.

The use of non-aqueous $F^-$ electrolyte solutions can solve many problems associated with aqueous $F^-$ solutions. However, non-aqueous $F^-$ solutions have proven difficult to prepare with concentrations high enough to be useful (e.g., greater than or equal to 0.05 M). According to some aspects of the present disclosure, liquid electrolytes suitable for a fluoride ion battery (FIB) can include a fluoride salt and a non-aqueous solvent in which the fluoride salt is at least partially present in a dissolved state. The fluoride salt can be a metal fluoride or a non-metal fluoride. The solvent can be an organic liquid or an ionic liquid, or a mixture of the two. In some embodiments, electrolytes suitable for a FIB can include a composite electrolyte containing fluoride salt, a polymer and optionally an organic liquid, an ionic liquid, or a mixture of the two.

Metal fluoride electrolyte salts are typically insoluble in organics at concentrations >0.05 M. Organic fluoride electrolyte salts, like those with tetraalkylammonium ($R_4N^+$) cations could have improved solubility; however, these are non-trivial to synthesize in truly anhydrous form as decomposition of $F^-$ to $HF_2$ occurs readily through elimination processes at elevated temperatures. Neopentyl-substituted (Np, or 2,2-dimethylpropyl-) alkylammonium salts, as the Np chain is both branched (to improve solubility) and lacks β-hydrogens (to inhibit decomposition upon drying) were tested in organic solvents for application (e.g., solubility, durability) in fluoride ion batteries. After initial screening, for example, dry N,N,N-trimethyl-N-neopentylammonium fluoride ($Np_1F$) and N,N-dimethyl-N,N-dineopentylammonium fluoride ($Np_2F$) were synthesized in up to 100 g-batches using an HF-titration procedure and both demonstrated applicability to FIB compared to tetramethylammonium fluoride (TMAF).

Figure 8:
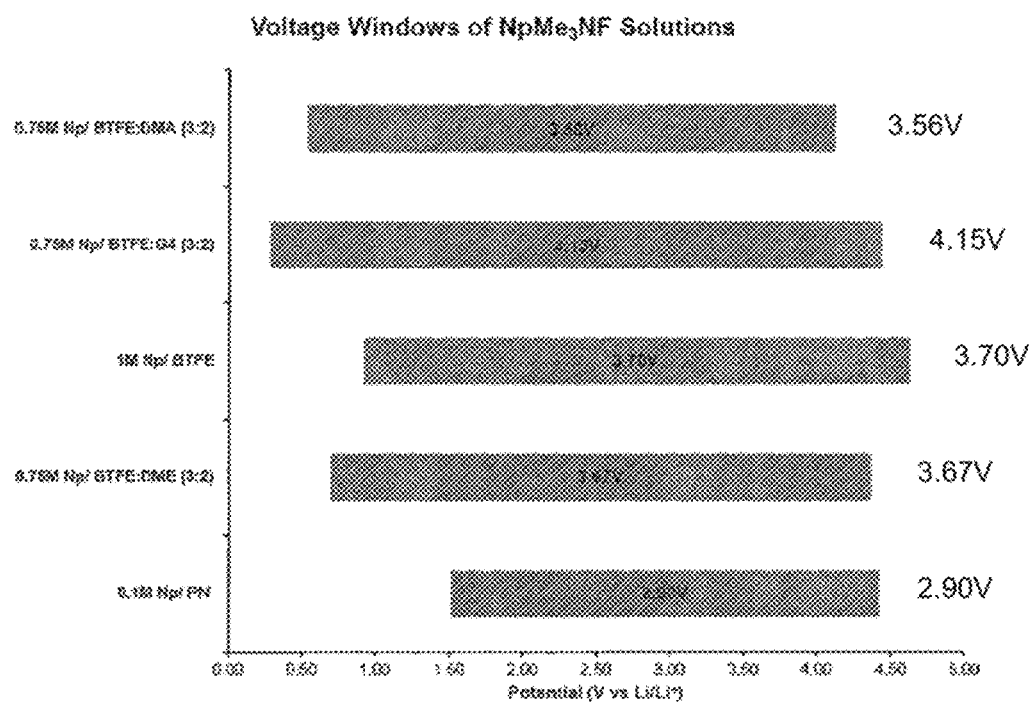
FIG. 8 is a bar graph of voltage windows measured from linear sweep voltammograms for non-limiting examples of electrolyte solutions of the present disclosure.

Various organic solvents provided different levels of electrolyte longevity. For example, BTFE (2,2,2-trifluoroethyl sulfone, bis(2,2,2-trifluoroethyl)ether) was found to provide suitable voltage windows (FIG. 8) and longevity of the electrolyte (FIGS. 24A-24D).

Figure 1A:
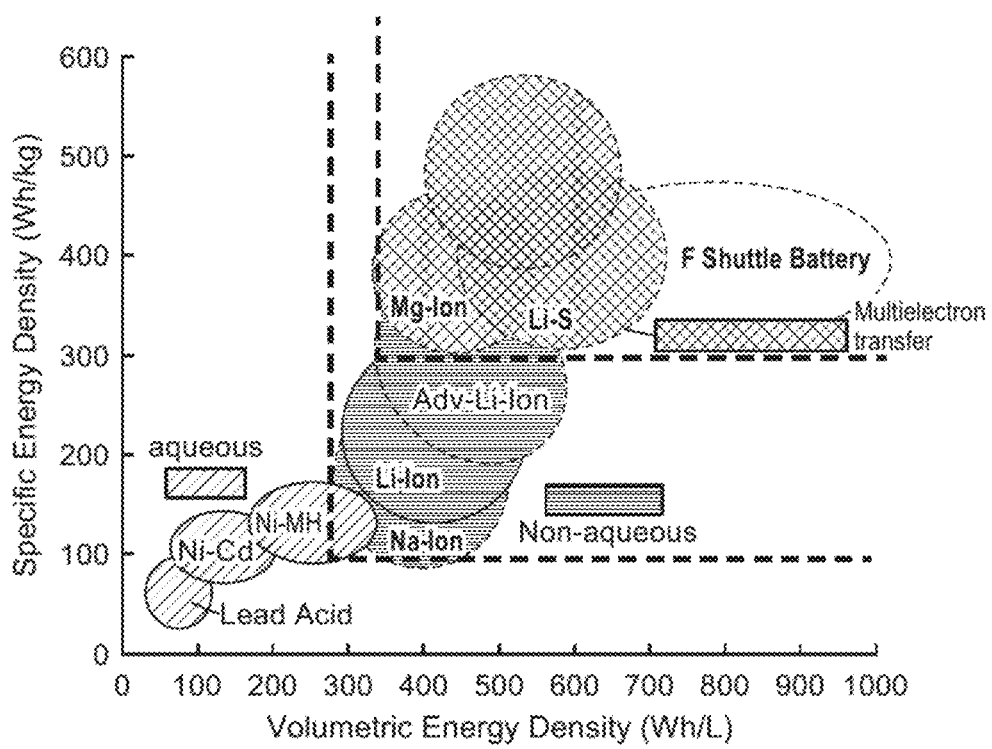
FIG. 1A depicts energy densities of various types of batteries.

According to some aspects of the present disclosure, a liquid electrolyte for a FIB can comprise bis(2-methoxyethyl) ether, bis(2,2,2-trifluoroethyl) ether, N,N,N-trimethyl-N-neopentylammonium fluoride, N,N-dimethyl-N,N-dineopentylammonium fluoride, propionitrile, or combinations thereof. With a suitable electrolyte, development of a room-temperature rechargeable FIB also requires durable internal components, for example, due to the high energy density and high reactive potential of a FIB (FIG. 1A).

Figure 1B:
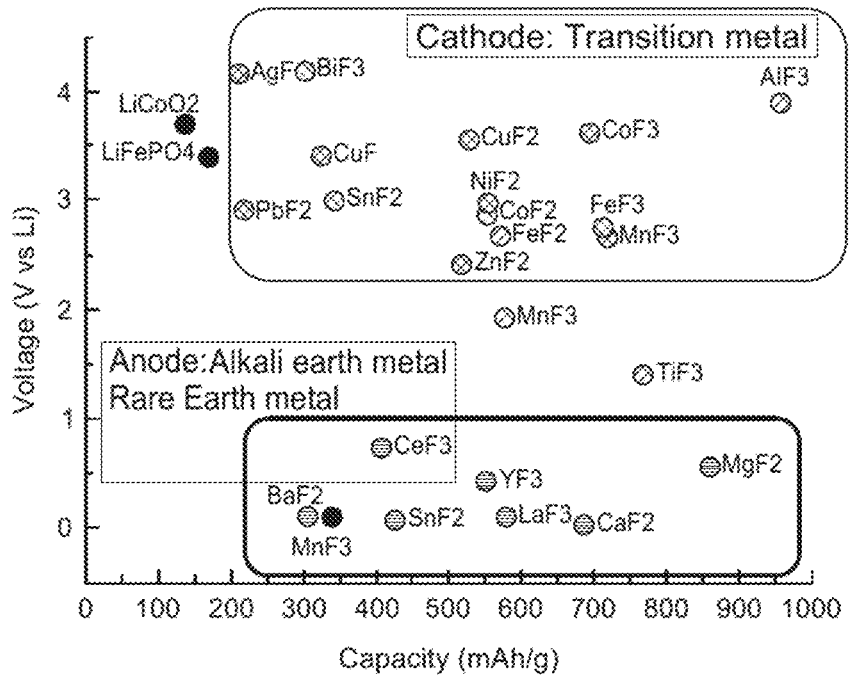
FIG. 1B depicts examples of suitable anode and cathode metals/materials.
Figure 2:
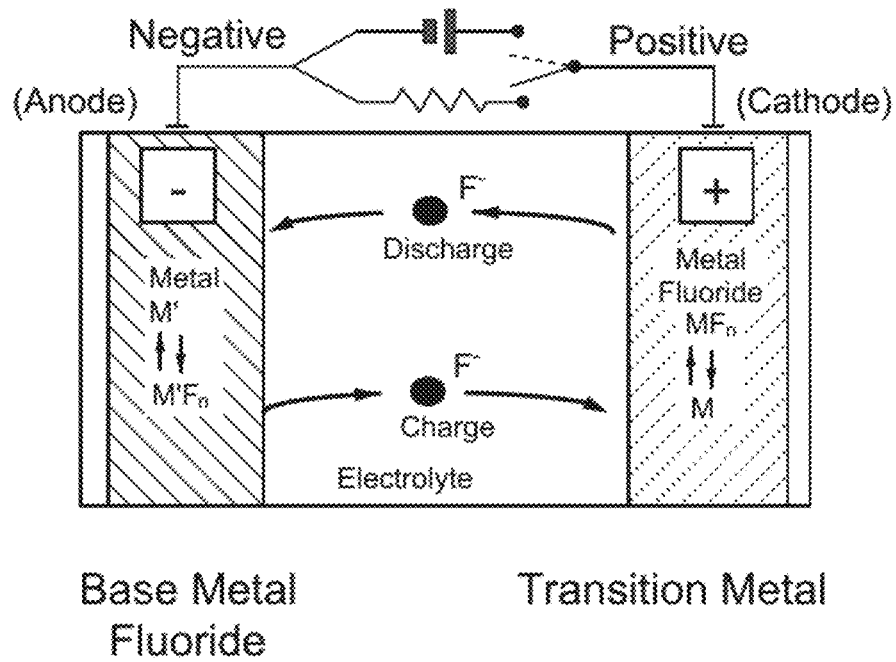
FIG. 2 is a schematic illustration of a fluoride ion electrochemical cell, according to some aspects of the present disclosure.
Figure 3:
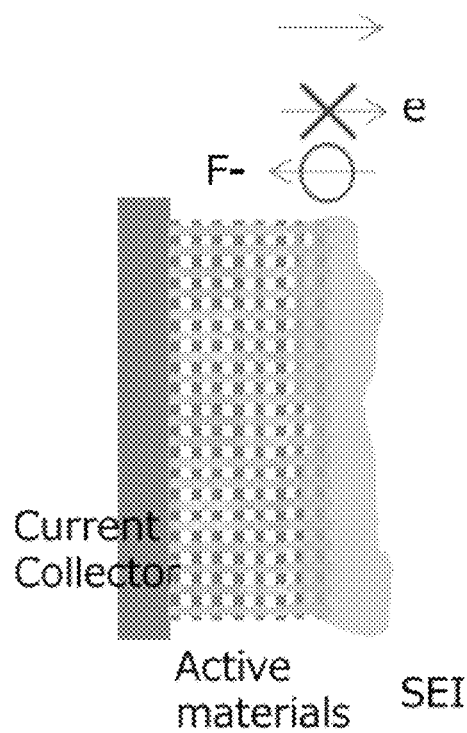
FIG. 3 is a non-limiting schematic illustrating a solid-electrolyte interphase (SEI) layer on an anode that allows passage of ions but not passage of electrons, while being stable on the surface of active materials and a current collector, according to some aspects of the present disclosure.

According to some aspects of the present disclosure, the anode comprises an outer layer of a solid-electrolyte interphase (SEI) expanding negative potentials of electrolytes or/and preventing dissolution of the anode metal to realize reversibility of fluorination and defluorination of anode materials while enabling transfer of $F^-$ from the electrolyte to the anode (FIG. 3). Suitable compounds for formation of an SEI are disclosed herein, and Example 5 describes examples of formation of an SEI. Examples of some suitable anode metals are illustrated in FIG. 1B.

Figure 4:
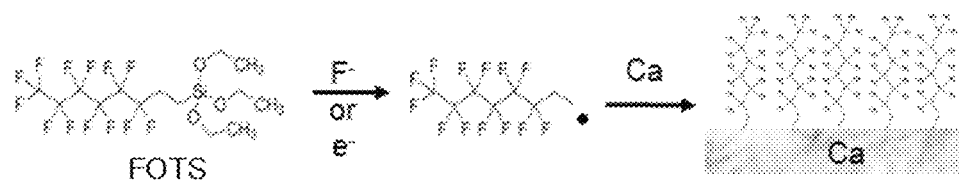
FIG. 4 illustrates a reaction (radical) mechanism of silane (FOTS) with the surface of an anode in SEI formation (solid-electrolyte interphase formation), according to some aspects of the present disclosure.
Figure 5:
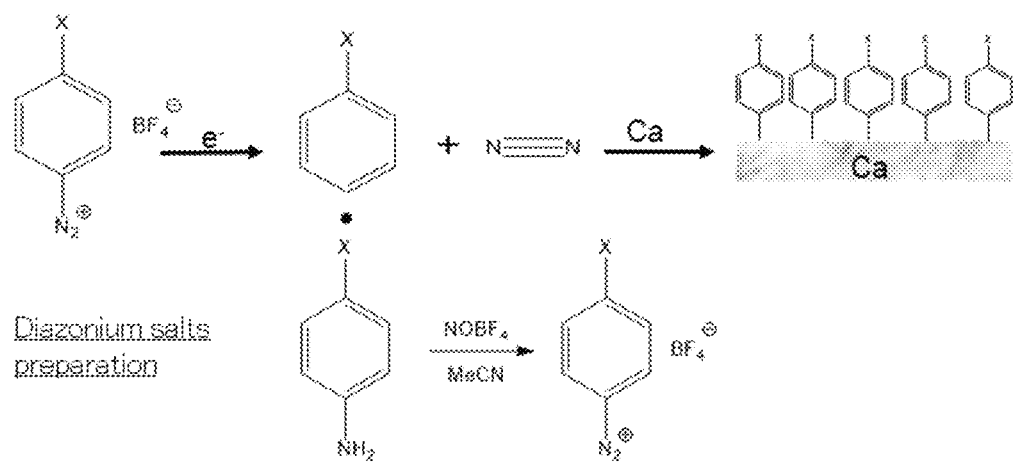
FIG. 5 illustrates a reaction (radical) mechanism of diazonium salts with the surface of an anode in SEI formation (solid-electrolyte interphase formation), according to some aspects of the present disclosure.

According to some aspects, the outer SEI layer is covalently attached to the anode metal. Non-limiting examples of SEI attachment are illustrated in FIG. 4 and in FIG. 5. The outer solid electrolyte interphase layer can comprise $CF_3(CF_2)_5CH_2$, $CF_3(CF_2)_2CH_2$, para-tert-butylphenyl, para-methoxyphenyl, para-(dimethylamino) phenyl, para-nitrophenyl, para-trifluoromethylphenyl, or combinations thereof. In some embodiments, the outer solid electrolyte interphase layer comprises 1H,1H,2H,2H-perfluorooctyltriethoxysilane; 3,3,4,4,5,5,6,6-nonafluorohex-1-ene (FIG. 4); 4-tert-butylbenzene diazonium salt; 4-methoxybenzene diazonium salt; 4-(dimethylamino)benzene diazonium salt; 4-nitrobenzene diazonium salt; 4-trifluoromethylbenzene diazonium salt, or combinations thereof as is shown in FIG. 5. In some embodiments, the outer solid electrolyte interphase layer can be a film on the anode, and can comprise 4-tert-butylbenzenediazonium salt; 4-methoxybenzene diazonium salt; 4-(dimethylamino)benzene diazonium salt; 4-nitrobenzene diazonium salt; 4-trifluoromethyl benzene diazonium salt, or combinations thereof further containing a salt counter anion. According to some aspects, the counter anion may comprise an organic-soluble counter ion. Non-limiting examples of counter anions useful according to the present disclosure include $BF_4^-$, $F^-$, $Cl^-$, $PF_6^-$, $CF_3SO_3^-$, $[(CF_3SO_2)_2N]^-$, and combinations thereof.

Figure 19A:
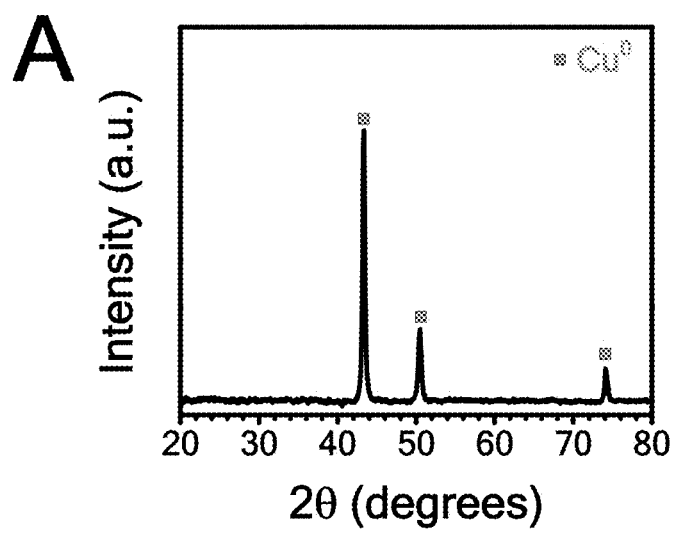
FIG. 19A shows pXRD characterization of pristine powder for synthesized copper nanoparticles. In the (Al $K_\alpha$) spectra of copper nanoparticles, characteristic peaks for metallic copper (all peaks, labeled with squares) are depicted.
Figure 19B:
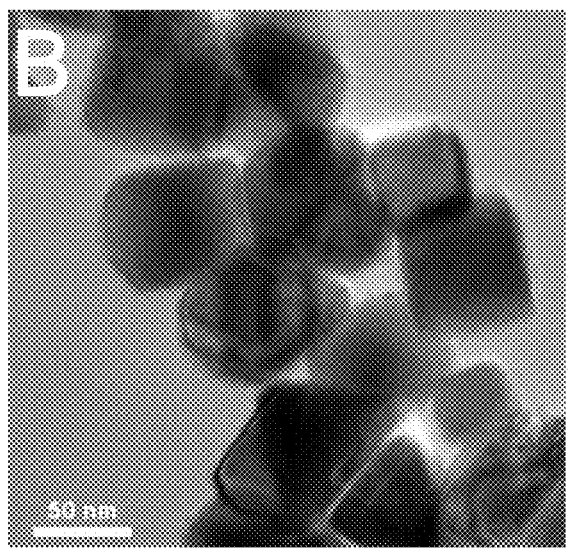
FIG. 19B shows a TEM image of synthesized copper nanoparticles (~50 nm diameter).

In addition to the various electrolytes and anode components of a fluoride ion battery (FIB), cathodes for a FIB are disclosed herein. According to some aspects, a cathode metal, as exemplified in FIG. 1B, further comprises a shell. The cathode metal can, for example, comprise a transition metal. The transition metal can have some dimensions on the nanometer scale to improve, for example, efficiency and charge transfer. In some embodiments, the cathode can contain a core-shell particle having a transition metal core and a shell at least partially surrounding the transition metal core, the shell in contact with the electrolyte. A non-limiting example of a suitable copper core particle is shown in FIG. 19B. It should be understood that, as used herein, the phrase "at least partially surrounding" may refer to partial coverage (e.g., about 70% coverage, optionally about 80%, optionally about 90%, and optionally about 95%) or full coverage (e.g., greater than about 95% coverage, optionally greater than about 96%, optionally greater than about 97%, optionally greater than about 98%, optionally greater than about 99%, and optionally about 100%).

Figure 19C:
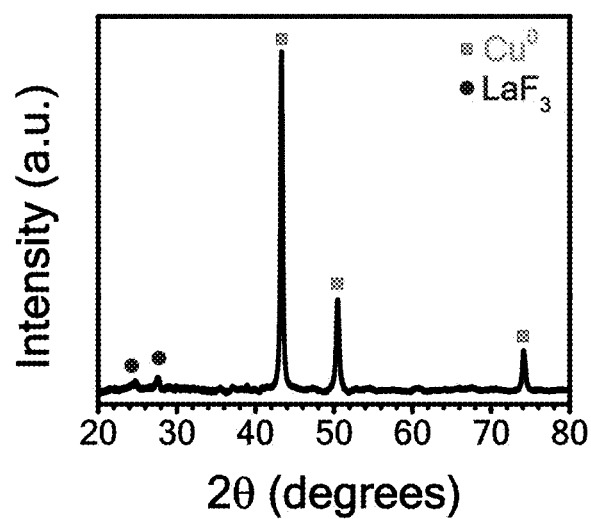
FIG. 19C shows pXRD characterization of pristine powder for the as-synthesized core@shell nanoparticles ($Cu@LaF_3$). Characteristic peaks for metallic copper (squares) and lanthanum trifluoride (circles) are depicted.
Figure 19D:
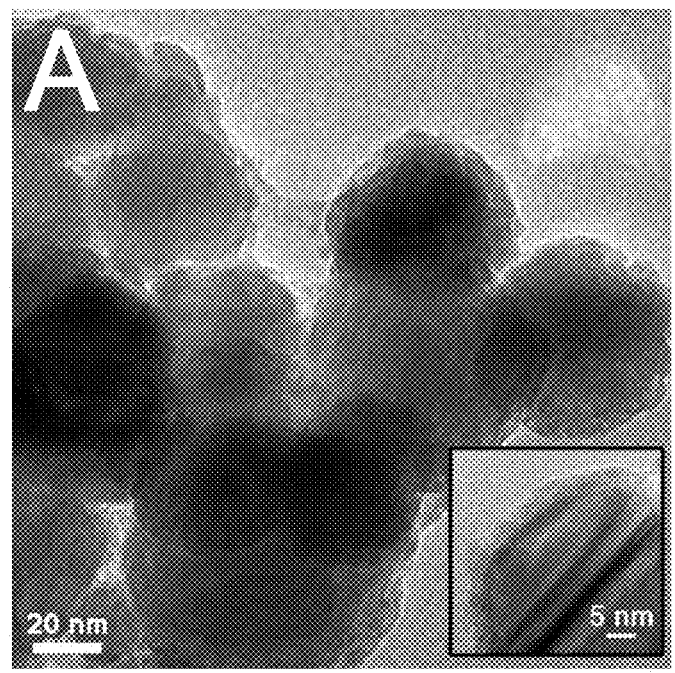
FIG. 19D shows a TEM image of pristine core-shell ($Cu@LaF_3$ core-shell cathode materials) nanoparticles. The inset at lower right shows a high-resolution TEM (HR-TEM)image of the thin $LaF_3$ shell encasing the thicker Cu core.

In some embodiments, the transition metal core can comprise copper and the shell can comprise $LaF_3$. For example, FIG. 19D illustrates a $LaF_3$ shell surrounding a copper core particle. According to some aspects, the transition metal core can have at least one dimension less than or equal to about 20 nm. In some embodiments, the shell comprises a thickness from about 2 nm to about 5 nm.

According to some aspects, a method of making a cathode for a fluoride ion battery is disclosed herein, the method comprising providing a solid transition metal and treating the solid transition metal with lanthanum and fluorine to form a $LaF_3$ shell at least partially surrounding the solid transition metal. According to some aspects, the solid transition metal can comprise bismuth, lead, copper, or combinations thereof. The treating can comprise dispersing the solid transition metal in an aqueous solution of hydrazine hydrate and contacting the solid transition metal with an aqueous solution of lanthanum ions and fluoride ions. The aqueous solution of lanthanum ions and fluoride ions can comprise lanthanum nitrate hexahydrate and sodium fluoride. In some embodiments, the treating can comprise radio frequency sputtering of $LaF_3$ onto the solid transition metal.

Another example method for making a cathode for a fluoride ion battery as disclosed herein may comprise a method as described in U.S. patent application Ser. No. 15/844,079, the disclosure of which is incorporated herein by reference in its entirety.

The core-shell particle having a transition metal core and a shell at least partially surrounding the transition metal core can, for example, be applied to a metal cathode or can be supported by various means for utilization in a FIB. According to some aspects, an agglomerate of transition metal core and a shell at least partially surrounding the transition metal core is formed for a suitable cathode.

According to some aspects, the core-shell particle having a transition metal core and a shell at least partially surrounding the transition metal core can form a paste, can be combined with other compounds, can be dried, can be formed, can be agglomerated, or can be utilized by any means known in the art. In some embodiments, the core-shell particle having a transition metal core and a shell at least partially surrounding the transition metal core can be made into a paste with poly(vinylidene fluoride), PVDF and/or SP (Super P carbon black), pressed into stainless steel mesh, and dried under vacuum for an electrode assembly. Accordingly, the electrolytes, anodes, and cathodes disclosed herein enable a room-temperature rechargeable FIB and methods of making.

According to some aspects, the present disclosure is directed to a fluoride ion battery (FIB) comprising: a liquid electrolyte with fluoride ions; an anode containing an alkali earth metal, a rare earth metal, or combinations thereof, and having an outer solid electrolyte interphase layer in contact with the electrolyte; and a cathode containing a core-shell particle having a transition metal core and a shell at least partially surrounding the transition metal core, the shell in contact with the electrolyte or containing a transition metal with optimized nanostructures (≤20 nm in 1 direction) surrounded by molecular soft shells. Non-limiting examples of optimized nanostructures include those described in U.S. patent application Ser. No. 16/445,022, the disclosure of which is incorporated herein by reference in its entirety.

In some embodiments, the fluoride ion battery disclosed herein can be wherein the alkali earth metal is calcium, and the rare earth metal is selected from cerium and lanthanum. In some embodiments, the fluoride ion battery disclosed herein can be wherein the transition metal core comprises bismuth, lead, copper, or combinations thereof.

According to some aspects, methods of making solid electrolyte interphase (SEI) on an anode for a fluoride ion battery is disclosed herein, the methods comprising: 1) providing a liquid electrolyte comprising an additive; providing a working electrode comprising an alkali earth metal, a rare earth metal, or combinations thereof in contact with the electrolyte; providing a counter electrode in contact with the electrolyte; and potential cycling (cyclic voltammetry (CV)) on the working electrode between a first potential and a second potential for a number of cycles until the additive forms an outer solid electrolyte interphase layer on the working electrode, with the second voltage potential being higher than the first voltage potential. In some embodiments, the working electrode can comprise calcium, cerium, lanthanum, or combinations thereof; 2) potentiostating at certain voltages on the working electrode for a certain time that can cause the additives decomposition or grafting to form SEI layer on the working electrode surface; 3) soaking the working electrode in a solution/electrolyte containing additives; and/or 4) pretreating the working electrode in an electrolyte including additives if the additives react with $F^-$, and then transfer the pretreated electrode into electrochemical cell for battery testing.

In some embodiments, the first potential can be about −0.8 V and the second potential can be about +0.7 V vs. Li/Li$^+$, the number of cycles can be up to five, and the additive can comprise 1H,1H,2H,2H-perfluorooctyltriethoxy-silane, 3,3,4,4,5,5,6,6,6-nonafluorohex-1-ene, or combinations thereof.

In one example of a diazonium Salt SEI formation method, a preliminary test electrolyte containing 0.1 M triethylmethylammonium tetrafluoroborate (TMABF$_4$) in BTFE may be prepared. Calcium plate may be scrubbed with sandpaper and cut into approximately 2.5 mm×2.5 mm strips to be used as working electrodes. Calcium working electrode and electrolyte may be installed into test fixture, with platinum counter electrode. The test fixture may be purged with argon for 30 minutes. An Initial EIS measurement may be taken by running 5 CV cycles between −1 V and 0.8 V vs. Li to baseline the cell (scan rate: 1 mV/s). 0.05 M diazonium salt may be added to the cell electrolyte. The full 0.05 M may not dissolve during these tests, and likely saturates at a lower concentration. The test fixture may be purged with argon for 30 minutes. 20 CV cycles may be run between −1.0 V and 0.8 V vs. Li. EIS measurements may be taken every 5 cycles. After completion, electrolyte and calcium samples may be kept for analysis.

In some embodiments, the first potential can be about −1.0 V and the second potential can be about +0.8 V vs.

Li/Li⁻ (the potential range may vary depending of the selected additives), the number of cycles can be up to 20, and the additive can comprise 4-tert-butylbenzene diazonium salt; 4-methoxybenzenediazonium salt; 4-(dimethylamino)benzene diazonium salt; 4-nitrobenzene diazonium salt; 4-trifluoromethylbenzene diazonium salt, and/or variants and/or combinations thereof. As used herein, the term "variants" refer to compounds as described herein with varied substituent positions. For example, the variants of 4-tert-butylbenzene diazonium salt may include, but are not limited to, 2-tert-butylbenzene diazonium salt; 2,3-tert-butylbenzene diazonium salt; and 3,4,5-tert-butylbenzene diazonium salt.

The present disclosure is not limited to the combinations of elements of a FIB exemplified herein. For example, the various anodes and cathodes disclosed herein can be combined with other components for various batteries. For example, any electrolyte suitable for a FIB can be used in combination with the anodes and cathodes disclosed herein. Liquid electrolyte salts suitable for a FIB may contain complex cations in combination with the fluoride anion. The cation may feature organic groups, such as alkylammmonium, alkylphosphonium or alkylsulfonium species, or may consist of metal-organic or metal-coordination complex motifs, such as metallocenium species. Useful solvents for such liquid electrolyte salts may include non-aqueous solvents (denoted here as "organic") that are capable of dissolving the aforementioned fluoride salts to molar concentrations of 0.01 M and above, preferred concentrations being between 0.1 and 3 M. Examples of such solvents include acetone, acetonitrile, benzonitrile, 4-fluorobenzonitrile, pentafluorobenzonitrile, triethylamine (TEA), diisopropylethylamine, 1,2-dimethoxyethane, ethylene carbonate, propylene carbonate (PC), γ-butyrolactone, dimethyl carbonate, diethyl carbonate (DEC), methyl ethyl carbonate, propyl methyl carbonate, tetrahydrofuran, 2-methyltetrahydrofuran, nitromethane, benzene, toluene, chloroform, dichloromethane, 1,2-dichloroethane, dimethylsulfoxide, sulfolane, N,N-dimethylformamide (DMF), N,N-dimethylacetamide (DMA), carbon disulfide, ethyl acetate, methyl butyrate, n-propyl acetate, methyl propionate, methyl formate, 4-methyl-1,3,-dioxolane, pyridine, methyl isobutyl ketone, methyl ethyl ketone, hexamethylphosphoramide, hexamethylphosphorus triamide, 1 methyl-2-pyrrolidinone, 2-methoxyethyl acetate, trimethyl borate, triethylborate and substituted derivatives thereof, as well as sulfones such as ethylmethylsulfone, trimethylene sulfone, 1-methyltrimethylene sulfone, ethyl-sec-butyl sulfone, ethyl isopropyl sulfone (EIPS), 3,3,3-trifluoropropylmethyl sulfone, 2,2,2-trifluoroethyl sulfone, bis(2,2,2-trifluoroethyl)ether (BTFE), glymes (e.g., diglyme, tetraglyme), 1,2-dimethoxyethane (DME) and mixtures thereof. In certain embodiments, room temperature ionic liquid materials, or ionic liquids that remain liquid at temperatures below 200 degrees Celsius (such as those described in "Electrochemical Aspects of Ionic Liquids", E. Ohno ed., Wiley Interscience, New York, 2005), can be utilized. These can include ionic liquids that remain liquid at temperatures below 100 degrees Celsius such as 1-methyl,1-propylpiperidinium bis(trifluoromethanesulfonyl)imide (MPPTFSI), butyltrimethylammonium bis(trifluoromethanesulfonyl)imide (BTMATFSI) and 1-butyl,1-methylpyrrolidinium bis(trifluoromethanesulfonyl)imide (BMPTFSI) and their fluoroalkylphosphate (FAP) anion derivatives (e.g. MPPFAP) where FAP is a hydrophobic anion such as tris(pentafluoroethyl)trifluorophosphate, all of which alone or in combination are useful solvents.

In some embodiments, the electrolytes suitable for a FIB can include the compositions disclosed above with the addition of a fluoride-ion complexing species such as an anion receptor, a cation complexing species such as a crown ether, or a combination of both. Suitable anion receptors include species capable of binding fluoride anion such as boron, aluminum, ammonium, H-bond donor or similar groups, including aza ethers and alkyl and aryl boron and boronate complexes such as those described in McBreen et al, J. Power Sources, 2000, 89, 163 and West et al., J. Electrochem. Soc., 154, A929 (2007), and boroxin species such as those described in Nair et al., J. Phys. Chem. A, 113, 5918 (2009), all of which are incorporated by reference herein. In particular tris(hexafluoroisopropyl)borate, tris (pentafluorophenyl)borane and all possible regioisomers of difluorophenyl boroxin (DFB), trifluorophenyl boroxin, bis (trifluoromethyl)phenyl boroxin, trifluoromethyl)phenyl boroxin and fluoro(trifluoromethyl)phenyl boroxin can be used.

Figure 6:
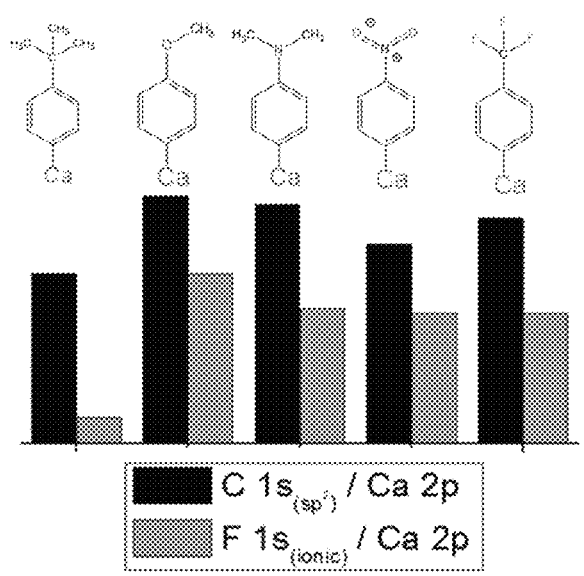
FIG. 6 outlines ratios between carbon atoms in a phenyl ring of diazonium molecules and calcium atoms from the electrode (i.e. C/Ca ratio) and ratios between fluoride ions in diazonium salt and calcium atom from the electrode (i.e. F/Ca ratio) according to some aspects of the present disclosure.

According to some aspects, the present disclosure is directed to a specialized anode for fluoride ion batteries comprising a metal (e.g., Ce, La, and Ca) as active anode material with a solid electrolyte interphase (SEI) layer on a surface of the anode. In some embodiments, the SEI layer can comprise a fluorinated compound. According to some aspects, as illustrated in FIG. 6, the layer on the surface of the anode is has various properties dependent upon properties of the compounds within the layer. In some embodiments, the SEI layer can comprise a chemical compound that is stable on the surface of the anode, for example, a reaction forming a covalent between a diazonium salt and a surface of the anode (FIG. 5), the diazonium salt having the structure of formula I:

Formula I wherein X can be, for example, —C(CH₃)₃, —OCH₃, —NMe₂, —NO₂, or —CF₃.

As used herein, the terms "uniform", "uniform size", and "uniform shape" are defined as remaining the same in all cases and at all times; unchanging in form or character; provided the same reactants and same reaction conditions, with minimal or defined variation. An aspect ratio of a shape defined as the ratio of the length to the width or the ratio of the length to the height, a sphere having an aspect ratio of 1, with deviations from spherical shape demonstrated by an aspect ratio, either length/width or length/height, other than 1. The aspect ratio of the shapes described herein can be about 1±90%, 1±80%, 1±70%, 1±60%, 1±50%, 1±40%, 1±30%, 1±20%, 1±10%, 1±5%, 1±2.5, or 1±1%.

As used herein, the term "catalyst" refers to a component that directs, provokes, or speeds up a chemical reaction, for example, the reactions of an electrochemical cell.

The present disclosure is also directed to systems or devices comprising the components, electrolytes, and nanostructures prepared according to the methods described herein. The present disclosure is also directed to methods of using the batteries and components prepared according to the methods described herein.

Using a simple yet robust liquid electrolyte with high fluoride ion conductivity and wide voltage window, the embodiments and examples disclosed herein demonstrate reversible electrochemical cycling of metal fluoride electrodes at room temperature whereby $F^-$, not the metal cation, is the active ion shuttle. These examples and results enable a FIB to operate at room temperature.

The terms "fluoride shuttle battery", "fluoride ion battery", "fluoride ion electrochemical cell", and "FIB" are interchangeable in the current disclosure.

As used herein, the term "about" is defined to being close to as understood by one of ordinary skill in the art. In one non-limiting embodiment, the term "about" is defined to be within 10%, preferably within 5%, more preferably within 1%, and most preferably within 0.5%.

An "inert atmosphere" refers to a gaseous mixture that contains little or no oxygen and comprises inert or non-reactive gases or gases that have a high threshold before they react. An inert atmosphere may be, but is not limited to, molecular nitrogen or an inert gas, such as argon, or mixtures thereof. Examples of inert gases useful according to the present disclosure include, but are not limited to, gases comprising helium (He), radon (Rd), neon (Ne), argon (Ar), xenon (Xe), nitrogen (N), and combinations thereof.

A "reducing agent" is a substance that causes the reduction of another substance, while it itself is oxidized. Reduction refers to a gain of electron(s) by a chemical species, and oxidation refers to a loss of electron(s) by a chemical species.

A "metal salt" is an ionic complex wherein the cation(s) is(are) a positively charged metal ion(s) and the anion(s) is(are) a negatively charged ion(s). "Cation" refers to a positively charged ion, and "anion" refers to a negatively charged ion. In a "metal salt" according to the present disclosure, the anion may be any negatively charged chemical species. Metals in metal salts according to the present disclosure may include but are not limited to alkali metal salts, alkaline earth metal salts, transition metal salts, aluminum salts, or post-transition metal salts, and hydrates thereof.

"Alkali metal salts" are metal salts in which the metal ions are alkali metal ions, or metals in Group I of the periodic table of the elements, such as lithium, sodium, potassium, rubidium, cesium, or francium.

"Alkaline earth metal salts" are metal salts in which the metal ions are alkaline earth metal ions, or metals in Group II of the periodic table of the elements, such as beryllium, magnesium, calcium, strontium, barium, or radium.

"Transition metal salts" are metal salts in which the metal ions are transition metal ions, or metals in the d-block of the periodic table of the elements, including the lanthanide and actinide series. Transition metal salts include, but are not limited to, salts of scandium, titanium, vanadium, chromium, manganese, iron, cobalt, nickel, copper, zinc, yttrium, zirconium, niobium, molybdenum, technetium, ruthenium, rhodium, palladium, silver, cadmium, lanthanum, cerium, praseodymium, neodymium, promethium, samarium, europium, gadolinium, terbium, dysprosium, holmium, erbium, thulium, ytterbium, lutetium, hafnium, tantalum, tungsten, rhenium, osmium, iridium, platinum, gold, mercury, actinium, thorium, protactinium, uranium, *neptunium*, plutonium, americium, curium, berkelium, californium, einsteinium, fermium, mendelevium, nobelium, and lawrencium.

"Post-transition metal salts" are metal salts in which the metal ions are post-transition metal ions, such as gallium, indium, tin, thallium, lead, bismuth, or polonium.

A "halide salt" is an ionic complex in which the anion(s) is(are) halide ion(s), including but not limited to fluoride ion(s), chloride ion(s), bromide ion(s), and iodide ion(s). A "fluoride salt" is an ionic complex in which the anion(s) is(are) fluoride ion(s). According to the present disclosure, the cation of the halide salt or the fluoride salt may be any positively charged chemical species.

A "metal fluoride" is an ionic complex in which the cation is one or more metal ion(s) and the anion(s) is(are) fluoride ion(s). According to some aspects of the present disclosure, the metal salt(s) and the fluoride salt react to create a metal fluoride shell around the metal nanoparticle core. Similarly, a "metal halide" is an ionic complex in which the cation is one or more metal ion(s) and the anion(s) is(are) halide ion(s).

A "fluoride-containing" salt is an ionic complex in which the anion(s) contain fluoride ion but are not limited to being solely fluoride. Instead, "fluoride-containing" salts include ionic complexes where the anion(s) contain fluoride itself in complex with other ions or atoms. "Fluoride-containing" salts suitable for use in aspects of the present disclosure include those known to persons of ordinary skill in the art, including, but not limited to, fluoride salts, non-metal fluoroanions such as tetrafluoroborate salts and hexafluorophosphate salts, and oxyfluoride salts. In some aspects of the present disclosure, the fluoride-containing salts may include quaternary ammonium fluorides and fluorinated organic compounds. According to some aspects of the present disclosure, the metal salt and the fluoride-containing salt react to create a fluoride-containing shell around the metal nanoparticle core.

The term "electrode" refers to an electrical conductor where ions and electrons are exchanged with an electrolyte and an outer circuit. "Positive electrode" and "cathode" are used synonymously in the present description and refer to the electrode having the higher electrode potential in an electrochemical cell (i.e. higher than the negative electrode). "Negative electrode" and "anode" are used synonymously in the present description and refer to the electrode having the lower electrode potential in an electrochemical cell (i.e. lower than the positive electrode). Cathodic reduction refers to a gain of electron(s) of a chemical species, and anodic oxidation refers to the loss of electron(s) of a chemical species. Positive and negative electrodes of the present invention may be provided in a range of useful configurations and form factors as known in the art of electrochemistry and battery science, including thin electrode designs, such as thin film electrode configurations.

The term "electrochemical cell" refers to devices and/or device components that convert chemical energy into electrical energy or vice versa. Electrochemical cells have two or more electrodes (e.g., positive and negative electrodes) and an electrolyte, wherein electrode reactions occurring at the electrode surfaces result in charge transfer processes.

Electrochemical cells include, but are not limited to, primary batteries, secondary batteries, and electrolysis systems.

The term "electrolyte" refers to an ionic conductor which can be in the solid state, the liquid state (most common), or more rarely a gas (e.g., plasma).

The term "anhydrous" refers to compositions, including salts such as fluoride salts, that are substantially free of water. In an embodiment, for example, anhydrous fluoride salts are provided that are characterized by an amount of water less than 1000 parts per million (ppm) and in some embodiments less than 100 parts per million (ppm). In an embodiment, for example, methods of making fluoride ion containing solutions are provided, where a fluoride salt as disclosed herein is provided in an anhydrous form and at least partially dissolved into one or more non-aqueous solutions.

The term "Carbon in the p-position" or "p-carbon" refers to a carbon atom one removed from an atom, group, functional group, or other moiety of interest. In certain embodiments, the functional group of interest is a quaternary alkylammonium functional group and the p-carbon is the second carbon from the alkylammonium functional group.

As will be appreciated, fluoride ion batteries are suitable for a wide range of primary or rechargeable applications, including but not limited to vehicle traction batteries (electric vehicles (EV), hybrid vehicles (HEV), and plug-in hybrid (PHEV)) or vehicle starter or ignition batteries. FIB systems can be useful stationary batteries for emergency power, local energy storage, starter or ignition, remote relay stations, communication base stations, uninterruptible power supplies (UPS), spinning reserve, peak shaving, or load leveling, or other electric grid electric storage or optimization applications. Small format or miniature battery applications including watch batteries, implanted medical device batteries, or sensing and monitoring system batteries (including gas or electric metering) are contemplated, as are other portable applications such as flashlights, toys, power tools, portable radio and television, mobile phones, camcorders, lap-top, tablet or hand-held computers, portable instruments, cordless devices, wireless peripherals, or emergency beacons. Military or extreme environment applications, including use in satellites, munitions, robots, unmanned aerial vehicles, or for military emergency power or communications are also possible.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

The examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, dimensions, etc.) but some experimental errors and deviations should be accounted for.

Moreover, all references throughout this application, for example patent documents including issued or granted patents or equivalents; patent application publications; and non-patent literature documents or other source material; are hereby incorporated by reference herein in their entireties, as though individually incorporated by reference.

This detailed description uses examples to present the disclosure, including the preferred aspects and variations, and also to enable any person skilled in the art to practice the disclosed aspects, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference. Moreover, nothing disclosed herein is intended to be dedicated to the public.

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C.

As used herein, the terms "highly pure" and "high purity" are defined as about 98-100%, 99-100%, 99.9-100%, 99.99-100%, or 99.999%-100% pure.

Herein, the recitation of numerical ranges by endpoints (e.g. 50 mg to 600 mg, between about 100 and 500° C., between about 1 minute and 60 minutes) include all numbers subsumed within that range, for example, between about 20 minutes and 40 minutes includes 21, 22, 23, and 24 minutes as endpoints within the specified range. Thus, for example, ranges 22-36, 25-32, 23-29, etc. are also ranges with endpoints subsumed within the range 20-40 depending on the starting materials used, specific applications, specific embodiments, or limitations of the claims if needed. The Examples and methods disclosed herein demonstrate the recited ranges subsume every point within the ranges because different results or products can be derived after changing one or more reaction parameters. Further, the methods and Examples disclosed herein describe various aspects of the disclosed ranges and the effects if the ranges are changed individually or in combination with other recited ranges.

EXAMPLES

All compounds and solvents were purchased from Sigma-Aldrich, Alfa Aesar, TCI (Tokyo Chemical Industry Co., Ltd.) America, Strem, and/or Fisher and used as-received. NMR solvents were purchased from Cambridge Isotope Laboratories, Inc. Anhydrous diethyl ether was obtained via elution through a solvent column drying system and degassed with argon prior to use. Solvents used for solvent screening and electrolyte formulations with dry fluoride salts were dried over 4 Å (angstrom) molecular sieves in either a dry room or an argon filled glovebox. $H_2O$ content (ppm) was monitored via Karl Fisher titration until solvents were anhydrous ($H_2O \leq 16$ ppm). Electrode materials used included: bismuth foil (Alfa Aesar, 1 mm thick, 99.999%), lead foil (Alfa Aesar, 0.1 mm thick, 99.998%), cerium foil (Alfa Aesar, 0.62 mm thick, 99.9%), calcium foil (American Elements, 2 mm thick, 99.9%), Super P carbon black (SP; MTI Corporation, TIMCAL Graphite & carbon Super P, Conductive carbon black), and poly(vinylidene fluoride) (PVDF; Alfa Aesar).

Example 1: Fluoride Salt Synthesis ($Np_1F$, Two Steps)

Trimethylneopentylammonium iodide was prepared from the addition of potassium carbonate (94.1 g, 681 mmol, 2.67 eq) to a 1 L Erlenmeyer flask containing a magnetically stirred solution of methyl iodide (51 mL, 819 mmol, 3.21 eq) and neopentylamine (30 mL, 255 mmol, 1.0 eq) in absolute ethanol (400 mL). After magnetic stirring at room temperature for 21 hours, the mixture was suspended in ethanol (1.25 L), filtered, and the solvent was removed in vacuo. The resulting solid was then suspended in dichloromethane (4 L) and filtered. Solvent was again removed in vacuo and the solid recrystallized from isopropanol (450 mL). The resulting crystals contained 1.6 mol % isopropanol via $^1H$ NMR. Removal of this trace solvent was accomplished by dissolving in water (55 mL) and washing with hexane (3×50 mL). Drying in vacuo yielded 48.53 g of white solid (74%). $^1H$-NMR (300 MHz, $CD_3CN$) δ 3.38 (2H, s, $N^+CH_2C(CH_3)_3$), 3.21 (9H, s, $N^+(CH_3)_3$), 1.17 (9H, s, $N^+CH_2C(CH_3)_3$). $^{13}C$-NMR (126 MHz, $CDCl_3$) δ 76.71, 56.03, 33.73, 30.16. HRMS (EI) calculated for $C_8H_{20}N$ [H$^+$] is 130.16. found m/z: 130.1596.

Figure 17A:
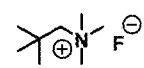
FIG. 17A shows a $^1H$ NMR (nuclear magnetic resonance) spectrum of trimethylneopentylammonium fluoride ($Np_1F$). $^1H$ NMR (400 MHz, $CD_3CN$) δ 3.34 (2H, s, $N^+CH_2C(CH_3)_3$), 3.26 (9H, s, $N^+(CH_3)_3$), 1.18 (9H, s, $N^+CH_2C(CH_3)_3$).
Figure 17A:
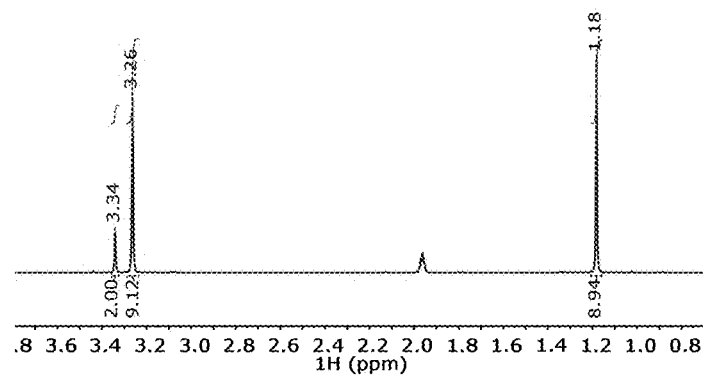
Figure 17B:
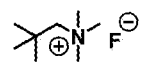
FIG. 17B shows a $^9F$ NMR spectrum of trimethylneopentylammonium fluoride ($Np_1F$). $^{19}F$ NMR (376 MHz, $CD_3CN$) δ −74.29 (s, $F^-$), −147.00 (t, $DF_2^-$).
Figure 17B:
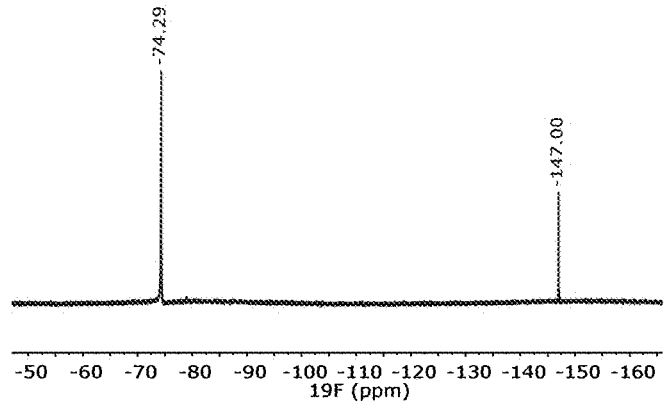

Trimethylneopentylammonium fluoride was prepared using a procedure adapted from the literature. Silver oxide (14.559 g, 62.8 mmol, 1.5 eq) was added to a solution of trimethylneopentylammonium iodide (10.772 g, 41.9 mmol, 1 eq) in deionized water (225 mL) in an aluminum foil covered 500 mL round bottom flask. After stirring for 1 hour, ion-exchange of iodide for hydroxide was quantitatively achieved, as evidenced by the lack of precipitate upon aliquot addition to a solution of silver nitrate in concentrated hydrochloric acid. The suspension was filtered and immediately titrated with aqueous hydrofluoric acid (0.5 wt %). HF was added dropwise and the titration stopped at pH 7.96 (calc. endpt=8.08). Most of the water was removed under reduced pressure at 60° C. The solution was further dried by azeotrope with bench-grade isopropanol (×3) at 35° C. To remove trace silver residue, the solution was filtered (25 mm wheel filter, 0.45 μm PTFE membrane). The solution was transferred into a side arm round bottom flask, and the residual water was removed by azeotrope with dry isopropanol (×5) under high vacuum (~50 mTorr) at 100° C. for five days until $Np_1F$ remained as a white powder, whose F$^-$ singlet peak appears downfield from −75 ppm (versus $DF_2$ normalized to −147 ppm) via $^{19}F$ NMR. $^1H$-NMR (400 MHz, $CD_3CN$) δ 3.34 (2H, s, $N^+CH_2C(CH_3)_3$), 3.26 (9H, s, $N^+(CH_3)_3$), 1.18 (9H, s, $N^+CH_2C(CH_3)_3$). $^{13}C$-NMR (100 MHz, $CD_3CN$) δ 76.35, 54.96, 33.41, 29.65. $^{19}F$-NMR (376 MHz, $CD_3CN$) δ −74.29 (s, F$^-$), −147.00 (t, $DF_2^-$). $^1H$ NMR and $^{19}F$ NMR spectra are shown in FIG. 17A and FIG. 17B.

Example 2: Fluoride Salt Synthesis ($Np_2F$, Five Steps)

N-(2,2-dimethylpropyl)-2,2-dimethylpropanamide was prepared. A 100 mL round bottom flask equipped with a stir bar was charged with neopentylamine (10 mL, 85.5 mmol, 1.23 eq.), triethylamine (12 mL, 85.5 mmol, 1.23 eq.), and chloroform (70 mL), and cooled to 0° C. Pivaloyl chloride (8.6 mL, 69.5 mmol, 1 eq.) was added drop wise and the resulting solution refluxed (70° C.) for 4 hr. Upon cooling to room temperature, the organic layer was rinsed with deionized water (3×), brine (1×), dried over sodium sulfate, and filtered. The solvent was removed in vacuo to yield an orange solid (11.4 g, 96% yield). $^1H$-NMR (300 MHz, $CDCl_3$, 20° C.) δ 5.66 (1H, bs, O=CNH), 3.05 (2H, d, $NCH_2C(CH_3)_3$), 1.21 (9H, s, $O=CC(CH_3)_3$), 0.90 (9H, s, $NCH_2C(CH_3)_3$). $^{13}C$-NMR (126 MHz, $CDCl_3$) δ 178.32, 50.32, 38.93, 32.09, 27.77, 27.26. HRMS (EI) calcd. for $C_{10}H_{21}NO$ [H$^+$] is 172.2882. found m/z: 172.1700.

N-(2,2-dimethylpropyl)-2,2-dimethylpropan-1-amine was prepared. In a flame-dried, three-neck flask equipped with a stir bar, lithium aluminum hydride (6.919 g, 182 mmol, 1.5 eq) was suspended in a 5:6 (vol) diethyl ether: dibutyl ether mixture (220 mL) and cooled to 0° C. N-(2,2-dimethylpropyl)-2,2-dimethylpropanamide (20.701 g, 121 mmol, 1.0 eq) was added to the flask and stirred for 30 minutes. The solution was then refluxed for 42 h (120° C.). The mixture was cooled to room temperature, quenched with deionized water, and filtered. The filtrate was treated with concentrated hydrochloric acid until acidic, and water (400 mL) was added to fully dissolve the solid. The water layer was washed with diethyl ether (3×250 mL), treated with concentrated sodium hydroxide solution until basic, and extracted with diethyl ether (3×100 mL). The organic layer was dried over sodium sulfate, filtered, and the solvent mostly removed at 40° C. (no vacuum; the amine is volatile). The resulting product was isolated as a slightly yellow clear ethereal solution (47.717 g, 36.1 wt %, 91% yield). $^1$H-NMR (500 MHz, CDCl$_3$) δ 2.37 (4H, s, N(CH$_2$C(CH$_3$)$_3$)$_2$), 0.94 (18H, s, N(CH$_2$C(CH$_3$)$_3$)$_2$). $^{13}$C-NMR (126 MHz, CDCl$_3$) δ 63.53, 31.96, 27.76. HRMS (EI) calcd. for C$_{10}$H$_{23}$N [H$^+$] is 158.18. found m/z: 158.1908.

N-(2,2-dimethylpropyl)-N,2,2-trimethylpropan-1-amine was prepared. The ethereal solution of N-(2,2-dimethylpropyl)-2,2-dimethylpropan-1-amine (16.1 g in diethyl ether (36.1 wt %), 112 mmol, 1 eq) was cooled to 0° C. and formic acid (11.2 mL, 297 mmol, 2.65 eq) was added dropwise. Formaldehyde [8.50 mL (aq. 37 wt %), 145 mmol, 1.30 eq.] was added and the mixture refluxed at 60° C. for 22 h. Concentrated hydrochloric acid was added until an acidic pH was reached. The solvent was removed in vacuo at 55° C., yielding a peach-colored solution. Concentrated sodium hydroxide solution was added until a basic pH was reached. The aqueous layer was extracted with diethyl ether (3×150 mL). The organic layer was dried over sodium sulfate, filtered, and the solvent mostly removed at 50° C. (no vacuum; the amine is volatile). The resulting product was isolated as a slightly yellow clear ethereal solution (27.454 g, 64.1 wt %, 98% yield). Characterization information was found to correlate with literature values (28). $^1$H-NMR (300 MHz, CDCl$_3$, 20° C.) δ 2.30 (3H, s, NCH$_3$), 2.19 (4H, s, N(CH$_2$C(CH$_3$)$_3$)$_2$), 0.88 (18H, s, N(CH$_2$C(CH$_3$)$_3$)$_2$). $^{13}$C-NMR (126 MHz, CDCl$_3$) δ 74.68, 48.25, 33.51, 28.91. HRMS (EI) calcd. for C$_{11}$H$_{25}$N [H$^+$] is 172.2065. found m/z: 172.2072.

Dimethyldineopentylammonium iodide was prepared from a procedure adapted from the literature. A solution of N-(2,2-dimethylpropyl)-N,2,2-trimethylpropan-1-amine in Et$_2$O (64 mass %, 17.07 g, 99.6 mmol, 1 eq), methyl iodide (19 mL, 305 mmol, 3.1 eq), and acetonitrile (85 mL) were added to a 500 mL round bottom flask equipped with a stir bar and refluxed for 5 days. The solvent was then removed in vacuo at 45° C., and the product was recrystallized from isopropanol to yield 23.826 g off-white crystals (76% yield). $^1$H-NMR (300 MHz, CDCl$_3$) δ 3.67 (4H, s, N$^+$(CH$_2$C(CH$_3$)$_3$)$_2$), 3.47 (6H, s, N$^+$(CH$_3$)$_2$), 1.25 (18H, s, N$^+$(CH$_2$C(CH$_3$)$_3$)$_2$). $^{13}$C-NMR (126 MHz, CDCl$_3$) δ 77.50, 54.23, 34.07, 30.59. HRMS (EI) calcd. for C$_{12}$H$_{28}$N [H$^+$] is 186.22. found m/z: 186.2222.

Figure 18A:
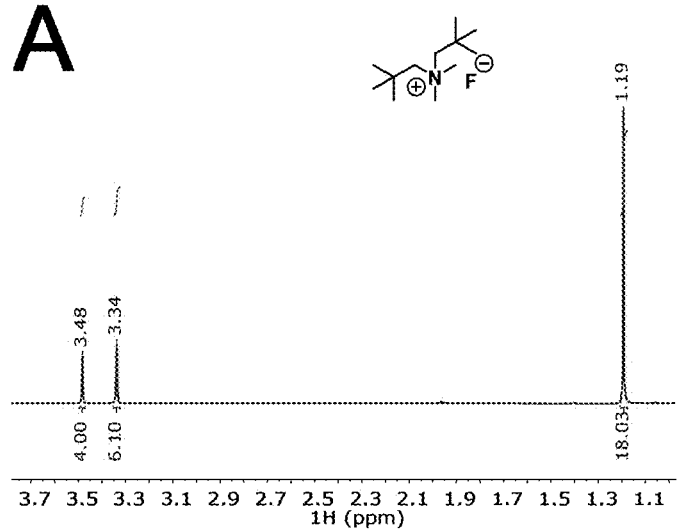
FIG. 18A and FIG. 18B show NMR spectra of dimethyldineopentylammonium fluoride ($Np_2F$).
Figure 18B:
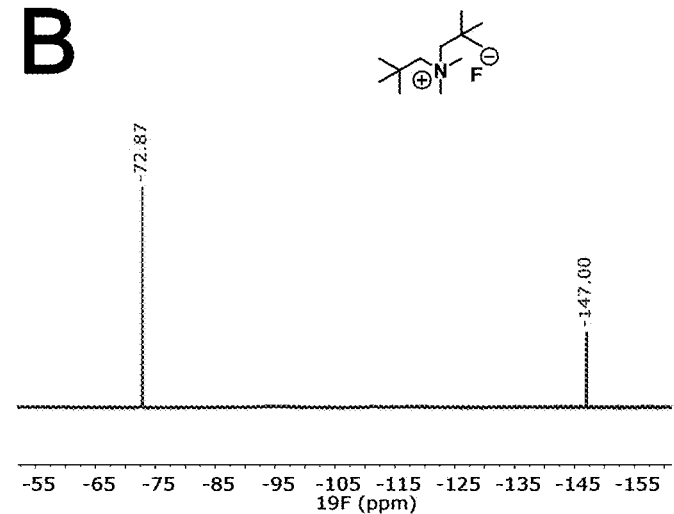

Dimethyldineopentylammonium fluoride was prepared from a procedure adapted from the literature. Silver oxide (24.616 g, 106 mmol, 1.5 eq) was added to a solution of the iodide salt (22.158 g, 70.7 mmol, 1 eq) in deionized water (330 mL) in an aluminum foil covered 500 mL round bottom flask. After stirring for 1 h, ion-exchange of iodide for hydroxide was quantitatively achieved, as evidenced by the lack of precipitate upon aliquot addition to a solution of silver nitrate in concentrated hydrochloric acid. The suspension was filtered and immediately titrated with aqueous hydrofluoric acid (0.5 wt %). HF was added dropwise and the titration stopped at pH 7.96 (calc. endpt.=8.08). Most of the water was removed under reduced pressure at 60° C. The solution was further dried by azeotrope with bench-grade isopropanol (×3) at 35° C. To remove trace silver residue, the solution was micron filtered (25 mm wheel filter, 0.45 μm PTFE membrane). The solution was transferred into a side arm round bottom flask, and the residual water was removed by azeotrope with dry isopropanol (×5) under high vacuum (~50 mTorr) at 100° C. for 5 days until a pale yellow powder remained, whose F$^-$ singlet peak appears downfield from −75 ppm (versus DF$_2^-$ normalized to −147 ppm) via $^{19}$F NMR. $^1$H-NMR (300 MHz, CD$_3$CN, 20° C.) δ 3.48 (4H, s, N$^+$(CH$_2$C(CH$_3$)$_3$)$_2$), 3.34 (6H, s, N$^+$(CH$_3$)$_2$), 1.19 (18H, s, N$^+$(CH$_2$C(CH$_3$)$_3$)$_2$). $^{13}$C-NMR (100 MHz, CD$_3$CN) δ 77.77, 53.77, 34.06, 30.20. $^{19}$F-NMR (282 MHz, CD$_3$CN, 20° C.) δ −72.87 (s, F$^-$), −147.00 (t, DF$_2^-$). $^1$H NMR and $^{19}$F NMR spectra are shown in FIG. 18A and in FIG. 18B.

Example 3: Electrode Fabrication

Copper Nanoparticle Synthesis: Hydrazine hydrate (50-60%, 3 mL, 17.66 M) was added to a stirring solution of hexadecyltrimethylammonium bromide (CTAB) (0.68 g, 1.87 mmol) and citric acid monohydrate (0.08 g, 0.38 mmol) in deionized water (75 mL) under argon at 23° C. The solution was allowed to age for 20 minutes under argon. Ammonium hydroxide (0.5 mL, 14.5 M) was added to a solution of copper (II) nitrate hemipentahydrate (0.465 g, 2 mmol) and CTAB (0.68 g, 1.87 mmol) in deionized water (75 mL). The copper precursor solution was immediately poured into the hydrazine solution and this mixture was stirred under argon for 2 hours. Copper nanoparticles were isolated via centrifuge (12,000 rpm, 5 min). The supernatant was discarded and the copper nanoparticles were washed with ethanol (10 mL) twice. The product identity was confirmed via pXRD as is shown in FIG. 19A. The copper nanoparticles have ~50 nm diameter, as determined via TEM imaging as shown in FIG. 19B.

Cu@LaF$_3$ Core-Shell Nanoparticle Synthesis: Copper nanoparticles were prepared as described above. Once copper nanoparticles were isolated via centrifuge (12,000 rpm, 5 min), the supernatant discarded, and the copper nanoparticles washed with water (30 mL) twice, the Cu nanoparticles were re-dispersed in deionized water (150 mL) and stirred under argon. Hydrazine hydrate (50-60%, 3 mL, 17.66 M) was added to the Cu nanoparticles and stirred for 10 minutes. Both a solution of lanthanum nitrate hexahydrate (0.433 g, 1 mmol) in water (15 mL), and a solution of sodium fluoride (0.042 g, 1 mmol) in water (15 mL) were simultaneously injected into the copper nanoparticle solution over a period of 5 minutes via syringe pump (3 mL/min). The mixture was then stirred for an additional 10 minutes under argon. The core-shell material was isolated via centrifuge (12,000 rpm, 5 min.), the supernatant was discarded, and the remaining core-shell nanoparticles were washed with ethanol (10 mL) twice. Peaks corresponding to both LaF$_3$ and metallic copper were exhibited by pXRD as is shown in FIG. 19C. Core-shell product identity was confirmed via ICP-MS of the powder (Cu:La:F [atomic %]=77.5:6.8:15.7), EDX micro analysis (Cu:La:F [at %]=94.7:1.6:3.7), and EDS elemental mapping (Cu:La:F [at %]=94.7:1.6:3.7). The copper core has a 50 nm diameter with a 5 nm-thick LaF$_3$ shell, as determined via TEM imaging as shown in FIG. 19D. The TEM image of pristine core-shell nanoparticles shown in FIG. 19D has an inset (lower right inset) which shows a high-resolution TEM (HR-TEM) image of the thin LaF$_3$ shell encasing the thicker Cu core.

Cu—LaF$_3$ Thin-Film Preparation: 80 nm of copper (Cu sputtering target) was deposited onto a 5×20 mm area, 1 mm thick glassy carbon (GC) substrate via DC sputtering: 100 W; 3 mTorr; 63 A/min sputtering rate. The Cu-coated substrate remained in the chamber to cool down. Then, 4.5 nm of lanthanum fluoride (LaF$_3$ sputtering target) was deposited on top of the copper thin-film via RF sputtering: 100 W; 3 mTorr; 10 Å/min (angstroms per minute) sputtering rate. The coated substrate was then cut into 5×5 mm strips for electrochemical testing. Results from electrochemical testing and XPS are shown in FIG. 20A, FIG. 20B, FIG. 20C, FIG. 20D, and FIG. 20E.

Figure 20A:
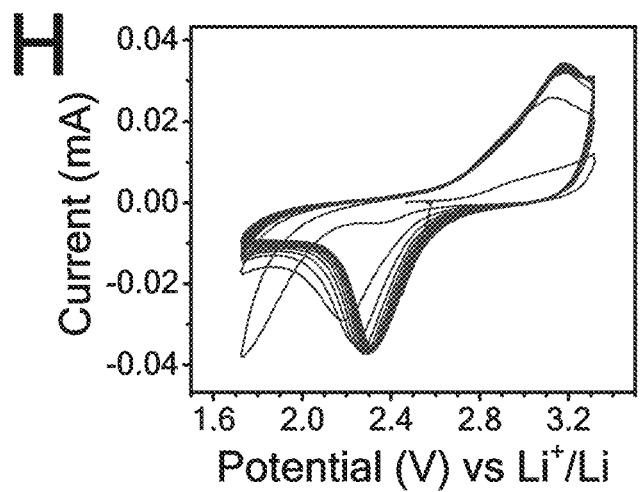
FIG. 20A shows a cyclic voltammogram of a $Cu-LaF_3$ thin-film electrode in 0.1 M TMAF/MPPy-TFSI, for 10 cycles, acquired during characterization of $Cu@LaF_3$ core-shell cathode materials and their electrochemical cycling at room temperature.
Figure 20B:
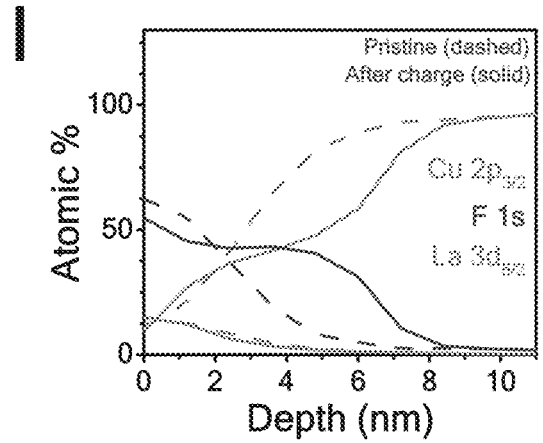
FIG. 20B is an overlay of FIGS. D and E and shows X-ray photoelectron spectroscopy (XPS) depth profiles (nm) for $Cu-LaF_3$ thin-film electrodes in pristine condition (dash) and after charge (solid) at stages during charge characterization of $Cu@LaF_3$ core-shell cathode materials and their electrochemical cycling at room temperature.
Figure 20C:
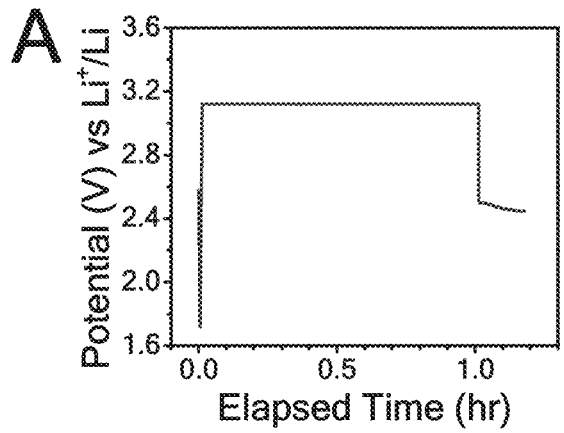
FIG. 20C shows a one-hour potential hold (3.12 V) of a $Cu-LaF_3$ thin-film electrode in 0.1 M TMAF/MPPy-TFSI to ensure electrochemical fluorination.
Figure 20D:
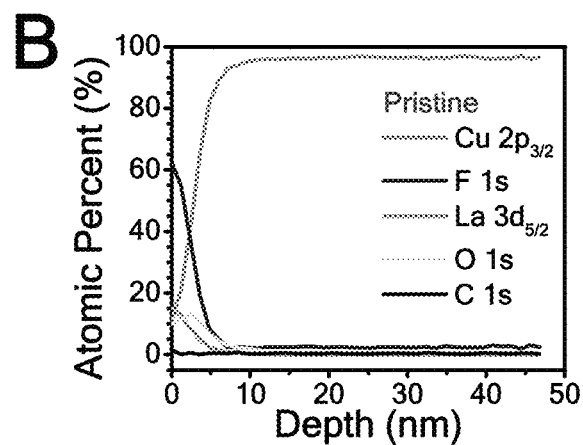
FIG. 20D shows an XPS depth profile of pristine $Cu-LaF_3$ thin-film electrode via x-ray photoelectron spectroscopy (XPS). An $Ar^+$ etching rate of 0.8 Å/sec. (angstroms per second) was utilized. The etch rate was used to convert etch time (seconds) to sample depth (nanometers).
Figure 20E:
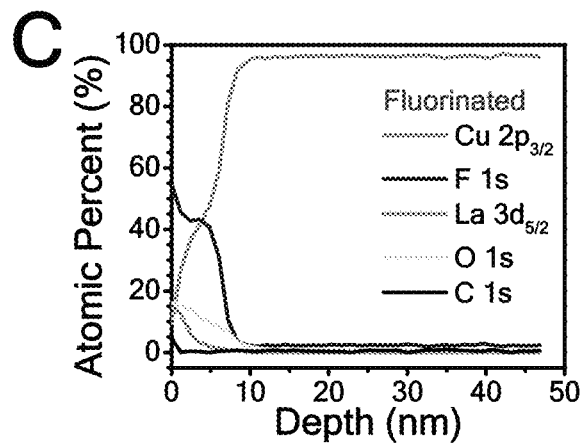
FIG. 20E shows an XPS depth profile of a fluorinated $Cu-LaF_3$ thin-film electrode via x-ray photoelectron spectroscopy (XPS). An $Ar^+$ etching rate of 0.8 Å/sec. (angstroms per second) was utilized. The etch rate was used to convert etch time (seconds) to sample depth (nanometers).

Thin film structures similar to the Cu@LaF$_3$ core-shell composition were prepared via sputter deposition onto glassy carbon to give 80 nm Cu core strata covered by a 4.5 nm film of LaF$_3$. Cyclic voltammetry was carried out as described in the main text. Similarly for the Cu@LaF$_3$ nanoparticle experiments, no Cu or La was detected in the electrolyte after cycling the thin film electrode. Maximum fluorination of the Cu layer was achieved by electrochemical cycling in liquid electrolyte followed by a potential hold (+3.12 V vs. Li$^+$/Li) for one hour to push the system towards complete conversion of Cu to CuF$_2$ (FIG. 20A and FIG. 20C). Pristine and fluorinated thin-films were analyzed via X-ray photoelectron spectroscopy (XPS), with Ar$^+$ etching/depth measurement. With optimization of the relative LaF$_3$ shell thickness and Cu core size, improved capacity utilization in liquid electrolyte can be achievable. Based on the observed diffusion length, Cu@LaF$_3$ nanoparticles with a 2 nm shell thickness and a 12 nm diameter core might allow for complete conversion of the Cu core to CuF$_2$ upon first charge, and much higher practical utilization of the material upon cycling. Additionally, the F$^-$ diffusion length could be improved further through the use of a more conductive shell material than LaF$_3$, for example PbSnF$_4$. [[PbSnF$_4$ not in claims]]

Electrode Fabrication: Bismuth foil, lead foil, cerium foil, and calcium foil were cut into thin strips for use in three-electrode cells. Copper nanoparticles or Cu@LaF$_3$ core-shell nanoparticles were made into a paste with PVDF and/or SP, pressed into stainless steel mesh, and dried under vacuum prior to three-electrode assembly. The Cu—LaF$_3$ thin-film was made as described above and assembled into a three-electrode cell.

Example 4: Electrochemical Testing

Electrolyte Ionic Conductivity Studies: Ionic conductivities for a number of anhydrous Np$_1$F and Np$_2$F solutions were investigated by AC impedance spectroscopy using a VersaSTAT potentiostat. Measurements were acquired between 100 mHz and 1 MHz using an air-free glass conductivity cell including a Teflon ring sealing the solution between two parallel Pt electrodes. The Pt electrodes are separated by ~1 cm, and the cell constant was determined before each experiment by measuring the conductivity of an aqueous potassium chloride (0.1M) solution. Thermal control was provided by a Tenney TUJR chamber, with the sample allowed to reach thermal equilibrium before measurement (as determined by observation of no change in the impedance spectrum over time).

Figure 21A:
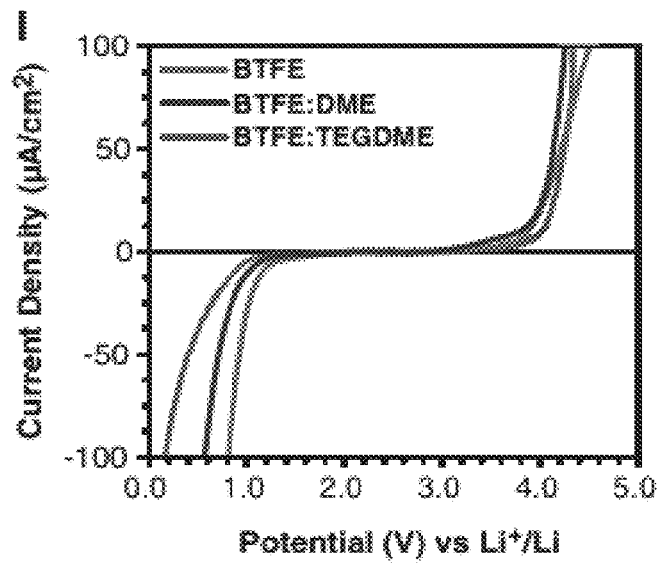
FIG. 21A is an overlay of FIGS. 21B-21D and shows linear sweep voltammograms for 0.75 M $Np_1F$ in neat BTFE, BTFE:DME (3:2 vol %), and BTFE:TEGDME (3:2 vol %) collected using a 1 mV/s scan rate (DME=1,2-dimethoxyethane; TEGDME=bis[2-(2-methoxyethoxy)ethyl] ether) acquired during measurements of physical and electrochemical properties of non-aqueous, fluoride-conducting liquid electrolytes (at 25° C.).
Figure 21B:
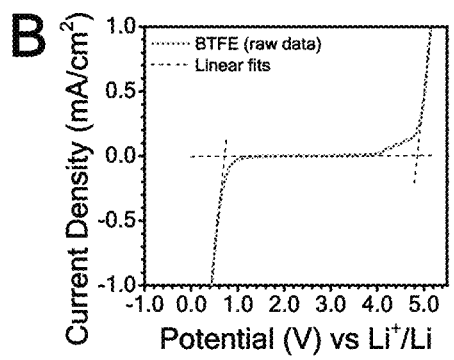
FIG. 21B shows linear sweep voltammograms for 0.75 M $Np_1F$ in neat BTFE. Linear regression analysis (dashed lines) of the linear portions of the raw LSV data is shown.
Figure 21C:
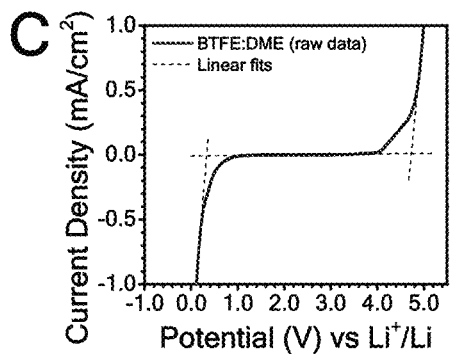
FIG. 21C shows linear sweep voltammograms for 0.75 M $Np_1F$ in BTFE:DME. Linear regression analysis (dashed lines) of the linear portions of the raw LSV data is shown.
Figure 21D:
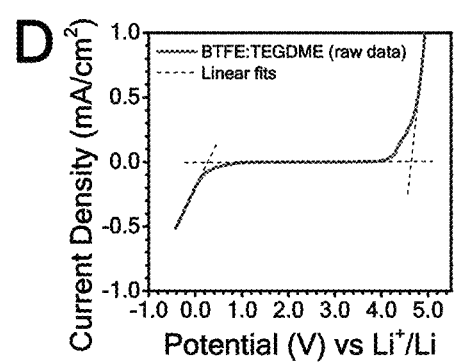
FIG. 21D shows linear sweep voltammograms for 0.75 M $Np_1F$ in BTFE:TEGDME. Linear regression analysis (dashed lines) of the linear portions of the raw LSV data is shown.

Electrolyte Voltage Window Determination: Fluoride electrolyte solutions were investigated by linear sweep voltammetry using a Bio-Logic VMP2 potentiostat to determine their electrochemical/voltage stability window using a 1 mV/s scan rate. A Pt working electrode, Pt auxiliary, and non-aqueous Ag*/Ag (MeCN) reference electrode, with Ar purge, were employed for these studies. Voltage windows were determined by two methods: (i) the $J_{cut-off}$ method, using a limiting current of 100 μA/cm$^2$ as shown in FIG. 21A, and (ii) the linear fit method, where voltage limits are defined as the intersection between linear fits of the I-V curves before and after the onset for electrolyte decomposition as is shown in FIG. 21B, FIG. 21C, and FIG. 21D. Table 1 summarizes below.

TABLE 1

Table of cathodic voltage limits, anodic voltage limits, and voltage windows determined for each electrolyte formulation using the $J_{cut-off}$ method or the linear fit method:

| | $J_{cut-off}$ = 100 μA/cm$^2$ | | | Linear Fit Method | | |
|---|---|---|---|---|---|---|
| Electrolyte | $V_{limit\ c}$ (vs Li$^+$/Li) | $V_{limit\ a}$ (vs Li$^+$/Li) | $V_{window}$ (vs Li$^+$/Li) | $V_{limit\ c}$ (vs Li$^+$/Li) | $V_{limit\ a}$ (vs Li$^+$/Li) | $V_{window}$ (vs Li$^+$/Li) |
| 0.75M Np$_1$F/BTFE | 0.81 | 4.50 | 3.69 | 0.72 | 4.86 | 4.14 |
| 0.75M Np$_1$F/BTFE:DME | 0.57 | 4.25 | 3.68 | 0.33 | 4.73 | 4.40 |
| 0.75M Np$_1$F/BTFE:TEGDME | 0.17 | 4.32 | 4.15 | 0.26 | 4.64 | 4.38 |

Figure 26:
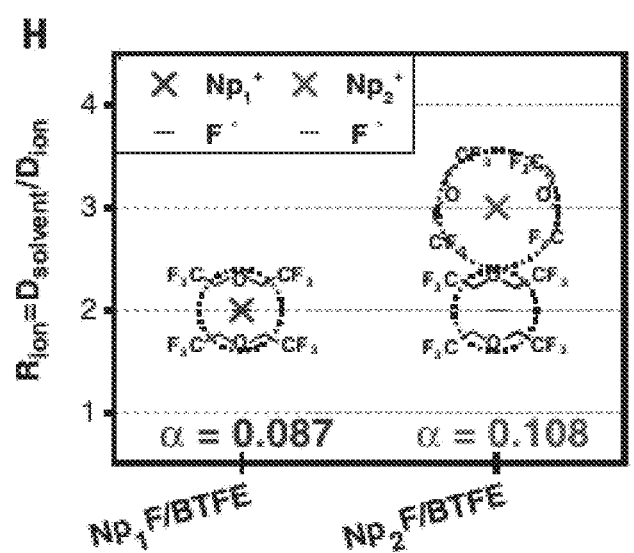
FIG. 26 shows Stokes radii ($R_{ion}$) for electrolyte ions in 0.75 M $Np_1F$/BTFE (left, $\alpha$=0.087) or 0.75 M $Np_2F$/BTFE (right, $\alpha$=0.108). The degree of ion dissociation ($\alpha$) is also shown (SD is ±0.003) as calculated during characterization of physical and electrochemical properties of non-aqueous, fluoride-conducting liquid electrolytes (25° C.).
Figure 27A:
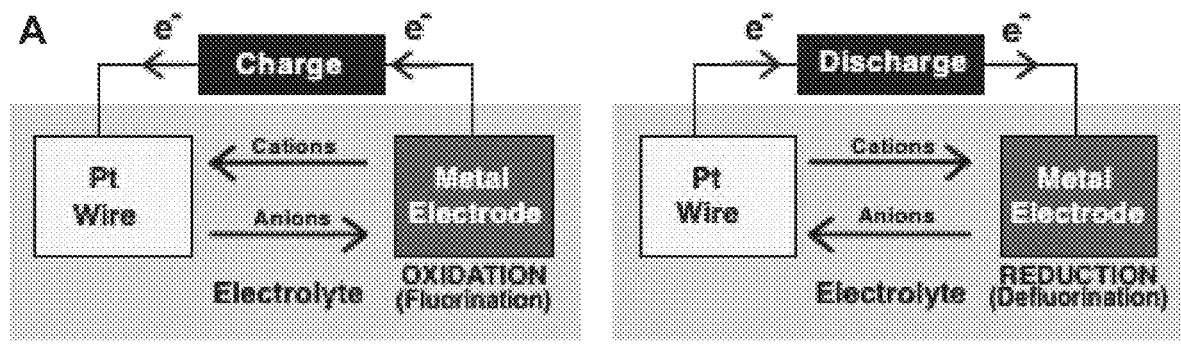
FIG. 27A shows a representative schematic of external electron flow, electrolyte ion shuttling, and redox reactions occurring at FIB electrodes during charge or discharge cycles.
Figure 27B:
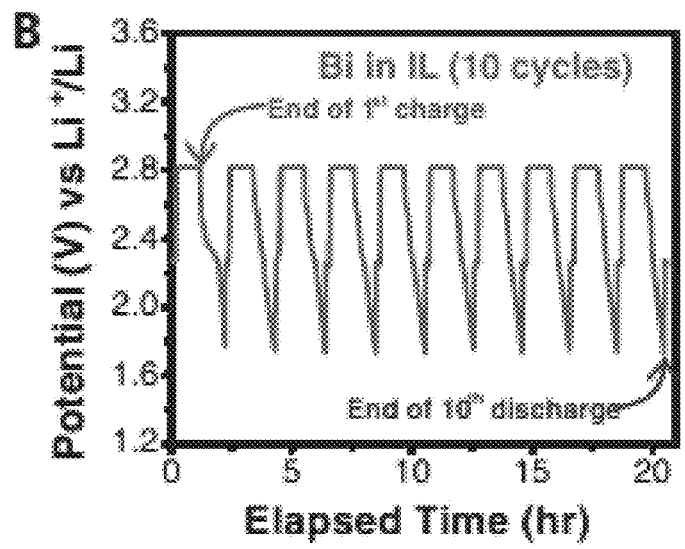
FIG. 27B shows room-temperature performance of metal electrode materials reversibly cycled in non-aqueous, $F^-$-conducting liquid electrolytes, electrochemical cycling data collected for Bi.
Figure 27C:
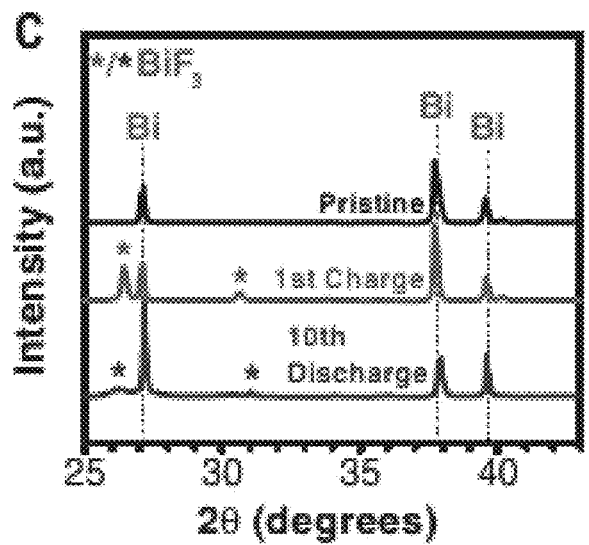
FIG. 27C shows room-temperature performance of metal electrode materials reversibly cycled in non-aqueous, $F^-$-conducting liquid electrolytes, powder X-ray diffraction (pXRD) patterns obtained for Bi.
Figure 27D:
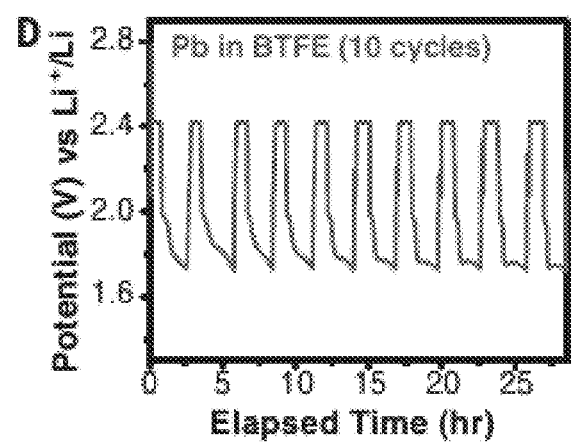
FIG. 27D shows room-temperature performance of metal electrode materials reversibly cycled in non-aqueous, $F^-$-conducting liquid electrolytes, electrochemical cycling data collected for Pb.
Figure 27E:
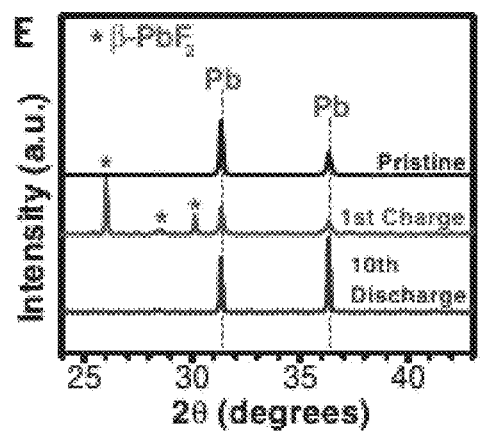
FIG. 27E shows room-temperature performance of metal electrode materials reversibly cycled in non-aqueous, $F^-$-conducting liquid electrolytes, powder X-ray diffraction (pXRD) patterns obtained for Pb.

In the case of "stable" solvents such as PN and BTFE (FIG. 24A) no HF$_2^-$ peaks are visible alongside the DF$_2^-$ observed, indicating that H/D exchange induced by trace protic solvent impurity does not occur on the NMR timescale. In FIG. 26, the $R_{ion}$ values represent the number of BTFE solvent molecules that diffuse per ionic species (either the Np$_1^+$ cation, Np$_2^+$ cation, or their respective F$^-$ counter-anions), and provide a qualitative picture of ion solvation spheres in these electrolytes. Rings are drawn around the data points with BTFE structures to illustrate the number of BTFE molecules surrounding and diffusing with each ion, to approximately depict the solvation spheres. In FIG. 21A, linear sweep voltammograms show smoothed data (via polynomial smoothing to raw data). See FIGS. 21B, 21C, and 21D for raw data with overlaid fits.

Example 5: Solid-Electrolyte Interphase (SEI) Formation 1H,1H,2H,2H-perfluorooctyltriethoxy-silane (FOTS; 0.25 M) was added to 0.75 M Np$_1$F/BTFE electrolyte. This solution mixture was used in a three-electrode set-up with a Ce or Ca working electrode, Pt wire counter electrode, and silver wire quasi-reference electrode.

TABLE 2

Summary of compositional information, electrochemical, testing parameters and ICP-MS results of example fluoride-ion electrochemical cells described:

| Battery Composition | Test Parameters | ICP-MS [indicated element] (μg) |
|---|---|---|
| WE: Bi foil (146.4 mg; 3 × 5 mm) CE: Pt wire RE: 0.01M AgOTf/MPPy-TFSI Electrolyte: 0.1M TMAF/MPPy-TFSI | Charge to: 2.82 V vs Li$^+$/Li 200 μA (1 hour cut off) Discharge to: 1.72 V vs LiVLi 50 μA (voltage cut off) | 463 [Bi] |
| WE: Pb foil (11.2 mg; 2 × 5 mm) CE: Pt wire RE: 0.01M AgOTf/MPPy-TFSI Electrolyte: 0.1M NpiF/BTFE | Charge to: 2.42 V vs Li$^+$/Li 300 μA (1 hour cut off) Discharge to: 1.72 V vs Li$^+$/Li 25 μA (voltage cut off) | 441 [Pb] |
| WE: Cu:PVDF (90:10; 4.55 mg) CE: Pt wire RE: 0.01M AgOTf/MPPy-TFSI Electrolyte: 1M Np$_1$F/BTFE | Charge to: 3.82 V vs Li$^+$/Li 10 μA (60 hours cut off; never reached 3.82 V) Discharge to: 1.92 V vs Li$^+$/Li (voltage cut off) | 180 [Cu] |
| WE: Cu@LaF$_3$:PVDF:SP (8:1:1; 5.62 mg) CE: Pt wire RE: 0.01M AgOTf/MPPy-TFSI Electrolyte: 1M Np$_1$F/BTFE | Charge to: 3.82 V vs Li$^+$/Li 10 μA (60 hours cut off; never reached 3.82 V) Discharge to: 1.92 V vs Li$^+$/Li 10 μA (voltage cut off) Note: only 7 cycles were obtained due to electrolyte evaporation during cycling | <10 [Cu] <10 [La] (under limit of detection) |
| WE: Cu@LaF$_3$:PVDF:SP (8:1:1; 6.74 mg) CE: Pt wire RE: 0.01M AgOTf/MPPy-TFSI Electrolyte: 0.1M TBA-TFSI/BTFE | Charge to: 3.835 V vs Li$^+$/Li 10 μA (100 hours cut off; never reached 3.835 V) Discharge to: 1.92 V vs Li$^+$/Li 10 μA (voltage cut off) | <10 [Cu] <10 [La] (under limit of detection) |
| WE: Cu—LaF$_3$ thin-film on GC (4.5 nm LaF$_3$:80 nm Cu: 1 mm GC) CE: Pt wire RE: 0.01M AgOTf/MPPy-TFSI Electrolyte: 0.1M Np$_1$F/PN | CV: 10 cycles 1.72 to 3.32 V vs Li$^+$/Li 50 mV/s scan rate Potential hold: 3.12 V vs Li$^+$/Li (1 hour) | <10 [Cu] <10 [La] (under limit of detection) |
| WE: Ce foil (62.96 mg; 5 × 3 mm) CE: Pt wire RE: 0.01M AgOTf/MPPy-TFSI Electrolyte: 0.75M Np$_1$F/BTFE | Charge to: 3.785 V vs Li$^+$/Li 30 μA (1 hour cut off) Discharge to: −0.715 V vs Li$^+$/Li 30 μA (34 hours cut off) | N/A |
| WE: Ce foil (62.96 mg; 5 × 3 mm) with SEI layer CE: Pt wire RE: 0.01M AgOTf/MPPy-TFSI Electrolyte: 0.75M Np$_1$F/BTFE SEI additive: 0.25M FOTS | Charge to: 3.785 V vs Li$^+$/Li 30 μA (1 hour cut off; never reached 3.785 V) Discharqe to: −0.715 V vs Li$^+$/Li 30 μA (41 hours cut off; never reached −0.715 V) | N/A |

Figure 10A:
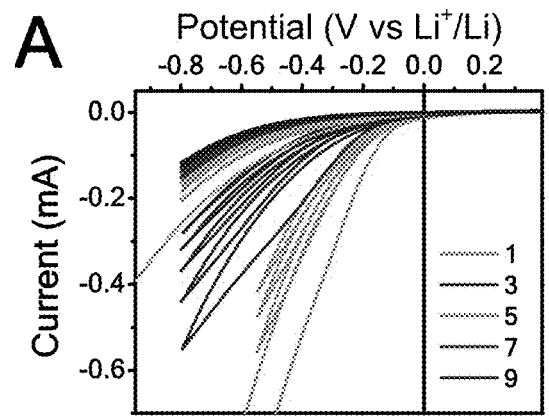
FIG. 10A, FIG. 10B, and FIG. 10C show solid-electrolyte interphase formation and characterization of anode materials. Electrochemical grafting of FOTS additive (0.25 M) to the Ce or Ca anode surface was achieved following a standard procedure where electrochemical tests alternated between cyclic voltammetry (FIG. 10A) and electrochemical impedance spectroscopy studies (FIG. 10B). Formation of an SEI layer on the Ce or Ca surface was confirmed by XPS analysis of the anode after electrochemical grafting experiments (FIG. 10C). Data shown in FIGS. 10A-10C were collected for SEI formation on a Ca anode.
Figure 10B:
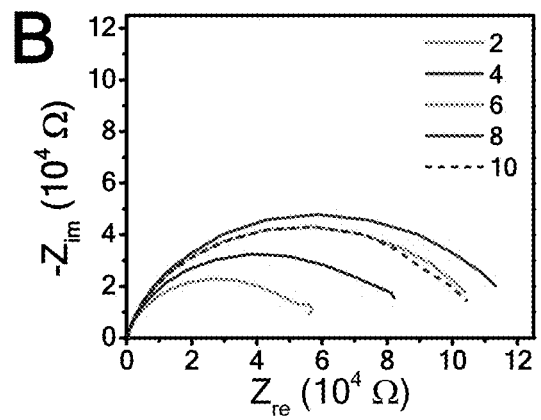
Figure 10C:
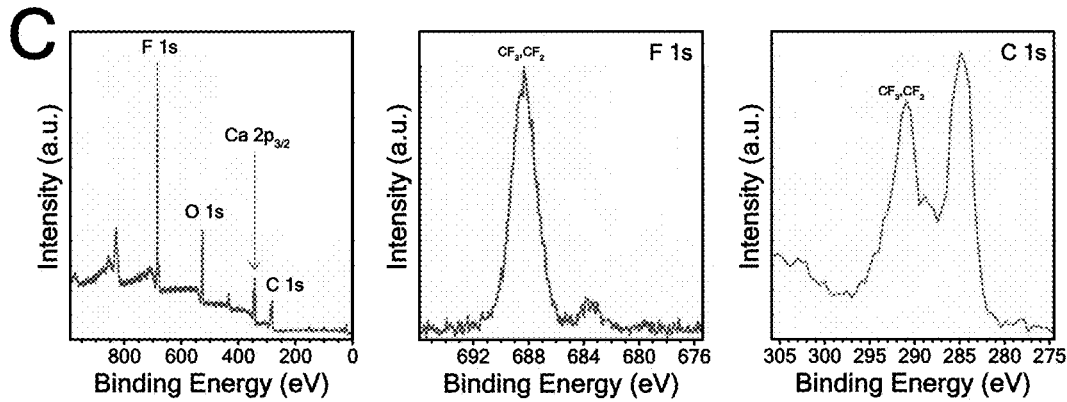

FOTS grafting to Ce or Ca anodes was achieved by cyclic voltammetry (CV) and monitored in situ via electrochemical impedance spectroscopy (EIS). For CV parameters: the potential was varied between −0.8V and +0.7 V vs Li$^+$/Li for 5 cycles using a scan rate of 100 mV/s. For EIS parameters: AC impedance spectroscopy measurements were acquired between 0.1 Hz and 0.2 MHz. A Bio-Logic VMP2 potentiostat was used to alternate between CV and EIS electrochemical tests. The initial test was CV followed by EIS, followed by CV, etc. Tests alternated from CV to EIS repeatedly until ten total electrochemical tests had been performed on the Ce or Ca anode. Confirmation of SEI formation on the Ce or Ca anode was achieved via ex situ XPS measurements. An example data set collected using a Ca anode is shown, where odd numbered tests correspond to CV data (FIG. 10A) and even numbered tests correspond to EIS data (FIG. 10B). XPS analysis of the Ca surface with FOTS grafted is also shown as an example (FIG. 10C).

Three-Electrode Assembly and Cycling Details: Bismuth, lead, copper, Cu@LaF$_3$, Cu—LaF$_3$ thin-film, calcium, or cerium electrodes were employed as the working electrode in a standard three-electrode cell. Platinum wire was used as the counter electrode and a silver wire in 0.01 M AgTOf/MPPy-TFSI was used as the non-aqueous pseudo-reference electrode. Specific details about each battery, electrolyte composition, and cycling parameters used are listed, along with ICP-MS data of the electrolyte solution after cycling as illustrated in Table 2. Electrochemical charge and discharge cycling was carried out using a VersaSTAT MC potentiostat.

Instrumentation: Nuclear magnetic resonance (NMR) spectra were obtained using either a Mercury Plus 300, Varian 400 MR, Inova 500, or Bruker 400 NMR spectrometer. Chemical shifts for protons are reported in parts per million downfield from tetramethylsilane and are referenced to residual protio-solvent in the NMR solvents: CDCl$_3$ (b 7.26), CD$_3$CN (b 1.96). Data are represented as follows: chemical shift, integration, multiplicity (s=singlet, d=doublet, sep=septet, m=multiplet, br=broad), coupling constants in Hertz (Hz), and assignment. Mass spectrometric data were obtained at the Caltech Mass Spectrometry Facility.

Pulsed-field gradient spin-echo (PFG-SE) $^1$H and $^{19}$F NMR experiments were performed on a Varian 500 MHz spectrometer with auto-x pfg broadband probe interfaced with a workstation equipped with VnmrJ software (v 4.2). In an Ar filled glovebox, a 5 mm NMR tube was charged with 400 μL of a 0.75 M solution of Np$_1$F (in BTFE or 3:1 BTFE:DME) or Np$_2$F (in BTFE) and sealed with a rubber septum and secured using Teflon tape. The NMR tube was removed from the glovebox and flame sealed. The sample was then loaded into the spectrometer and DOSY spectra were recorded (unlocked in pure protio-solvent) at the desired temperature (5-40° C., increments of 5° C.). The temperature of the probe was calibrated using a methanol standard.

Inductively coupled plasma mass spectrometry (ICP-MS) was operated by Laboratory Testing, Inc. using Thermo iCap-Q-Mass Spec. 3 mL of electrolyte was collected after each electrochemical test. Samples were diluted by water up to 10 mL, such that 10-30% electrolyte was included. Before ICP-MS analysis, samples were shaken to thoroughly mix both the organic and water layers.

Powder X-ray diffraction (pXRD) patterns were collected using a Bruker D8 ADVANCE instrument with X-ray generator of 40 kV and 40 mA. Post electrochemical testing samples were loaded into a sealed home-made cell with a Be window to avoid air and moisture. Parameters of pXRD scans were in the range of 10 to 90° 2θ with 0.027 2θ step-size and a count time of 12 sec/step. pXRD patterns of Cu@LaF$_3$ and Cu precursor powders were collected in air.

Transmission electron microscopy (TEM) and high resolution TEM (HR-TEM) images were collected using an FEI Tecnai F20 operating at 200 kV. Energy dispersive spectroscopy (EDS) was performed using an image-corrected FEI Titan3™ G2 60-300 operating at 300 kV, equipped with a Super-X four quadrant detector. The post electrochemical testing samples were dispersed in anhydrous n-hexane (Aldrich) in a glovebox ($H_2O<0.5$ ppm). 20 µL of colloidal suspension (1 mg/1 mL) was drop-cast onto a nickel TEM grid with holey carbon substrate. Samples were vacuum dried for two days before being transferred to the TEM in air. For as-synthesized copper nanoparticles and Cu@$LaF_3$ nanoparticles, the TEM samples were dispersed in ethanol and drop-cast on a nickel grid.

XPS depth profile analyses were performed by Nanolab Technologies using a K-Alpha™+X-ray Photoelectron Spectrometer (XPS) System manufactured by Thermo Fisher Scientific, Inc. Samples were not exposed to X-rays until the measurement was started to minimize the chance of degradation. X-rays are monochromatic Al $K_\alpha$ 1486 eV (8.3383 Å). The etch rate of thermally grown $SiO_2$ was used as a rough measure of etch depth. The argon ion etch crater size was 4×2 mm with an X-ray beam size of 0.4 mm. The $Ar^+$ etching was performed with an etch rate for $SiO_2$ of 0.8 Å/sec. Depth profiles were obtained with an $Ar^+$ beam voltage of 0.5 kV, angle of incidence of 30 degrees, and an etch rate for $SiO_2$ of 0.8 Å/sec.

STEM pictures and EELS spectra were obtained by using a Jeol2100F microscope equipped with a GIF Tridiem Gatan EELS spectrometer. EELS maps were recorded at 120 kV, and EELS point spectra were taken at 200 kV accelerating voltage. Probe size was 1.5 nm for the mapping and 0.7 nm for the point acquisition. Entrance and exit angles of the electron beam were 12 mrad. Energy resolution was 1.0 eV as measured from the full width half maximum of zero loss peak in vacuum. All EELS spectra were obtained between 390 eV and 1000 eV with 0.3 eV energy steps and 1 sec exposures. Elemental analysis was carried out by using the standard Gatan/EELS software assuming power law for pre-edge background, and a Hartree-Slater model for quantification. For the analysis of La $M_{5,4}$ edge spectra, first the pre-edge background was removed, then two sigmoidal functions of the form $1/(1+e^{-x})$, one at each of the $M_5$ and $M_4$ edges, of the same amplitude as the edge jump were subtracted from the data. Least-square fittings of the $M_5$ and $M_4$ peaks were carried out by constraining amplitude, loss energy and FWHM. Refined amplitudes were used to calculate the $M_5/M_4$ ratios. Samples were transferred to a nitrogen glove bag and dispersed in anhydrous n-hexane (Aldrich). 20 µL of colloidal suspension (1 mg/l mL) drop-cast onto a Ni TEM grid with holey carbon substrate. Samples were vacuum dried 2 days before TEM analysis. Samples were transferred to the TEM holder in air.

Figure 22:
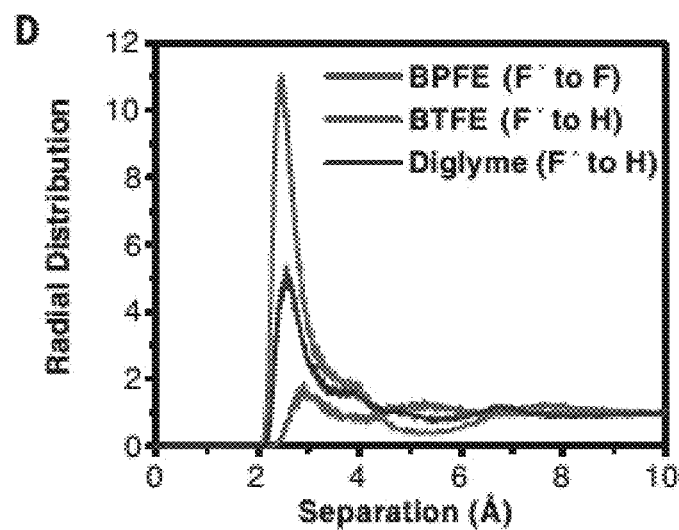
FIG. 22 shows a comparison of $F^-$ radial distribution functions calculated with respect to the H (or F) atoms bonded to the $\alpha$-$CX_2$ moiety of the solvent for physical and electrochemical properties of non-aqueous, fluoride-conducting liquid electrolytes (25° C.). Calculations were performed with LAMMPS (Large-scale Atomic/Molecular Massively Parallel Simulator) Molecular Dynamics Simulations.

Computational Methods and Calculations: LAMMPS (Large-scale Atomic/Molecular Massively Parallel Simulator) was used to perform all molecular dynamics simulations. All simulations used a one fs integration time step, Velocity-Verlet integration, and periodic boundary conditions. Long-range electrostatics were modelled using the particle-particle-particle-mesh (PPPM) algorithm and Lennard-Jones interactions were truncated at 14 Å (angstroms). All simulations were initialized from diffuse configurations containing at least 1500 atoms, using a cubic grid to place solvent molecules in random orientations without overlaps. The simulations were first relaxed in the NVE ensemble with restrained atomic displacements of 0.1 Å per time step for 30 µs, followed by a 1 ns NPT equilibration where the temperature was linearly increased from 100 K to 298 K to condense the simulations. The simulations were further equilibrated at 298 K for 2 ns in the NPT ensemble, prior to performing ion insertions for the solvation free energy calculations. In the NPT simulations, the Nose-Hoover thermostat and barostat were employed using the modified form proposed by Martyna, Tobias, and Klein as implemented in LAMMPS. For the radial distribution functions (RDFs) reported, individual ions were randomly inserted into the pre-equilibrated solvent simulations, allowed to further equilibrate in the NPT ensemble for 1 ns, then the RDFs were generated from an additional 10 ns of production data. The radial distribution function for $F^-$ (FIG. 22) was calculated to characterize the strength of its interaction with the $\alpha$-$CX_2$ (X=H or F) moiety of the indicated solvent. In the case of BTFE, there is a large probability of $F^-$ interaction about 2 Å (angstroms) from the H atom of the $\alpha$-$CH_2$ group; for diglyme, the corresponding probability is considerably reduced. BPFE shows a very small probability of $F^-$ interaction with the F-containing backbone over all separations.

Since several of the solvents presented in this study are novel, suitable force-fields were unavailable. Therefore, all solvent force fields in this study were parameterized on the basis of density functional theory (DFT) quantum chemistry calculations, using the B3LYP-D3/def2-TZVP level of theory computed via the Orca® software package. Following a previously described approach, the solvent force fields were parameterized using the OPLS force-field function form, except that 1-4 pairwise interactions were excluded in the non-bonded interaction computation. In brief, bond, angle, and dihedral force-field terms were derived from potential energy curves computed for internal degrees of freedom for each molecule in vacuum, optimizing the other degrees of freedom as a function of the mode scan. The resulting energy curves were self-consistently fit to obtain the corresponding force-constant parameters and equilibrium displacement parameters in the force field. Lennard-Jones parameters were taken from the universal force field (UFF) and partial charges for all molecules and ions were obtained from CHELPG (Charges from Electrostatic Potentials using a Grid-based method) calculations performed on the optimized geometries of the respective molecules.

Figure 23A:
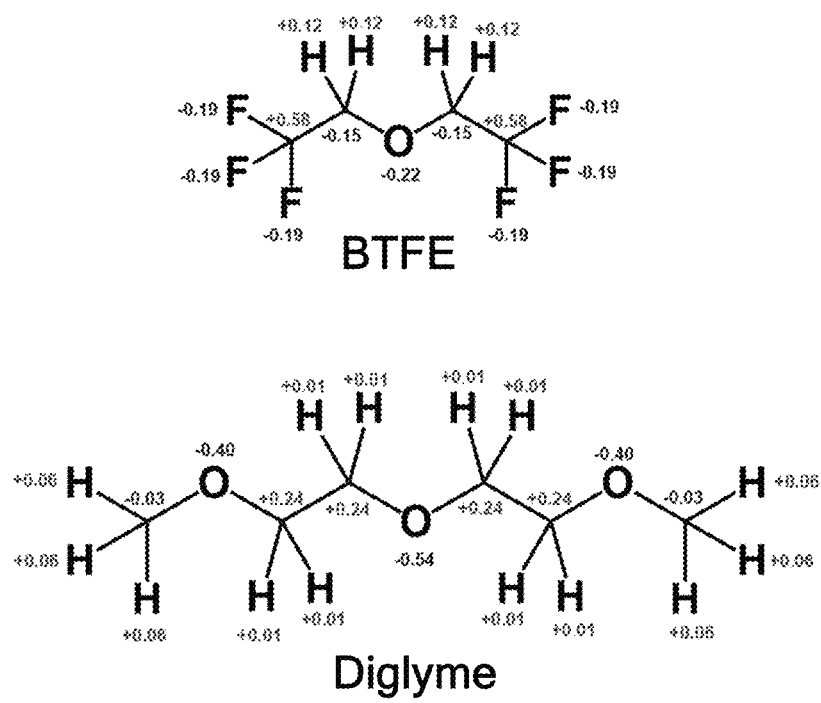
FIG. 23A shows partial charge distributions in the chemical structures of BTFE and diglyme solvents as determined via CHELPG (Charges from Electrostatic Potentials using a Grid-based method) calculations on the B3LYP-D3/def2-TZVP electron densities.
Figure 23B:
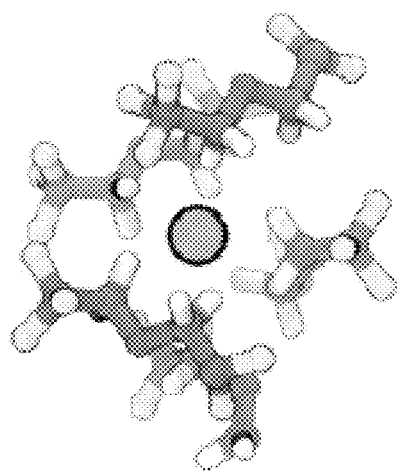
FIG. 23B shows a simulated solvation shell of BTFE molecules surrounding $F^-$ represented by a central sphere using quantum chemical calculations.
Figure 23C:
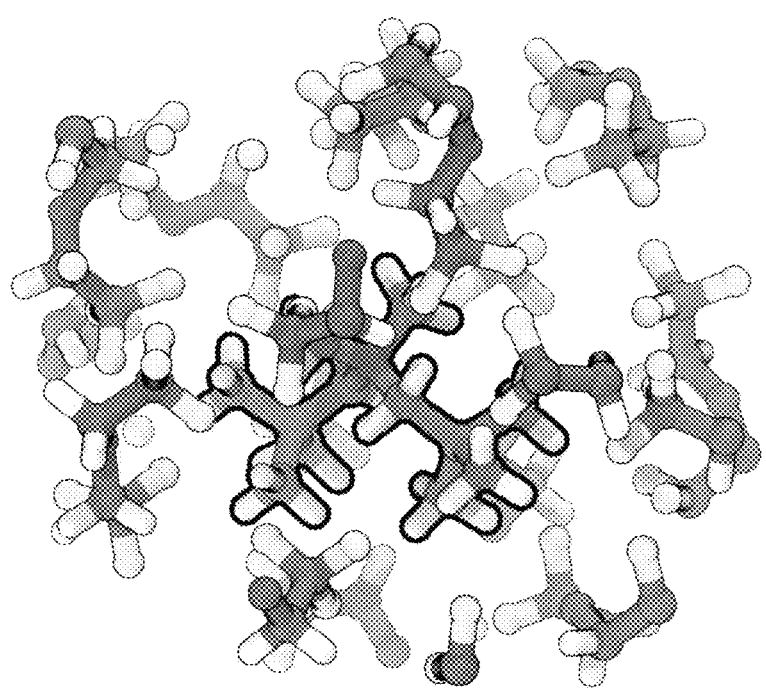
FIG. 23C shows a quantum chemical calculation of the $Np_2^+$ cation (molecule with central black outline) in BTFE. The atoms of the $Np_2^+$ cation are approximately 10 Å (angstroms) from the atoms of BTFE in the solvation sphere. Qualitatively, the $CF_3$ groups on BTFE appear to be most prevalent in the $Np_2^+$ solvation structure.

Quantum chemical calculations were used to characterize the partial charge distribution in BTFE and diglyme (FIG. 23A). BTFE exhibits larger partial positive charges (0.12) on the hydrogen atoms of the $\alpha$-$CH_2$ moiety within the $F^-$ solvation structure than diglyme (0.01), as BTFE has two electron-withdrawing groups flanking the $\alpha$-$CH_2$ moiety. The innermost solvation shell of $F^-$ in liquid BTFE is shown in FIG. 23B. The solvation shell for the $Np_2^+$ cation in BTFE is more complex, but qualitatively, the $\beta$-$CF_3$ groups on BTFE appear to be the most prevalent in the $Np_2^+$ solvation structure (FIG. 23C).

Thermodynamic integration was used to calculate the ion-specific solvation free energies in each solvent. Scaled Lennard-Jones ($U_{LJ}$) and Coulomb ($U_C$) potentials were used to introduce the ion-solvent potential energy terms gradually with $$U_{LJ}(\lambda_{LJ}) = U_S + \lambda_{LJ} U_{LJ} \qquad \text{eq. S1}$$

where $\Delta_{LJ}$ is a linear scaling parameter for the solvent-ion Lennard-Jones interactions ($U_{LJ}$) and $$U_C(\lambda_C) = U_{S+LJ} + \lambda_C U_C \qquad \text{eq. S2}$$

where $\lambda_C$ is a linear scaling parameter for the solvent-ion Coulomb interactions. The potential in eq. S1 was implemented using standard $\lambda$-dependent soft-core Lennard-Jones potentials, as implemented in LAMMPS with n=1 and $\alpha_{LJ}$=0.5. The potential in eq. S2 was implemented by scaling the charges on the ion by $\lambda_C$. The total solvation free-energy was obtained by $$\Delta G_{TI} = \int_0^1 \left\langle \frac{dU_{LJ}}{d\lambda_{LJ}} \right\rangle d\lambda_{LJ} + \int_0^1 \left\langle \frac{dU_C}{d\lambda_C} \right\rangle d\lambda_C \qquad \text{eq. S3}$$

The brackets in eq. S3 indicate an ensemble average, and the approximation has been made that the PΔV contribution to the free energy change can be safely neglected. The integrals in eq. S3 were evaluated numerically using the trapezoidal rule, with $\lambda_{LJ}$ and $\lambda_C$ incremented in steps of 0.2 (twenty-one steps total, eleven for the Lennard-Jones phase and eleven for the electrostatics, less one redundant step connecting the two phases). The system was allowed to equilibrate for 250 µs at each λ-step, then an additional 250 µs of dynamics were used for calculating the necessary derivatives. The derivatives in eq. S3 were calculated by finite-difference. At endpoints, forward or backward finite-difference was used, at all other points the central difference was used with a λ-step of 0.01 to evaluate the derivative. In the case of the polyatomic cations, an additional free energy contribution associated with removing the intramolecular electrostatics must be computed. Free-energy perturbation was used to evaluate this contribution from a ten ns MD trajectory of the individual cations in vacuum. The reported $\lambda G_{TI}$ values were calculated as the average over all ion-insertion trajectories, with errors in the mean estimated by bootstrap resampling (5 million samples). The pKa of acetonitrile, propionitrile, and BTFE were calculated according to $$pK_{a,i} = a\frac{\Delta G_{-H,i}}{RT\ln(10)} + b \qquad \text{eq. S4}$$

where $\Delta G_{-H,i}$ is the free energy of deprotonation for species i, R is the ideal gas constant, T is 298 K, and a and b are calibration constants obtained by a least-squares fit of eq. S4 to experimental pKa values for reference solvents (1,2,3,4,5-pentamethylcyclopenta-1,3-diene, pKa=26.1; cyclopenta-1,3-diene, pKa=18.0; dimethyl 2-(trifluoromethyl)propanedioate, pKa=10.8; dimethyl 2-methylpropanedioate, pKa=18.0; dimethyl propanedioate, pKa=15.9; 1,1,1,3,3,3-hexafluoro-2-(trifluoromethyl)propane, pKa=11.0; methane, pKa=56.0; and acetonitrile, pKa=31.3) (39-41). $\Delta G_{-H,i}$ was calculated by first geometry optimizing the neutral and deprotonated species in vacuum, followed by additional geometry optimization using the COSMO polarizable continuum model with a dielectric of 46.7 to match the DMSO reference solvent. After optimizing the geometry, a frequency calculation was performed to obtain the zero-point energy correction to the free energy. The difference in zero-point energy corrected single point energies yielded $\Delta G_{-H,i}$ for each species. All quantum chemistry calculations were performed at the B3LYP-D3/ma-def2-TZVP level of theory. Calculation of solvent pKa for acetonitrile was 31, as compared to a literature reported value of 31.3. Calculation of solvent pKa for propionitrile was 33, as compared to a literature reported value of 32.5. Calculation of pKa for BTFE was 35.

Solvent Screening with $Np_1F$ and Long-Term Stability of the F$^-$ Ion in Non-Aqueous Solutions All solvent screening experiments in this study were carried out inside an argon filled glovebox (H$_2$O≤10 ppm).

Solvents were purchased commercially and dried over 4 Å molecular sieves until anhydrous, as measured via Karl Fisher titration. Purity of all such-treated solvents were confirmed via NMR spectroscopy prior to solvent screening. Solvent screening was carried out by dissolving anhydrous $Np_1F$ in the anhydrous solvent until the solution was saturated. Weights (in grams) of 5 mL oven-dried scintillation vials, solvent, and $Np_1F$ were recorded using an analytical balance inside the glovebox, enabling saturation concentrations (M) of $Np_1F$ in the solvent subsequently to be determined. An aliquot of the saturated solution was then pipetted into an oven-dried NMR tube containing 0.5 mL of CD$_3$CN NMR solvent, sealed, and then brought out of the glovebox for $^1$H and $^{19}$F NMR spectroscopy. Characterization of the two reactions, (i) between CH$_3$CN and F$^-$ to form HF$_2^-$, and (ii) between CD$_3$CN and F$^-$ to form DF$_2^-$, is well-established in the literature (43). All solvents screened were expected to exhibit a triplet peak in the $^{19}$F NMR from DF$_2$ (δ=−147.0 ppm; J=18 Hz). Because HF$_2^-$ and DF$_2^-$ do not undergo fast exchange with each other on the NMR timescale (17, 43), spectra that showed a new triplet peak in the $^1$H NMR from HF$_2^-$ (δ=16 ppm; J=121 Hz) and/or a doublet peak in the $^{49}$F NMR from HF$_2$ (δ=−146.6 ppm; J=121 Hz) were considered to be indicative of F$^-$ reaction with the solvent being screened.

Initial screening of $Np_1F$ revealed three broad classes of organic solvents (as described in the main text). Examples of class (b) solvents include nitriles such as acetonitrile (ACN), 2-methoxyacetonitrile, 3-methoxypropionitrile (MeOPN), and pyridines such as 2,6-difluoropyridine, whereas, examples of class (c) solvents include propionitrile (PN), 3-fluorobenzonitrile, and 1-methyl-1-propylpyrrolidinium bis(trifluorosulfonyl)imide (MPPy-TFSI).

Figure 24A:
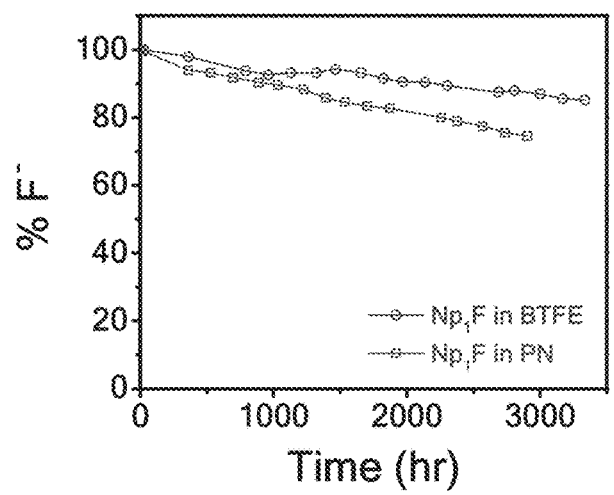
FIG. 24A shows examples of long-term stability of fluoride-ion liquid electrolytes. Long-term monitoring of % $F^-$ in $Np_1F$/BTFE (upper plot, circles) and $Np_1F$/PN (lower plot, squares) solutions as determined by $^{19}F$ NMR (no deuterated NMR solvents were used).

Upon determining PN and BTFE to be excellent solvents for stable solvation of the F$^-$ ion, two J. Young NMR tubes were prepared containing anhydrous $Np_1F$/PN and $Np_1F$/BTFE solutions respectively (both without CD$_3$CN NMR solvent) and sealed in inert atmosphere. These J. Young tubes were stored on the benchtop at room temperature for over 140 days while monitoring the long-term stability of the F$^-$ ion via $^1$H and $^{19}$F NMR (FIG. 24A). To our surprise, the initial NMR for both $Np_1F$/PN and $Np_1F$/BTFE showed minor traces of HF$_2^-$. The initial F$^-$ present in these samples was normalized to 100%, relative to the trace HF$_2^-$. Overtime, the % HF$_2^-$ increases, concurrent with a small, but observable decrease in % F$^-$.

Figure 24B:
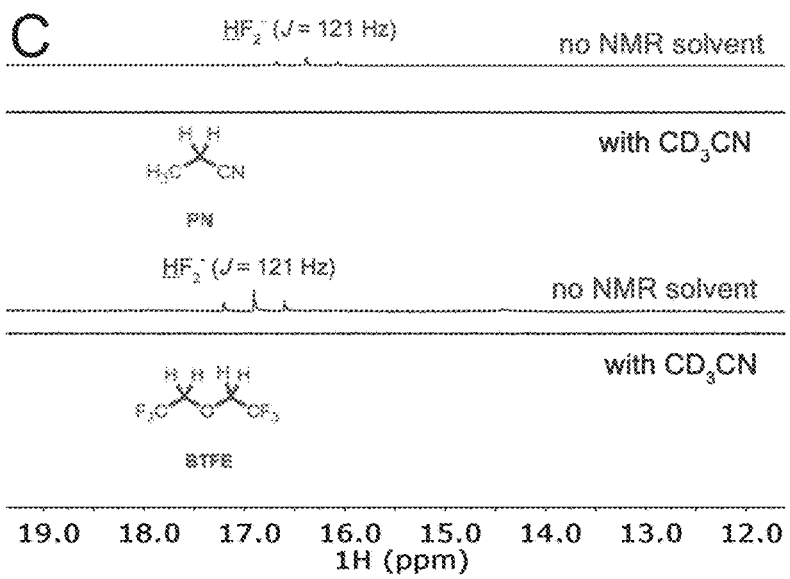
FIG. 24B and FIG. 24C shows examples of long-term stability of fluoride-ion liquid electrolytes. A comparison of $^1H$ NMR (FIG. 24B) and $^{19}F$ NMR (FIG. 24C) spectra for $Np_1F$/PN (upper spectrum) and $Np_1F$/BTFE (lower spectrum) when $CD_3CN$ NMR solvent is used and when no deuterated NMR solvent is used.
Figure 24C:
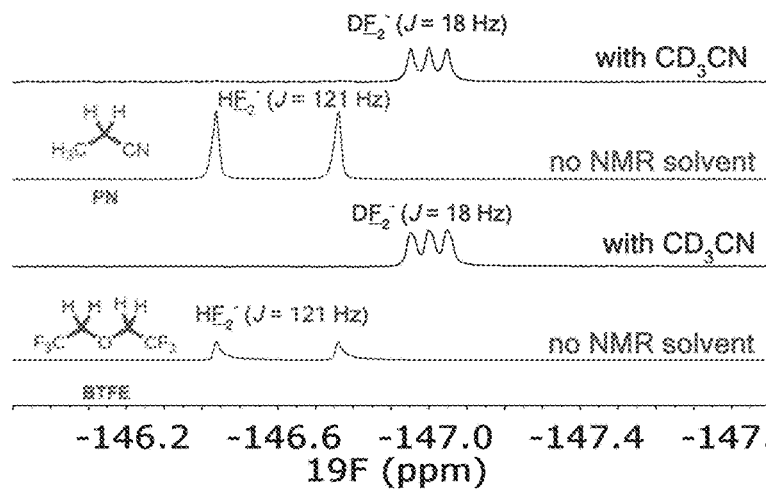
Figure 24D:
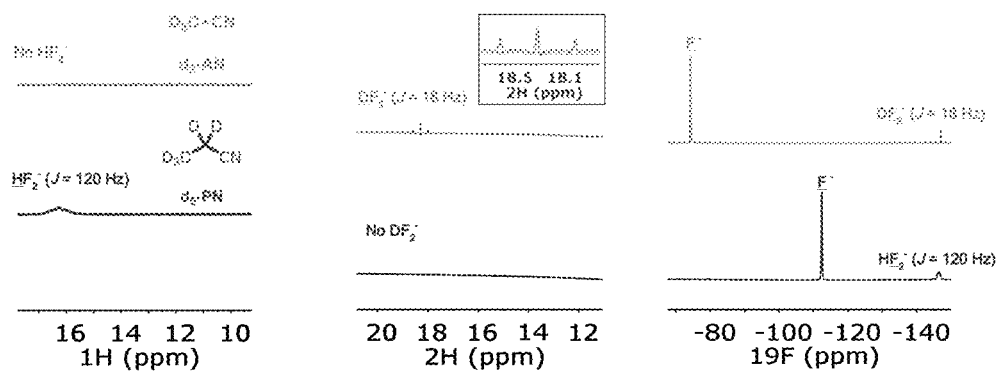
FIG. 24D illustrates control experiments showing $^1H$, $^2H$, and $^{19}F$ NMR spectra for $Np_1F$ dissolved in either deuterated acetonitrile ($d_3$-AN, top spectra) or deuterated propionitrile ($d_5$-PN, bottom spectra).

While the reaction between F$^-$ and CH$_3$CN are known, it was necessary to explore whether F$^-$ is a strong enough base to deprotonate PN or BTFE. Computational methods were used to calculate the pKa of acetonitrile, PN, and BTFE, as described above. The presence of HF$_2^-$ was never observable in these solutions when CD$_3$CN NMR solvent was used as shown in FIG. 24B and FIG. 24C. Although the reaction of F$^-$ with CD$_3$CN is well-characterized, the analogous behavior of PN and BTFE has not been described in the literature. To explore whether the trace HF$_2^-$ observed arises from reactivity with PN or BTFE, a set of control NMR experiments was carried out using deuterated PN (d$_5$-PN) and CD$_3$CN (FIG. 24D). In the CD$_3$CN solution, DF$_2^-$ is observed as expected, arising due to deprotonation of the acidic CD$_3$ groups by F$^-$ and no HF$_2^-$ is detected. The reaction of F$^-$ with CD$_3$CN, therefore, must dominate over reaction with any trace protic impurities (due to the vast excess of CD$_3$CN). For the d$_5$-PN solution, the opposite behavior is observed: F$^-$ does not react with the d$_5$-PN solvent to give DF$_2^-$, but instead reacts with an unidentified protic impurity (present in trace quantities) to form a minor amount of $HF_2^-$. In light of this, we conclude that $F^-$ is not a strong enough base to abstract deuterium from $d_5$-PN under these conditions.

Deuterated BTFE is not commercially available, and our own attempts to synthesize $d_4$-BTFE were unsuccessful. Computational methods were used to calculate the pKa of acetonitrile, PN, and BTFE, as described above. The calculated values for acetonitrile and PN are in excellent agreement with the literature (calculation of solvent pKa for acetonitrile was 31, as compared to a literature reported value of 31.3; calculation of solvent pKa for propionitrile was 33, as compared to a literature reported value of 32.5; calculation of pKa for BTFE was 35).

Comparing the calculated pKa values of acetonitrile, PN, and BTFE, BTFE appears to be significantly less acidic than PN, and should therefore, be even less reactive as a proton donor to $F^-$. Hence, we conclude that the traces of $HF_2^-$ observed in $Np_1F/PN$, $Np_1F/d_5$-PN, and $Np_1F/BTFE$ solutions (in the absence of $CD_3CN$) arise from small amounts of unknown protic impurities present in the system, and are not derived from deprotonation of the bulk solvent. Overall, the $F^-$ ion is chemically stable for a long period when stored at room-temperature in anhydrous, non-aqueous liquid solution (e.g. PN or BTFE) under inert atmosphere.

Solution Properties of Ionic Motion in Fluoride-Ion Electrolytes

Figure 25A:
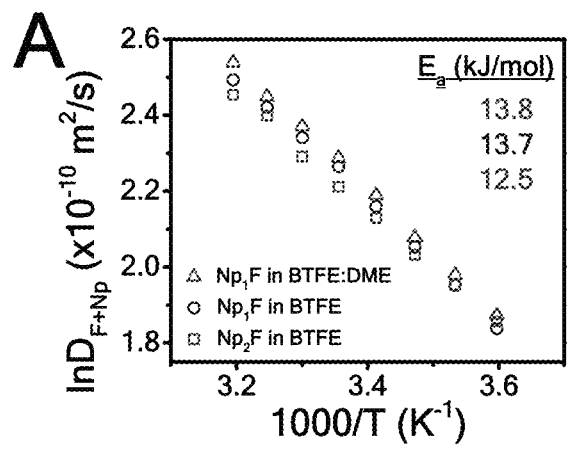
FIG. 25A and FIG. 25B show an Arrhenius analysis of fluoride-ion liquid electrolytes.
Figure 25B:
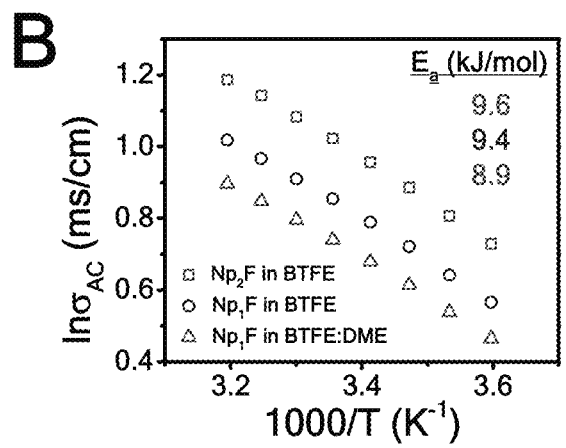

To fully characterize the ionic properties in liquid solution, pulsed-field gradient spin-echo (PFG-SE)$^1$H and $^{19}$F NMR and AC impedance measurements were carried out for three electrolyte formulations (Tables 3, 4, and 5 below). An Arrhenius plot of self-diffusivity coefficients ($D_{Np+}+D_{F-}$) reveals a higher activation energy for the $Np_1F/BTFE$ electrolyte over the $Np_2F/BTFE$ electrolyte (FIG. 25A), whereas activation energies for ionic conduction are comparable for both electrolytes (FIG. 25B). The transport numbers for $Np^+$ cations ($t_+$) and $F^-$ anions ($t_-$) were calculated using eq. S5:

$$t_+ = \frac{D_{Np^+}}{(D_{Np^+} + D_{F^-})}, \quad t_- = \frac{D_{F^-}}{(D_{Np^+} + D_{F^-})} \qquad \text{eq. S5}$$

where $D_n$ is the self-diffusion coefficient (in m²/s) for the indicated ion, as determined via pulsed-field gradient spin-echo (PFG-SE)$^1$H and $^{19}$F NMR.

The degree of ion dissociation (α) was calculated using eq. S6 (45):

$$\alpha = \frac{\sigma_{ac}}{\sigma_{nmr}} \qquad \text{eq. S6}$$

where $\sigma_{ac}$ is the ionic conductivity (in S/m) determined from AC impedance and $\sigma_{nmr}$ is the ionic conductivity (in S/m) determined from PFG-SE NMR via the Nernst-Einstein equation (eq. S7).

$$\sigma_{nmr} = \frac{Ne^2}{k_B T}(D_{F^-} + D_{Np^+}) \qquad \text{eq. S7}$$

The Nernst-Einstein equation relates ion diffusion coefficients to ionic conductivity where N is the number of ions per m³, e is the elementary charge (in C), $k_B$ is the Boltzmann constant, and T is the temperature (in K). When the degree of ion dissociation is very small ($\alpha \ll 1$), transport numbers for both anion and cation will be approximately 0.5, indicative of a high degree of ion-pairing within the electrolyte. Ion-pairing can be corrected for using the ion-pair correction factor (ξ), which can be determined using eq. S8.

$$\xi = 2D_{Np^+}(\alpha - 0.5) + D_{F^-} \qquad \text{eq. S8}$$

Transport numbers calculated using eq. S5 assume no ion-pairing occurs. Transport numbers that account for ion-pairing can be calculated using the modified equation (eq. S9):

$$t_- = \frac{(D_{F^-} - D_{Np^+} + \xi)}{2\xi}, \quad t_+ = \frac{(D_{Np^+} - D_{F^-} + \xi)}{2\xi} \qquad \text{eq. S9}$$

The Stokes radius of either the anion ($R_F$) or cation ($R_{Np}$) can be calculated with respect to the solvent (eq. S10).

$$R_{F^-} = \frac{D_{solvent}}{D_{F^-}}, \quad R_{Np^+} = \frac{D_{solvent}}{D_{Np^+}} \qquad \text{eq. S10}$$

The R-values, rounded to the nearest integer, indicate how many solvent molecules on average diffuse together per every one anion (or cation). This provides an approximate picture for the solvation sphere surrounding a given ion. In the $Np_1F/BTFE$ electrolyte, both the $Np_1^+$ cation and $F^-$ anion share the same NMR-determined Stokes radii ($R_{ion}$) value of 2 (FIG. 26), hence, both ions diffuse together with two BTFE solvent molecules as a tight ion pair, represented qualitatively as "BTFE-$Np_1^+$-$F^-$-BTFE." In the $Np_2F/BTFE$ electrolyte, Stokes radii for $Np_2^+$ and $F^-$ are different, ($R_{Np2}=3$, $R_F=2$), indicating unique solvation environments despite ion-pairing, and a situation approaching "$(BTFE)_2$-$Np_2^+$-BTFE-$F^-$-BTFE." Hence, the increased degree of ion separation and the greater solvation of the $Np_2^+$ cation are the contributing factors that influence the lower energy barrier for $F^-$ mobility and resulting improved conductivity in $Np_2F/BTFE$ electrolytes. Results from PFG-SE NMR and AC impedance measurements for three fluoride-ion electrolyte formulations are tabulated in Tables 3, 4, and 5 below.

TABLE 3

AC impedance ionic conductivity and PFG-SE NMR diffusion measurements for 0.75M $Np_1F$ in BTFE.

| T (°C.) | $D_F^a$ ($10^{-10}$ m²/s) | $D_{Np}^a$ ($10^{-10}$ m²/s) | $D_{BTFE}^b$ ($10^{-10}$ m²/s) | $t_-$ | $t_+$ | $t_-$ (ξ corr.) | $t_+$ (ξ corr.) | $\sigma_{ac}^c$ (S/m) | $\sigma_{nmr}$ (S/m) | $\alpha^d$ | $R_F$ | $R_{Np}$ |
|---|---|---|---|---|---|---|---|---|---|---|---|---|
| 5 | 3.20 ± 0.01 | 3.08 ± 0.01 | 8.07 ± 0.08 | 0.51 | 0.49 | 0.59 | 0.41 | 0.1760 | 1.896 ± 0.009 | 0.093 | 3 | 3 |
| 10 | 3.58 ± 0.01 | 3.46 ± 0.04 | 8.8 ± 0.1 | 0.51 | 0.49 | 0.58 | 0.42 | 0.1901 | 2.09 ± 0.02 | 0.091 | 2 | 3 |
| 15 | 3.94 ± 0.06 | 3.85 ± 0.02 | 9.8 ± 0.1 | 0.51 | 0.49 | 0.56 | 0.44 | 0.2057 | 2.27 ± 0.03 | 0.091 | 2 | 3 |
| 20 | 4.42 ± 0.02 | 4.25 ± 0.02 | 10.8 ± 0.1 | 0.51 | 0.49 | 0.59 | 0.41 | 0.2203 | 2.48 ± 0.0 | 0.089 | 2 | 3 |

TABLE 3-continued

AC impedance ionic conductivity and PFG-SE NMR diffusion measurements for 0.75M $Np_1F$ in BTFE.

| T (°C.) | $D_F{}^a$ ($10^{-10}$ m²/s) | $D_{Np}{}^a$ ($10^{-10}$ m²/s) | $D_{BTFE}{}^b$ ($10^{-10}$ m²/s) | $t_-$ | $t_+$ | $t_-$ (ξ corr.) | $t_+$ (ξ corr.) | $\sigma_{ac}{}^c$ (S/m) | $\sigma_{nmr}$ (S/m) | $\alpha^d$ | $R_F$ | $R_{Np}$ |
|---|---|---|---|---|---|---|---|---|---|---|---|---|
| 25 | 4.84 ± 0.03 | 4.79 ± 0.02 | 11.1 ± 0.2 | 0.50 | 0.50 | 0.53 | 0.47 | 0.2351 | 2.71 ± 0.02 | 0.087 | 2 | 2 |
| 30 | 5.30 ± 0.04 | 5.10 ± 0.01 | 12.8 ± 0.1 | 0.51 | 0.49 | 0.59 | 0.41 | 0.2484 | 2.88 ± 0.02 | 0.086 | 2 | 3 |
| 35 | 5.73 ± 0.01 | 5.53 ± 0.01 | 13.8 ± 0.3 | 0.51 | 0.49 | 0.59 | 0.41 | 0.2630 | 3.069 ± 0.008 | 0.086 | 2 | 3 |
| 40 | 6.15 ± 0.05 | 5.95 ± 0.08 | 14.5 ± 0.4 | 0.51 | 0.49 | 0.58 | 0.42 | 0.2769 | 3.24 ± 0.05 | 0.085 | 2 | 2 |

$^a$Errors are from VnmrJ program.
$^b$$D_{BTFE}$ represents the average ± SD of four diffusion coefficients determined for each peak of the quartet corresponding to the methylene protons of BTFE solvent.
$^c$ The error is ±0.0002 S/m (standard deviation of five measurements).
$^d$ The error is ±0.001.

TABLE 4

AC impedance ionic conductivity and PFG-SE NMR diffusion measurements for 0.75M $Np_2F$ in BTFE.

| T (°C.) | $D_F{}^a$ ($10^{-10}$ m²/s) | $D_{Np}{}^a$ ($10^{-10}$ m²/s) | $D_{BTFE}{}^b$ ($10^{-10}$ m²/s) | $t_-$ | $t_+$ | $t_-$ (ξ corr.) | $t_+$ (ξ corr.) | $\sigma_{ac}{}^c$ (S/m) | $\sigma_{nmr}$ (S/m) | $\alpha^d$ | $R_F$ | $R_{Np}$ |
|---|---|---|---|---|---|---|---|---|---|---|---|---|
| 5 | 3.3 ± 0.1 | 3.14 ± 0.01 | 7.9 ± 0.2 | 0.51 | 0.49 | 0.58 | 0.42 | 0.2073 | 1.93 ± 0.05 | 0.107 | 2 | 3 |
| 10 | 3.57 ± 0.04 | 3.48 ± 0.03 | 8.8 ± 0.1 | 0.51 | 0.49 | 0.55 | 0.45 | 0.2239 | 2.09 ± 0.03 | 0.107 | 2 | 3 |
| 15 | 3.89 ± 0.05 | 3.74 ± 0.01 | 9.6 ± 0.2 | 0.51 | 0.49 | 0.58 | 0.42 | 0.2425 | 2.22 ± 0.02 | 0.109 | 2 | 3 |
| 20 | 4.34 ± 0.04 | 4.07 ± 0.01 | 10.4 ± 0.2 | 0.52 | 0.48 | 0.62 | 0.38 | 0.2602 | 2.41 ± 0.02 | 0.108 | 2 | 3 |
| 25 | 4.73 ± 0.07 | 4.40 ± 0.01 | 11.4 ± 0.2 | 0.52 | 0.48 | 0.63 | 0.37 | 0.2781 | 2.57 ± 0.03 | 0.108 | 2 | 3 |
| 30 | 5.11 ± 0.03 | 4.78 ± 0.03 | 12.4 ± 0.2 | 0.52 | 0.48 | 0.62 | 0.38 | 0.2954 | 2.74 ± 0.02 | 0.108 | 2 | 3 |
| 35 | 5.68 ± 0.07 | 5.33 ± 0.01 | 13.5 ± 0.4 | 0.52 | 0.48 | 0.62 | 0.38 | 0.3136 | 3.00 ± 0.03 | 0.105 | 2 | 3 |
| 40 | 6.05 ± 0.04 | 5.59 ± 0.03 | 15.0 ± 0.2 | 0.52 | 0.48 | 0.64 | 0.36 | 0.3275 | 3.12 ± 0.03 | 0.105 | 2 | 3 |

$^a$Errors are from VnmrJ program.
$^b$$D_{BTFE}$ represents the average ± SD of four diffusion coefficients determined for each peak of the quartet corresponding to the methylene protons of BTFE solvent.
$^c$ The error is ±0.0002 S/m (standard deviation of five measurements).
$^d$ The error is ±0.001.

TABLE 5

AC impedance ionic conductivity and PFG-SE NMR diffusion measurements for 0.75M $Np_1F$ in BTFE:DME (3:1).

| T (°C.) | $D_F{}^a$ ($10^{-10}$ m²/s) | $D_{Np}{}^a$ ($10^{-10}$ m²/s) | $D_{BTFE}{}^b$ ($10^{-10}$ m²/s) | $D_{DME}{}^a$ ($10^{-10}$ m²/s) | $t_-$ | $t_+$ | $t_-$ (ξ corr.) | $t_+$ (ξ corr.) | $\sigma_{ac}{}^c$ (S/m) | $\sigma_{nmr}$ (S/m) | $\alpha^d$ | $R_F$ BTFE\|DME | $R_{Np}$ BTFE\|DME |
|---|---|---|---|---|---|---|---|---|---|---|---|---|---|
| 5  | 3.33 ± 0.03 | 3.18 ± 0.01 | 8.3 ± 0.2  | 10.61 ± 0.09 | 0 51 | 0.49 | 0.61 | 0.39 | 0.1591 | 1.97 ± 0.02 | 0.0810 | 2 \| 1 | 2 \| 1 |
| 10 | 3.68 ± 0.02 | 3.56 ± 0.02 | 9.2 ± 0.2  | 11.84 ± 0.05 | 0.51 | 0.49 | 0.59 | 0.41 | 0.1713 | 2.15 ± 0.02 | 0.0798 | 2 \| 1 | 2 \| 1 |
| 15 | 4.14 ± 0.05 | 3.85 ± 0.03 | 10.1 ± 0.2 | 13.18 ± 0.09 | 0.52 | 0.48 | 0.66 | 0.34 | 0.1848 | 2.33 ± 0.02 | 0.0794 | 2 \| 1 | 2 \| 1 |
| 20 | 4.56 ± 0.03 | 4.37 ± 0.02 | 11.2 ± 0.2 | 14.46 ± 0.02 | 0.51 | 0.49 | 0.61 | 0.39 | 0.1973 | 2.56 ± 0.02 | 0.0771 | 2 \| 1 | 2 \| 1 |
| 25 | 5.03 ± 0.04 | 4.82 ± 0.03 | 12.6 ± 0.7 | 14.59 ± 0.02 | 0.51 | 0.49 | 0.61 | 0.39 | 0.2097 | 2.77 ± 0.03 | 0.0756 | 2 \| 1 | 2 \| 1 |
| 30 | 5.52 ± 0.02 | 5.19 ± 0.03 | 13.3 ± 0.3 | 17.44 ± 0.09 | 0.52 | 0.48 | 0.65 | 0.35 | 0.2216 | 2.97 ± 0.02 | 0.0747 | 2 \| 1 | 2 \| 1 |
| 35 | 5.88 ± 0 03 | 5.70 ± 0.02 | 14.4 ± 0 3 | 18.73 ± 0.03 | 0.51 | 0.49 | 0.59 | 0.41 | 0.2334 | 3.16 ± 0.02 | 0.0740 | 2 \| 1 | 2 \| 1 |
| 40 | 6.47 ± 0.01 | 6.20 ± 0.02 | 15.7 ± 0.4 | 19.86 ± 0.07 | 0.51 | 0.49 | 0.62 | 0.38 | 0.2451 | 3.40 ± 0.01 | 0.0721 | 2 \| 1 | 2 \| 1 |

$^a$Errors are from VnmrJ program.
$^b$$D_{BTFE}$ represents the average ± SD of four diffusion coefficients determined for each peak of the quartet corresponding to the methylene protons of BTFE solvent.
$^c$ The error is ±0.0002 S/m (standard deviation of five measurements).
$^d$ The error is ±0.0006.

Interfacial Properties of Fluoride-Ion Electrolytes at Metal Electrode Surfaces

To determine whether this liquid F⁻ electrolyte is electrochemically active toward promoting conversion reactions at a metal electrode surface, we conducted half-cell experiments with a variety of metal electrode materials. $BiF_3$, $PbF_2$, and $CuF_2$ cathodes have high theoretical specific capacities (302 mAh/g, 360 mAh/g, and 528 mAh/g respectively) and have demonstrated limited cycling in high-temperature FIBs via direct multivalent conversion avoiding any lower oxidation state intermediate phases such as CuF.

Figure 28A:
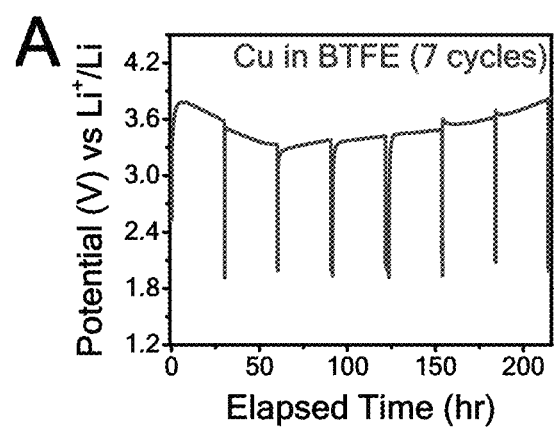
FIG. 28A shows a voltage profile a Cu cathode collected during electrochemical cycling in a three-electrode cell. Three-electrode cells were assembled with metal cathode (working electrode), Pt wire (counter electrode), and Ag rod in AgOTf/MPPy-TFSI (reference electrode) in the indicated electrolyte, where IL=0.1 M TMAF in MPPy-TFSI and BTFE=0.1 M $Np_1F$ in BTFE. Reference electrode potentials versus $Ag^+$/Ag were converted to potentials versus $Li^+$/Li by adding an experimentally-determined reference potential (4.12 V).
Figure 28B:
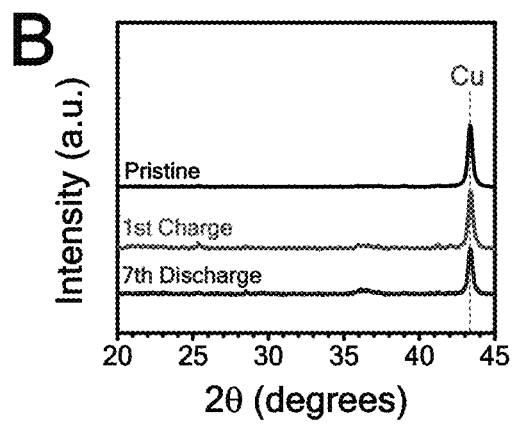
FIG. 28B shows powder X-ray diffraction (pXRD) patterns obtained for Cu cathodes in pristine condition (top spectrum), after first charge or fluorination (second from top spectrum), and after final discharge or defluorination (bottom spectrum). $CuF_2$ is not observed (presumably due to $Cu^{2+}$ dissolving into solution).

We achieved electrochemical cycling of Bi, Pb, and Cu electrodes in a three-electrode cell at room temperature in our liquid electrolytes, whereby up to 10 cycles were demonstrated (FIGS. 27A-27E). Powder X-ray diffraction (pXRD) showed conversion of Bi to $BiF_3$ and Pb to β-$PbF_2$ upon electrochemical fluorination, whereas the Cu electrode appeared unchanged throughout cycling (FIGS. 28A-28B). In all cases, performance was not ideal: after discharge, $BiF_3$ peaks were still present in the pXRD pattern, indicating that the conversion reaction is not fully reversible under these conditions. Fluorination and defluorination of Pb appeared to be fully reversible, however, ICP-MS revealed 3.9% dissolution of Pb into the liquid electrolyte after ~7 hours of cycling (similar values for Bi were also measured). Likewise, while electrochemical conversion of Cu to $CuF_2$ has been shown to occur in solid-state devices, high dissolution (4.0 at %) of Cu was found to occur in liquid electrolyte. Hence, although electrochemical oxidation of Cu presumably occurs, $Cu^{2+}$ dissolves faster than the formation of $CuF_2$ and/or $CuF_2$ quickly leaches into the electrolyte upon formation.

Figure 9A:
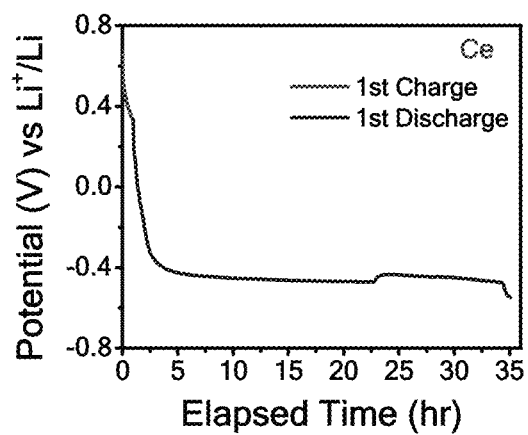
FIG. 9A shows data from room-temperature conversion reactions on Ce anode material surfaces cycled in non-aqueous, $F^-$-conducting liquid electrolytes. (A) Voltage profile of a Ce anode collected during electrochemical charge and discharge in a three-electrode cell.
Figure 9B:
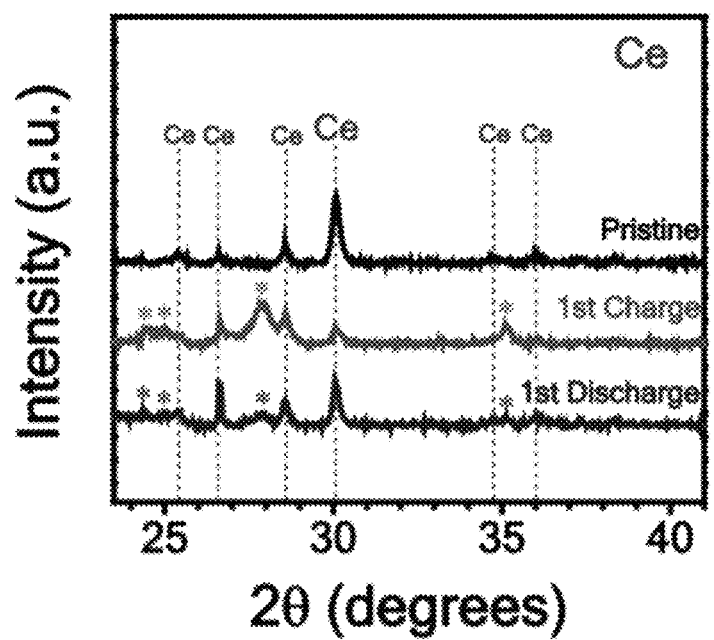
FIG. 9B shows pXRD patterns obtained for Ce anode in pristine condition (black), after first charge or fluorination (red), and after first discharge or defluorination (blue). Asterisks indicate new peaks corresponding to $CeF_3$.
Figure 11A:
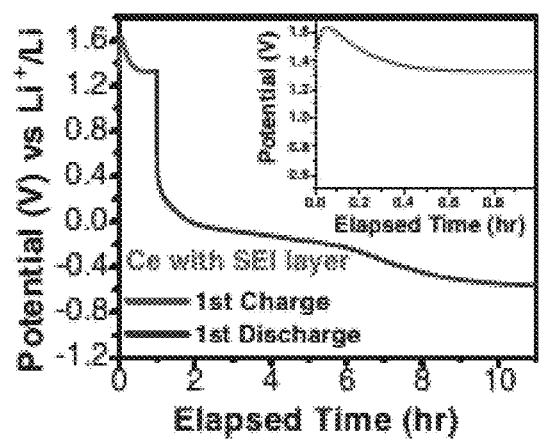
FIG. 11A shows room-temperature performance of metal electrode materials reversibly cycled in non-aqueous, $F^-$-conducting liquid electrolytes. Voltage profile of Ce with an SEI layer formed from FOTS additive in 0.75 M Np1F/BTFE. The upper right inset in FIG. 11A shows a closer view of the charge cycle.
Figure 11B:
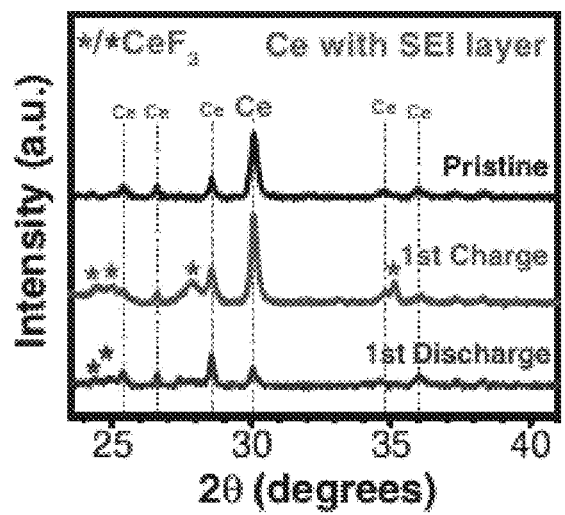
FIG. 11B shows pXRD patterns for the Ce electrode in pristine condition (top spectrum), Ce with SEI layer after first charge or fluorination (center spectrum), and after first discharge or defluorination (bottom spectrum) in 0.75 M Np1/BTFE at room temperature. Asterisks indicate new peaks corresponding to $CeF_3$ due to metal fluorination after charge.
Figure 12A:
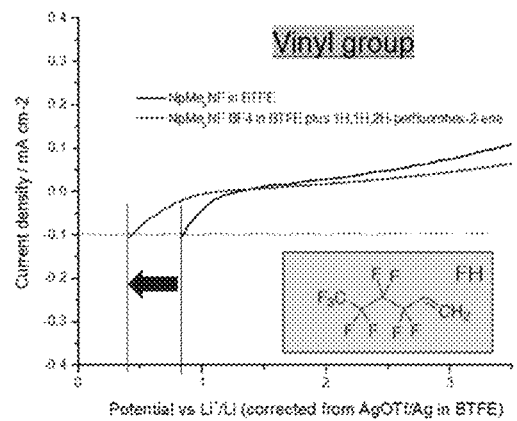
FIG. 12A and FIG. 12B outline exemplary improvements of negative potentials of additive grafted calcium anode in BTFE based electrolyte determined by linear sweep voltammograms (LSV)
Figure 12B:
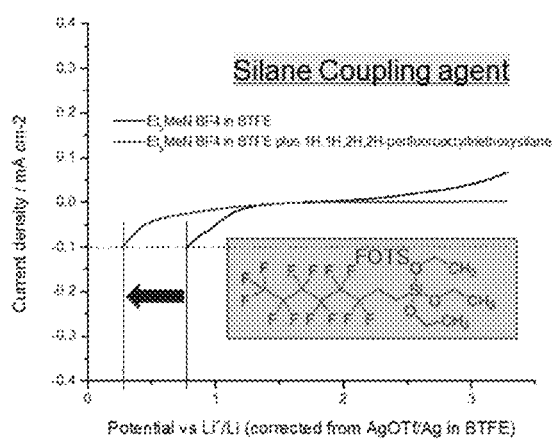
Figure 13A:
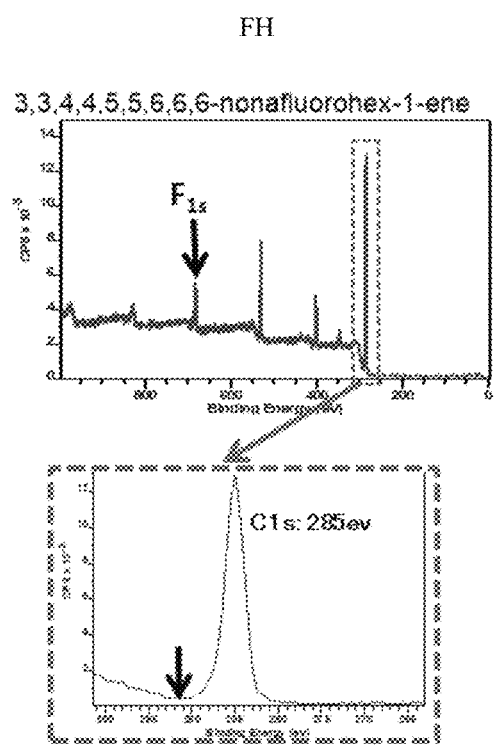
FIGS. 13A, 13B, and 13C outline exemplary XPS studies of FH SEI and FOTS SEI grafted on the surface of calcium anodes.
Figure 13B:
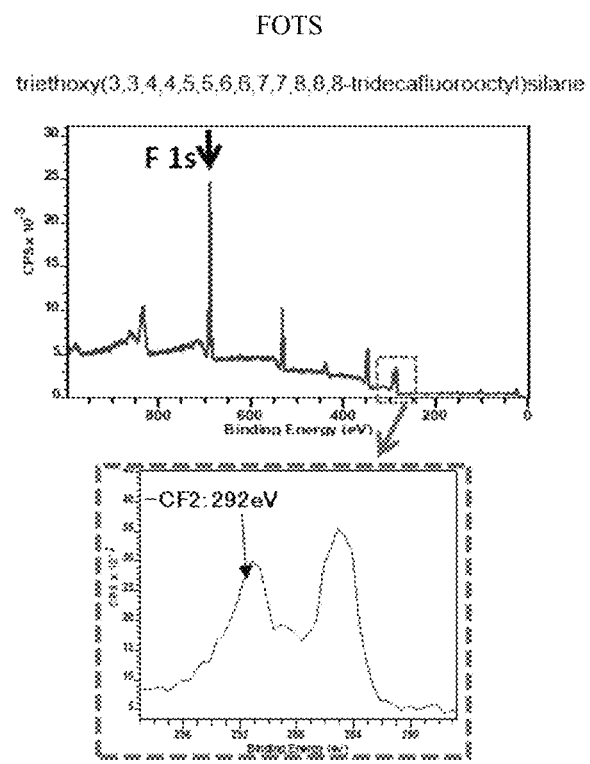
Figure 13C:
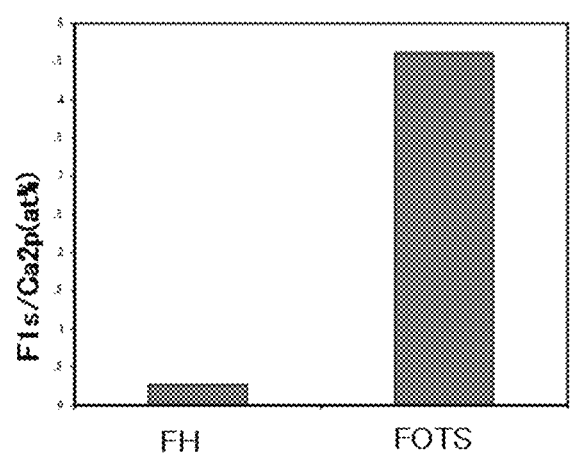
Figure 14:
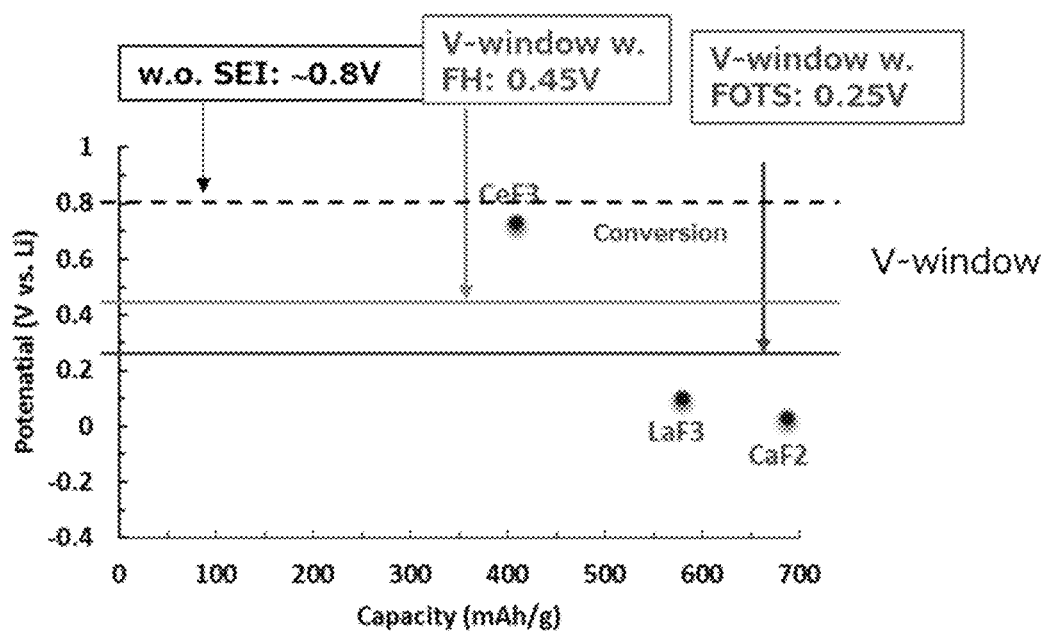
FIG. 14 outlines an exemplary reduction of anodic potential (V-windows expansion) caused by SEI layers and anodic potential of several non-limiting anode materials according to some aspects of the present disclosure.
Figure 15:
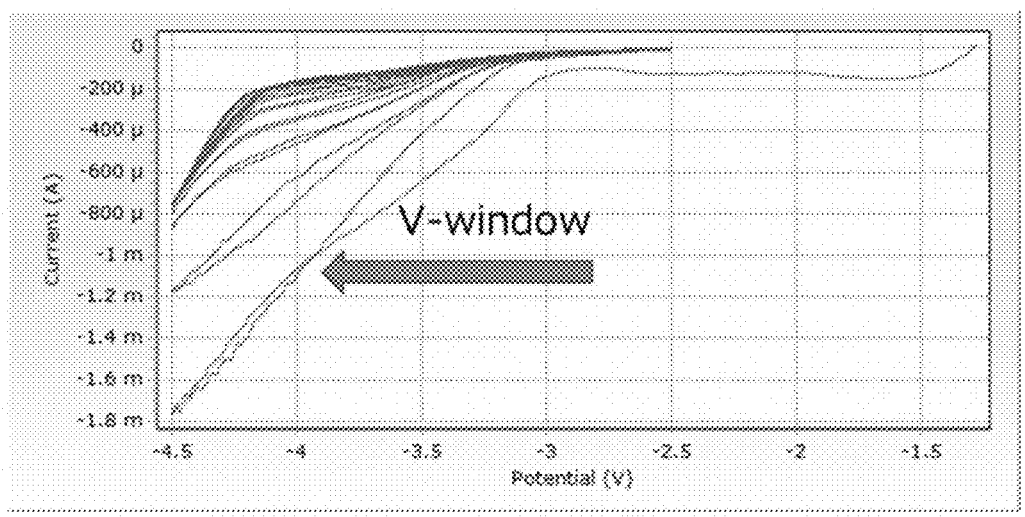
FIG. 15 is an example of SEI formation on a Ce electrode by CV cycling in 0.1 M $TMABF_4$/BTFE with 0.05 M $F_3CC_6H_4N_2.BF_4$ (diazonium salt) additive at a scan rate of 1 mV/s in the potential between −4.5 V and −2.5 V (vs. $Ag/Ag^+$). Expansion of negative potentials observed during the 20 cycles as indicated by a blue arrow is caused by the SEI layer according to some aspects of the present disclosure.
Figure 16A:
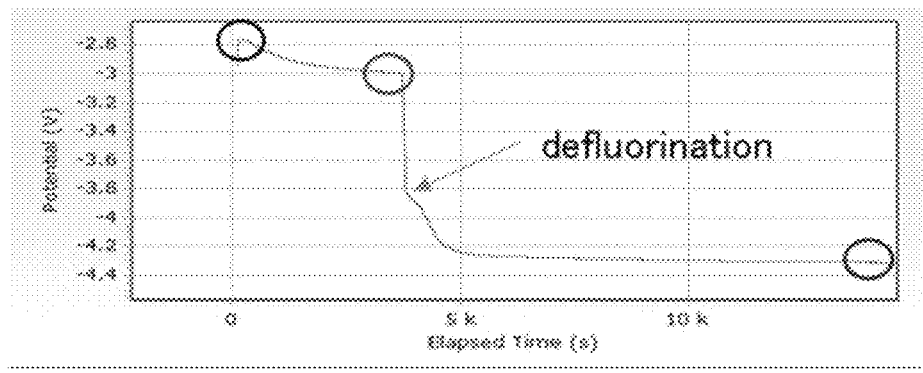
FIG. 16A is charge(fluorination)/discharge(defluorination) of Ce electrode with the SEI layer formed by diazonium salt $F_3CC_6H_4N_2.BF_4$. A discharge plateau is observed as indicated by an arrow.
Figure 16B:
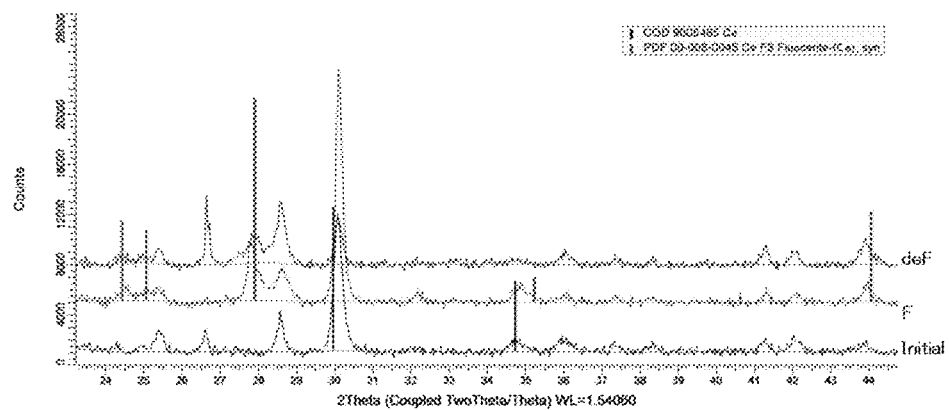
FIG. 16B displays pXRD patterns of an initial Ce anode, a fluorination and following defluorination of Ce anodes with the SEI formed by the diazonium salt, $F_3CC_6H_4N_2.BF_4$. Ce fluorination is confirmed with $CeF_3$ formation after charge, indicating that $F^-$ ions can penetrate the SEI layer. Partial defluorination of $CeF_3$ is observed after discharge as some peaks of $CeF_3$ decreasing or disappearance.

This liquid $F^-$ electrolyte is also electrochemically active toward promoting conversion reactions at more electropositive metal surfaces. Half-cell cycling experiments with Ce demonstrated successful fluorination upon first charge to form $CeF_3$ (FIG. 9). After first discharge, however, $CeF_3$ was only partially defluorinated, indicating that the conversion reaction is not completely reversible under these conditions and electrolyte breakdown may be significant. Such electrolyte breakdown is a common phenomenon that occurs in the first few cycles of battery operation, for example in Li-ion batteries leading to the formation of a passive solid electrolyte interphase (SEI) layer on the anode surface, which can be tailored to block further electrolyte degradation and electron transport while retaining favorable ionic diffusion properties. Hence, we reasoned that an SEI-promoting additive with the necessary chemical properties (i.e., a sacrificially-reduced, surface-reactive perfluoroalkyl ligand) might improve the cycling properties of electropositive metals, and identified 1H,1H,2H,2H-perfluorooctyltriethoxysilane (FOTS) as a suitable material. Pretreatment of Ca or Ce anodes was carried out through cyclic voltammetry sweeps in 0.75 M $Np_1F$/BTFE electrolyte containing 0.25 M FOTS additive (FIGS. 10A-10C). The desired formation of a $CF_n$-containing SEI layer on the metal surface was achieved, as monitored in situ through electrochemical impedance spectroscopy (EIS) and confirmed using ex situ XPS analysis (FIGS. 10A-10C). Notably, use of Ce metal pre-treated with an FOTS-derived SEI layer significantly improved the reversibility of the Ce to $CeF_3$ conversion reaction (FIG. 11A and FIG. 11B). However, cycling of Ca was not observed under any conditions investigated; this may indicate that conversion of the higher-coordinate $CeF_3$ tysonite structure is much more kinetically favorable compared to the more-compact fluorite $CaF_2$ (note, $Ca^{2+}$ and $Ce^{3+}$ have very similar ionic radii). Nevertheless, from an energy density perspective the increased mass of Ce (or other lanthanide metals) when compared to Ca is substantially off-set by the higher density and three-electron activity of the former (574 mAh/g; 3845 mAh/cm³ vs. 1337 mAh/g; 2073 mAh/cm³ respectively).

Figure 29A:
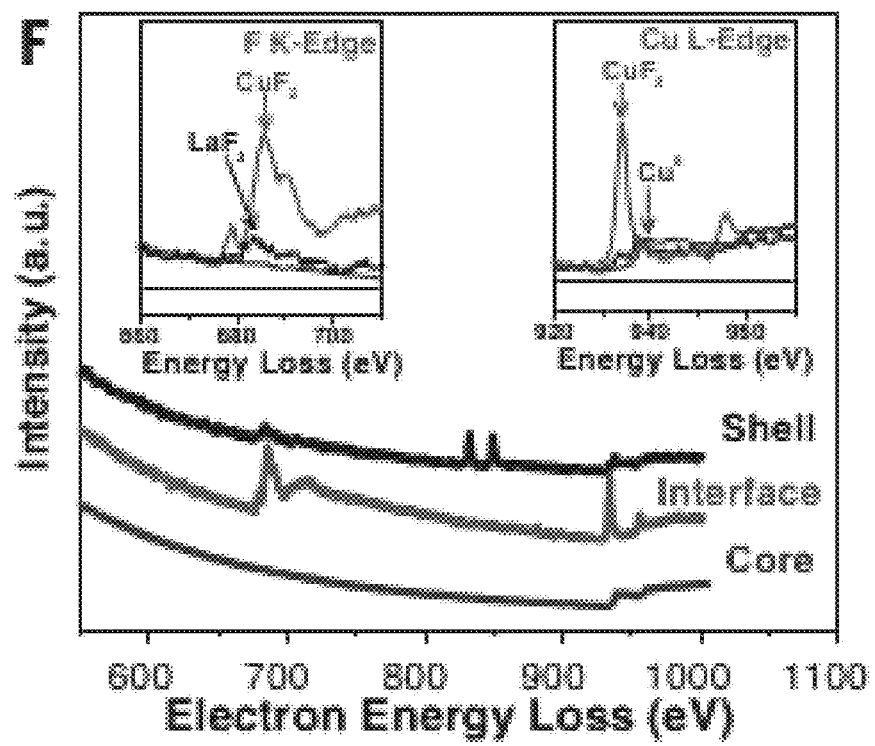
FIG. 29A shows representative EELS spectra showing F K, La $M_{5,4}$ and Cu $L_{3,2}$ edges obtained for the fluorinated Cu@$LaF_3$ core-shell cathode material sample in the shell, interface, and core regions. The insets at upper left and upper right show the F K-edge and Cu $L_{3,2}$-edge from the graph below, respectively.
Figure 29B:
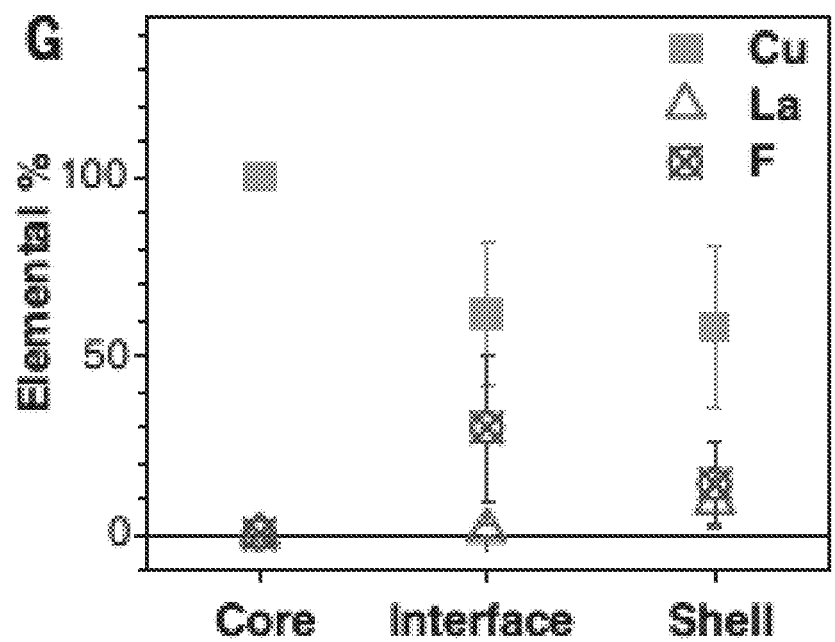
FIG. 29B shows a plot of averaged elemental percent of Cu, La, and F obtained from 36 different EELS spectra, 12 each from shell, interface, and core regions of multiple fluorinated particles for the fluorinated Cu@$LaF_3$ core-shell cathode material samples.

$LaF_3$ was found only in the shell region, while $CuF_2$ was evident in the interfacial region (FIG. 29A, left inset). Metallic $Cu^0$ was found in the core, and partially or fully fluorinated Cu states were detected at the interfacial region (FIG. 29A, right inset). Averaged elemental compositions extracted from EELS spectra show Cu-only cores, Cu- and F-containing interfaces, and La- and F-containing shells (FIG. 29B). More fluorine was found in the interface region (30±20% atom) than within the outer shell (14±12% atom), indicating that $LaF_3$ does allow for favorable diffusion of $F^-$ through the shell. As anticipated, La was significantly more abundant in the outer shells (9±8% atom) than at the interface (1.1±1.3% atom), supporting that the shell is robust and does not interfere with the chemistry occurring at the interface or core. A comparison of 3D-surface plots for the F K, La $M_{5,4}$, and Cu $L_{3,2}$ edges of both fluorinated and defluorinated particles showed that the core-shell nanoparticles maintain their sizes, morphology, and compositions before and after electrochemical cycling. It should be noted that electron beam damage prevented detailed EELS analysis of defluorinated nanoparticles. This is likely due to a softening of the nanoparticle from a crystalline-to-amorphous transformation promoted by residual solvent, with soft matter more prone to electron beam damage.

Example 6: All-Atom Molecular Dynamics Simulations of Self-Assembled Monolayer Interfaces for Metal Electrode Passivation All-atom molecular dynamics simulations are performed to explore design rules for passivating self-assembled monolayers (SAMs) of metal electrodes in fluoride-ion batteries. Four different SAM molecules are investigated with regard to the presence of $\alpha CH_2$ and/or fluorinated carbon ($CF_2$) moiety including E-$(CH_2)_2(CH_2OCH_2CF_2)_2F$, E-$(CH_2)_2(CF_2CH_2)_3CF_3$, E-$(CH_2)_2(CH_2OCH_2)_3H$, E-$(CH_2)_2(CF_2)_7CF_3$. Here, E stands for an electrode. Both considerations were identified to have to do with fluoride-ion solvation. Fluoride salt, $Np_2F$ (N,N-dimethyl-N,N-dineopentylammonium fluoride) was introduced in the simulation cell at a molar density ca. 1.2 M with either BTFE (bis(2,2,2-trifluoroethyl) ether) or glyme electrolyte. Based on the simulation results (which consider both the fluoride-ion SAM intercalation statistics and kinetics, discussed below), a combination of $(CH_2OCH_2CF_2)_2F$ and glyme is considered the best among a set of investigated combinations between SAM moiety and solvent.

Model metal electrodes are held at a constant potential (V), each of which is either held at $V=V^-$ or $V^+$. Bias potential is $\Delta V=V^+-V^-$. Charges of metallic atoms fluctuate in time. By doing so, charge-polarization of electrodes and the image-charge effect are included in the simulations.

SAM coverage density chosen here (5.625 $nm^{-2}$) is high enough to prevent electrolytes intercalation into a SAM region, satisfying the primary requirement of electrode passivation. At this SAM coverage density, the majority of SAM molecules stand up against the electrodes. Hereafter, the SAM region is between 5-14 Å from each of electrodes.

Figure 30:
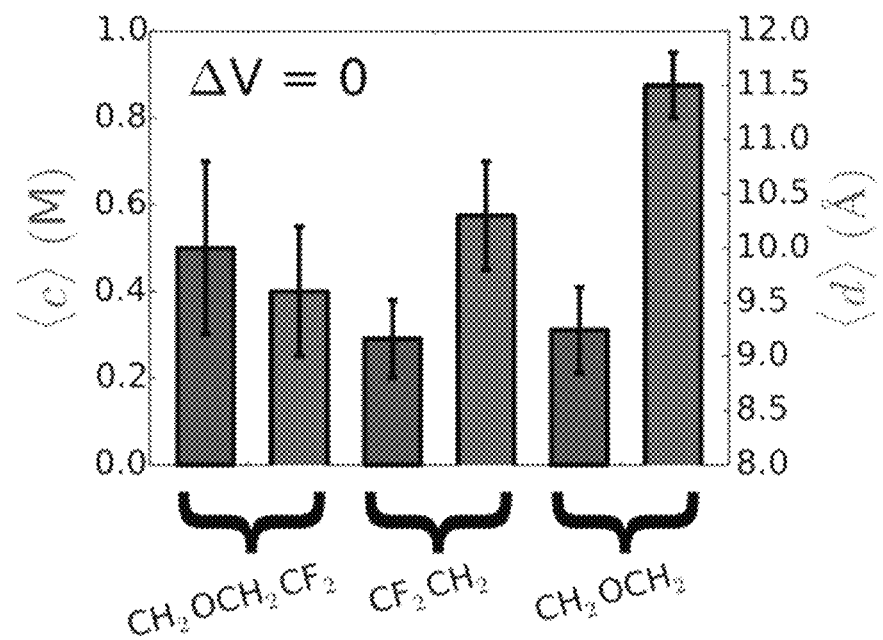
FIG. 30 shows average local density of fluoride-ion, <c> in a SAM region and average distance of fluoride-ion from an electrode, <d> at zero bias potential ($\Delta V$=0) according to Example V.

FIG. 30 presents the simulation results for fluoride-ion SAM intercalation statistics at $\Delta V=0$ (zero bias potential) are presented. SAMs of $CH_2OCH_2CF_2$ and $CF_2CH_2$ moieties exhibit higher average local density, $<c>$ of fluoride-ion in the SAM region (0.3-0.5 M) and shorter average distance, $<d>$ of fluoride-ion from the electrode (9.5-11.5 Å) than SAM of $(CH_2OCH_2)_3H$ molecule. The SAM region considered is a region within 5-14 Å from each of electrode. This appears to the case whether the electrolyte is either BTFE or glyme. SAM of $(CF_2)_7CF_3$ molecule does not allow for fluoride-ion SAM intercalation. This observation suggests that both $CF_2$ and $CH_2$ moieties adjacent to each other are necessary for the SAM in order to not impede facile fluoride-ion SAM intercalation Hereafter, discussion is given only for SAMs of $CH_2OCH_2CF_2$ and $CF_2CH_2$ moieties, which allows for appreciable fluoride-ion SAM intercalation.

Figure 31A:
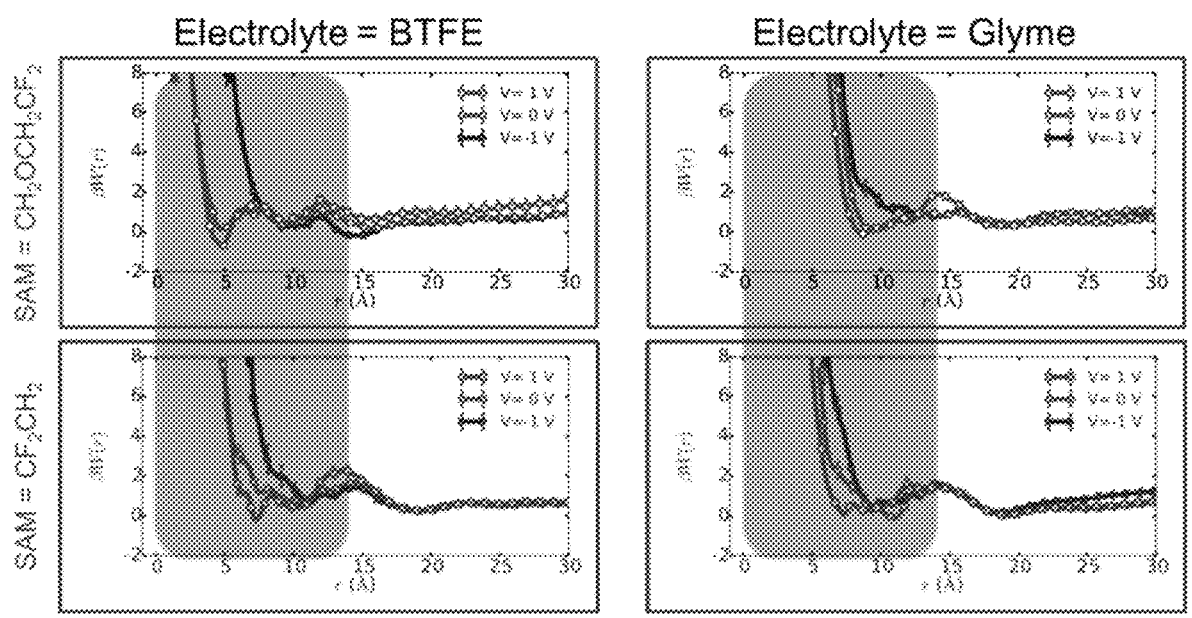
FIG. 31A shows the potential of mean force (PMF) for fluoride-ion SAM intercalation, at several electrode potentials according to Example V.

With reference to FIG. 31A, calculated potentials of mean force (PMFs) at several electrode potentials (V=−1, 0, +1 V) are presented for the SAMs of $CH_2OCH_2CF_2$ and $CF_2CH_2$ moieties with either BTFE or glyme electrolyte. Electrode polarization changes the PMF, either enhancing or retarding fluoride-ion SAM intercalation. There is a barrier of approximately 2/β, where $\beta^{-1}=k_BT$, $k_B$ is Boltzmann's constant, and T=400 K, that separates the SAM and electrolyte regions, which is related to the fluoride-ion SAM intercalation kinetics. This observation suggests a potentially important role for intercalation kinetics in SAM design.

Figure 31B:
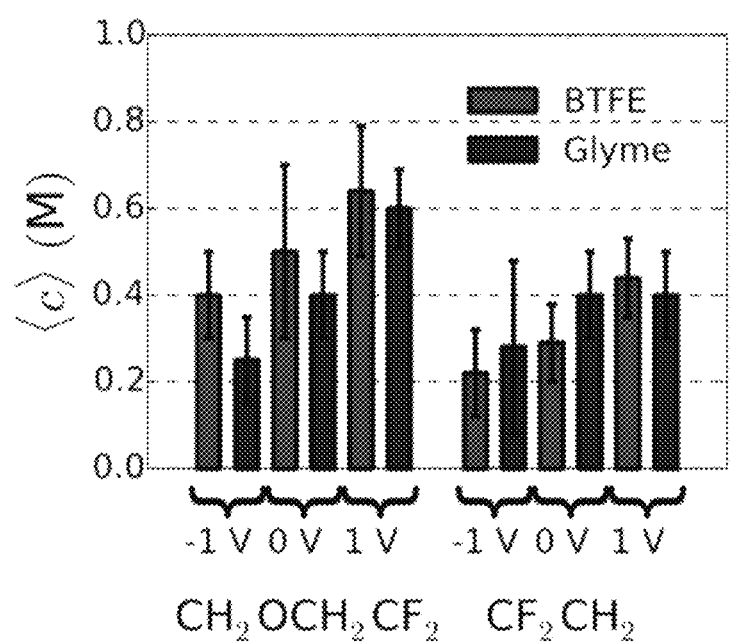
FIG. 31B shows average local density of fluoride-ion, <c> in a SAM region at several electrode potentials according to Example V.
Figure 31C:
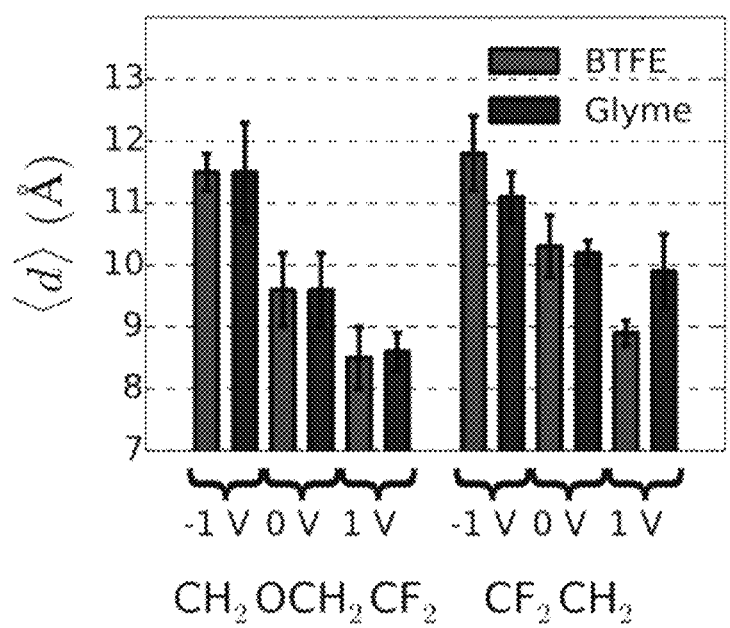
FIG. 31C shows average distance of fluoride-ion from an electrode, <d> at several electrode potentials according to Example V.

With reference to FIGS. 31 B-C, calculated average local density, <c> of fluoride-ion in the SAM region and shorter average distance, <d> of fluoride-ion from the electrode at several (V=−1, 0, +1 V) are presented for the SAMs of $CH_2OCH_2CF_2$ and $CF_2CH_2$ moieties with BTFE or glyme electrolyte. The SAM of $CH_2OCH_2CF_2$ moiety allows not only more fluoride-ions to intercalate but also to reside closer to the electrode than SAM of $(CF_2CH_2)_3CF_3$ molecule, i.e., higher <c> and smaller <d>. This appears to the case whether the electrolyte is either BTFE or glyme at all electrode potentials examined. Therefore, on the basis of fluoride-ion SAM intercalation statistics, the SAM of $CH_2OCH_2CF_2$ moiety is considered the best among those considered here.

Figure 32A:
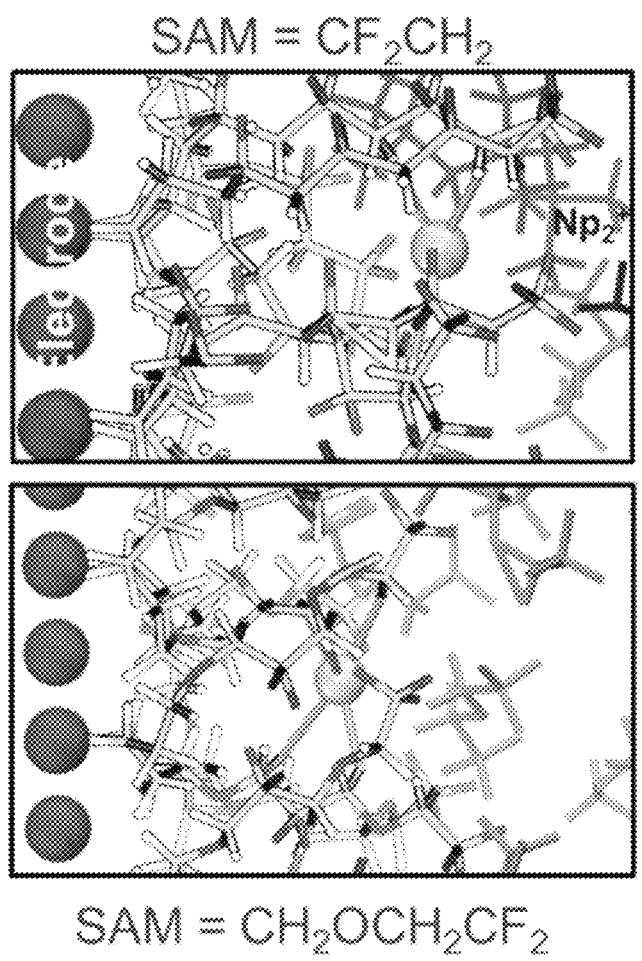
FIG. 32A shows all-atom configurations, illustrating fluoride-ion solvation inside a SAM region according to Example V.

FIG. 32 A illustrates fluoride-ion solvation inside the SAMs. Orange solid lines are drawn between hydrogen atom of SAM molecules and fluoride-ions within 3 Å. The hydrogen atoms are considered "partners" that solvate a fluoride-ion.

Figure 32B:
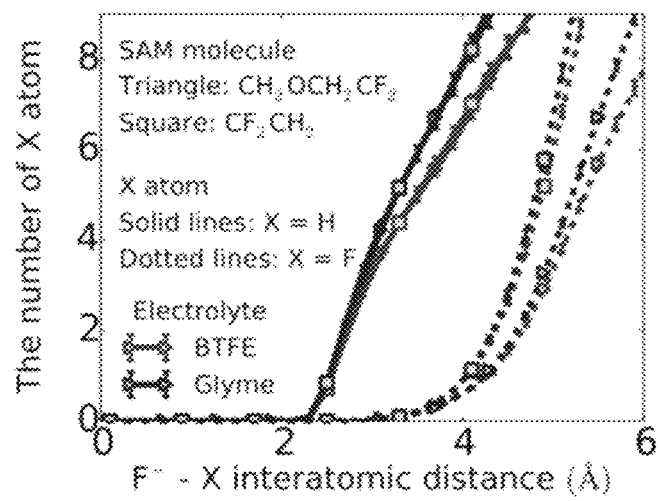
FIG. 32B shows the cumulative number of atoms (either F or H) around the fluoride-ion as a function of interatomic distance inside a SAM region according to Example V.

With reference to FIG. 32B, fluoride-ion solvation in the SAM and its kinetics at ΔV=0 is presented for the SAMs of $CH_2OCH_2CF_2$ and $CF_2CH_2$ moieties with either BTFE or glyme electrolyte. $CH_2$ moiety of the SAMs is confirmed to be responsible for fluoride-ion solvation, which is adjacent to $CF_2$ moiety.

Figure 32C:
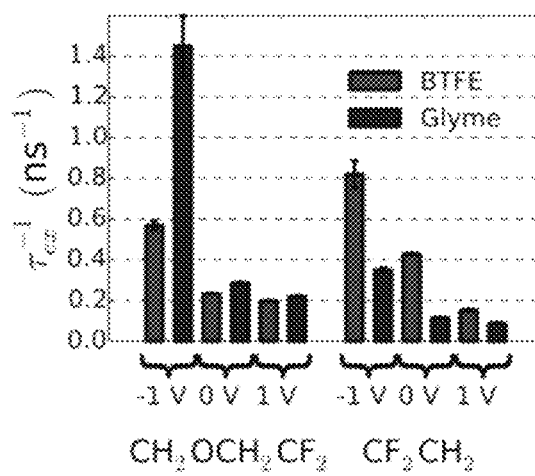
FIG. 32C shows the rate, $\tau^{-1}{}_{ex}$ of partner hydrogen exchange for fluoride-ion inside a SAM region according to Example V.

With reference to FIG. 32C, the calculated rate, $\tau_{ex}^{-1}$ of "partner" hydrogen exchange is presented using a time-correlation function, H(t) for a bond between fluoride-ion and its partner hydrogen atom of a SAM molecule. Given that H(t) decays from 1 to 0, $\tau_{ex}$ is defined using $H(\tau_{ex})=e^{-1}$. The "partner" exchange is a process that occurs at ~1 ns, which is associated with fluoride-ion hopping motion inside the SAM region.

Figure 33:
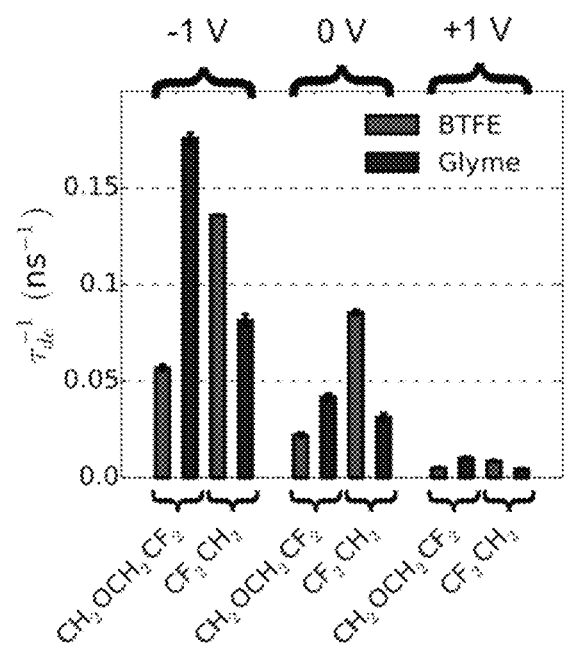
FIG. 33 shows the rate, $\tau^{-1}{}_{de}$ of fluoride-ion de-intercalation from a SAM region at several electrode potentials according to Example V.

With reference to FIG. 33, the calculated rate, $\tau_{de}^{-1}$ of fluoride-ion de-intercalation using a time-correlation function, $F_{AB}(t)$ at several electrode potentials. $F_{AB}(t)$ decays from 1 to 0 when fluoride-ion de-intercalates from the SAM region to an electrolyte region. $\tau_{ed}$ is defined using $F_{AB}(\tau_{ed})=e^{-1}$. Compared to the partner exchange process, the de-intercalation is a much slow process (>20 ns), which is attributed to the sizable barrier for a fluoride-ion to overcome in the PMF shown in FIG. 31 A.

Electrode polarization affects the de-intercalation kinetics, either enhancing or retarding the de-intercalation process. Further, the de-intercalation kinetics depends on electrolytes: the process is faster from the SAM of $CH_2OCH_2CF_2$ than from that of $CF_2CH_2$ moiety with glyme electrolyte, but is slower with BTFE electrolyte. This appears to the case at all electrode potentials examined. With a finite electrode potential, the SAM of $CH_2OCH_2CF_2$ with glyme electrolyte allows for the most facile fluoride-ion de-intercalation.

Simulation results for fluoride-ion SAM intercalation statistics and kinetics suggest the following design rules for a functional passivating SAM: (i) formation ability; dense enough SAM surface coverage to prevent electrolyte solvent intercalation, (ii) necessity of both α-$CH_2$ and $CF_2$ moieties for fluoride-ion solvation, or other moieties to favorably interaction with the fluoride-ion, to ensure substantial fluoride-ion SAM intercalation (iii) compatibility with electrolytes to ensure adequate kinetics of fluoride-ion SAM intercalation and deintercalation, and (iv) suitable end-group facing into the electrolyte to reduce a barrier for the fluoride-ion SAM intercalation to ensure adequate kinetics of fluoride-ion SAM intercalation and deintercalation.

Figure 34:
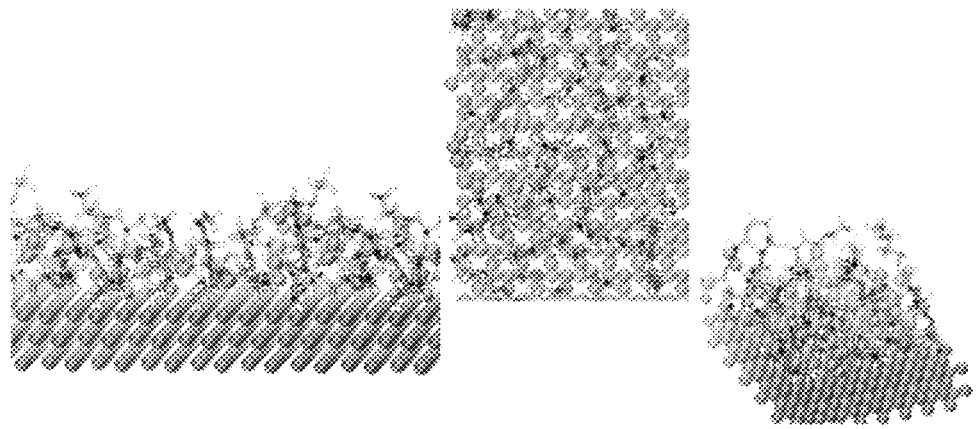
FIG. 34 shows the solvation site distribution on a metal-SAM interface according to Example V.

A pictorial depiction of fluoride ion solvation sites may be derived from these MD calculations (FIG. 34). In FIG. 34, dark grey indicates electrode atoms, grey indicates carbon atoms, red indicates oxygen atoms, white indicates hydrogen atoms, pink indicates fluorine atoms, and green indicates solvation sites. This presents a snapshot of the spatial locations within the SAM that at which a fluoride ion could be favorably solvated or bound. Following other work on lithium-ion solvation, including Webb et al., "Systematic computational and experimental investigation of lithium-ion transport mechanisms in polyester-based polymer electrolytes." ACS Cent. Sci., 1, 198 (2015); Webb et al., "Chemically specific dynamic bond percolation model for ion transport in polymer electrolytes." Macromolecules, 48, 7346 (2015); and Miller et al., "Designing polymer electrolytes for safe and high capacity rechargeable lithium batteries." Acc. Chem. Res., 50, 590 (2017), all of which are incorporated herein by reference in their entirety, the fluoride-ion solvation site distribution is determined at each configuration of the SAM using a distance-based criterion. The solvation sites are pruned to avoid redundancies and steric clashes with other atoms in the SAM.

The protocol used is:
1. Sites are initially prepared on a rectangular grid (146520 sites).
2. Sites are collected if they have at least 4 nearby hydrogens of SAM molecules (within 3 Å)
3. Two sites are considered the same if they share at least the same closest 4 hydrogens. Position of a representative site for a set of the sites of having the same closest 4 hydrogens is the centroid of the sites.
3. The site has to have no significant overlap with all other atoms of SAM molecules and of an electrode (interatomic distance >2 Å)
4. The last step consolidates the sites if a) they share at least the same 2 hydrogen atoms, and b) their intersite distance is less than 1 Å. Position of the final consolidated site is the centroid of the sites that is being consolidated.

What is claimed is:
1. A fluoride ion battery comprising:
a liquid electrolyte comprising fluoride ions;
an anode containing an alkali earth metal, a rare earth metal, or combinations thereof, and having an outer solid electrolyte interphase layer in contact with the electrolyte, wherein the outer solid electrolyte interphase layer comprises $CF_3(CF_2)_xCH_2$, wherein x is 2-5; and
a cathode containing:
a core-shell particle having a transition metal core and a shell at least partially surrounding the transition metal core, the shell in contact with the electrolyte, or
a metal nanostructure core including at least one dimension that is less than or equal to 20 nm, and a shell at least partially surrounding the core.

2. The fluoride ion battery of claim 1, wherein the liquid electrolyte comprises bis(2-methoxyethyl) ether, bis(2,2,2-trifluoroethyl) ether, N,N,N-trimethyl-N-neopentylammonium fluoride, N,N-dimethyl-N,N-dineopentylammonium fluoride, propionitrile, or combinations thereof.

3. The fluoride ion battery of claim 1, wherein the alkali earth metal is calcium, and the rare earth metal is selected from cerium and lanthanum.

4. The fluoride ion battery of claim 1, wherein the transition metal core comprises bismuth, lead, copper, or combinations thereof.

5. The fluoride ion battery of claim 1, wherein the outer solid electrolyte interphase layer is covalently attached to the anode.

6. The fluoride ion battery of claim 1, wherein the transition metal core comprises copper and the shell comprises $LaF_3$.

7. The fluoride ion battery of claim 1, wherein the shell comprises a thickness from about 2 nm to about 5 nm.

8. The fluoride ion battery of claim 1, wherein the transition metal core has at least one dimension less than or equal to about 20 nm.

9. The fluoride ion battery of claim 1, wherein the outer solid electrolyte interphase layer comprises $CF_3(CF_2)_5CH_2$, $CF_3(CF_2)_2CH_2$, or a combination thereof.

10. A fluoride ion battery comprising:
a liquid electrolyte comprising fluoride ions;
an anode containing an alkali earth metal, a rare earth metal, or combinations thereof, and having an outer solid electrolyte interphase layer in contact with the electrolyte, wherein the outer solid electrolyte interphase layer comprises 1H,1H,2H,2H-perfluorooctyltriethoxysilane; 3,3,4,4,5,5,6,6,6-nonafluorohex-1-ene; or a combination thereof; and
a cathode containing:
a core-shell particle having a transition metal core and a shell at least partially surrounding the transition metal core, the shell in contact with the electrolyte, or
a metal nanostructure core including at least one dimension that is less than or equal to 20 nm, and a shell at least partially surrounding the core.

11. A fluoride ion battery comprising:
a liquid electrolyte comprising fluoride ions;
an anode containing an alkali earth metal, a rare earth metal, or combinations thereof, and having an outer solid electrolyte interphase layer in contact with the electrolyte, wherein the outer solid electrolyte interphase layer comprises a reaction derivative formed between a diazonium salt and a surface of the anode, and wherein the diazonium salt comprises 4-tert-butylbenzene diazonium salt: 4-methoxybenzene diazonium salt: 4-(dimethylamino)benzene diazonium salt; 4-nitrobenzene diazonium salt; 4-trifluoromethylbenzene diazonium salt; or a combination thereof; and
a cathode containing:
a core-shell particle having a transition metal core and a shell at least partially surrounding the transition metal core, the shell in contact with the electrolyte, or
a metal nanostructure core including at least one dimension that is less than or equal to 20 nm, and a shell at least partially surrounding the core.

12. The fluoride ion battery of claim 11, wherein the outer solid electrolyte interphase layer is a film on the anode, and the 4-tert-butylbenzenediazonium salt; 4-methoxybenzene diazonium salt; 4-(dimethylamino)benzene diazonium salt; 4-nitrobenzene diazonium salt; 4-trifluoromethyl benzene diazonium salt; or combination thereof further comprise a salt counter anion comprising $BF_4^-$, $F^-$, $Cl^-$, $PF_6^-$, $CF_3SO_3^-$, $[(CF_3SO_2)_2N]^-$, or a combination thereof.

* * * * *